US012607781B2

(12) United States Patent
Yamamoto et al.

(10) Patent No.: US 12,607,781 B2
(45) Date of Patent: Apr. 21, 2026

(54) TRANSPARENT LAMINATE, IMAGE DISPLAY DEVICE, DOUBLE-SIDED ANTIREFLECTION LAMINATE, AND FACIAL TRANSPARENT PROTECTOR

(71) Applicant: DAI NIPPON PRINTING CO., LTD., Tokyo (JP)

(72) Inventors: Mariko Yamamoto, Tokyo (JP); Tomoyuki Horio, Tokyo (JP); Atsushi Kawaguchi, Tokyo (JP); Kazuo Sasamoto, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 398 days.

(21) Appl. No.: 18/003,823

(22) PCT Filed: Jun. 30, 2021

(86) PCT No.: PCT/JP2021/024740
§ 371 (c)(1),
(2) Date: May 26, 2023

(87) PCT Pub. No.: WO2022/004785
PCT Pub. Date: Jan. 6, 2022

(65) Prior Publication Data

US 2024/0027652 A1 Jan. 25, 2024

(30) Foreign Application Priority Data

Jun. 30, 2020 (JP) ................................ 2020-113538

(51) Int. Cl.
*G02B 1/14* (2015.01)
*A41D 13/11* (2006.01)
(Continued)

(52) U.S. Cl.
CPC ............ *G02B 1/14* (2015.01); *A41D 13/1184* (2013.01); *B32B 7/023* (2019.01); *B32B 7/12* (2013.01);
(Continued)

(58) Field of Classification Search
None
See application file for complete search history.

(56) References Cited

U.S. PATENT DOCUMENTS

2012/0241748 A1 9/2012 Fujii
2013/0314648 A1* 11/2013 Rappoport ............... G02B 1/11 349/137
(Continued)

FOREIGN PATENT DOCUMENTS

JP 2000-075104 3/2000
JP 2005-121870 5/2005
(Continued)

OTHER PUBLICATIONS

International Search Report and Written Opinion, issued in the corresponding PCT Application No. PCT/JP2021/024740, dated Sep. 14, 2021, 23 pages (with translation).
(Continued)

*Primary Examiner* — Ramsey Zacharia
(74) *Attorney, Agent, or Firm* — HSML P.C.

(57) ABSTRACT

Provided in an aspect of the present invention is a transparent laminate (10) including a functional layer (12) and a low-refractive-index layer (13) having a refractive index lower than the refractive index of the functional layer (12), wherein the surface (13A) of the low-refractive-index layer (13) is the surface (10A) of the transparent laminate (10), the surface (10A) of the transparent laminate (10) is not fogged as tested in an anti-fogging ability test, and the absolute value ΔY1 of a difference in the luminous reflectance Y of
(Continued)

the surface (10A) of the transparent laminate (10) between before and after the anti-fogging ability test is 0.2% or less.

20 Claims, 6 Drawing Sheets

(51) Int. Cl.

| | |
|---|---|
| ***B32B 7/023*** | (2019.01) |
| ***B32B 7/12*** | (2006.01) |
| ***B32B 23/04*** | (2006.01) |
| ***B32B 23/20*** | (2006.01) |
| ***G02B 1/111*** | (2015.01) |

(52) U.S. Cl.

CPC .............. *B32B 23/04* (2013.01); *B32B 23/20* (2013.01); *G02B 1/111* (2013.01); *A41D 2400/00* (2013.01); *B32B 2255/26* (2013.01); *B32B 2255/28* (2013.01); *B32B 2307/412* (2013.01); *B32B 2307/414* (2013.01); *B32B 2307/536* (2013.01); *B32B 2307/538* (2013.01); *B32B 2307/54* (2013.01); *B32B 2457/20* (2013.01); *B32B 2571/00* (2013.01)

(56) References Cited

U.S. PATENT DOCUMENTS

| | | | |
|---|---|---|---|
| 2016/0193808 | A1 | 7/2016 | Nishimura et al. |
| 2017/0208878 | A1 | 7/2017 | Kakinuma et al. |

FOREIGN PATENT DOCUMENTS

| | | |
|---|---|---|
| JP | 2010-002481 | 1/2010 |
| JP | 2016-029446 | 3/2016 |
| JP | 2016-035519 | 3/2016 |
| JP | 2016-123692 | 7/2016 |
| JP | 2017-114106 | 6/2017 |
| JP | 2019-028313 | 2/2019 |
| JP | 2019-123246 | 7/2019 |
| JP | 2019-142196 | 8/2019 |
| WO | 2011/070944 | 6/2011 |

OTHER PUBLICATIONS

International Preliminary Report on Patentability, issued in the corresponding PCT Application No. PCT/JP2021/024740, dated Dec. 13, 2022, 18 pages (with translation).

* cited by examiner

TRANSPARENT LAMINATE, IMAGE DISPLAY DEVICE, DOUBLE-SIDED ANTIREFLECTION LAMINATE, AND FACIAL TRANSPARENT PROTECTOR

CROSS-REFERENCE TO RELATED APPLICATION

The present application enjoys the benefit of priority to the prior Japanese Patent Application No. 2020-113538 (filed on Jun. 30, 2020), the entire disclosure of which is incorporated herein by reference.

TECHNICAL FIELD

The present invention relates to a transparent laminate, an image display device, a double-sided antireflection laminate, a double-sided antireflection laminate, and a facial transparent protector.

BACKGROUND ART

In recent years, image display devices that can be used outdoors, such as digital signage (electronic billboards), have been developed. In some cases, an image display device to be used outdoors has a front plate arranged on the observer side of its display panel via an air layer (air gap) so as to have higher durability.

The front plate is usually constituted by a glass plate. In some cases, an antireflection film is provided between the glass plate and the display panel to inhibit the reflection of external light (see, for example, Patent Literature 1).

PRIOR ART DOCUMENTS

Patent Document

Patent Document 1: JP2016-35519A

SUMMARY OF THE INVENTION

However, an image display device to be used outdoors is not configured to be anti-fogging although configured to be rainproof and windproof. In particular, an image display device the structure of which has an air layer between the front plate and the display panel results in containing a larger amount of moisture in the air layer, when used outdoors. Because of this, providing an antireflection film on the front plate in such a manner that the antireflection film is on the display panel side will undesirably cause the moisture in the air layer to fog the surface of the antireflection film (specifically the surface of a low-refractive-index layer) during use of the image display device, decreasing the luminous reflectance of the surface of the antireflection film, and thus decreasing the clearness, visibility, and transmission of an image. In a large image display device in particular, the surface of a part of the antireflection film will be fogged, thereby decreasing the clearness of a part of an image, thus resulting in exhibiting unevenness due to a difference in the clearness from another part of the image in some cases.

At present, a new type of coronavirus is raging all over the world. It is known that a new type of coronavirus or the like causes infection via droplets. To prevent this droplet infection, a conversation may be carried out with a facial transparent protector such as a face shield put on or with a transparent partition or the like in between. In scenes where various types of persons come in contact with each other, such protective equipment is required in light of the prevention of infection with another type of virus and in light of hygiene, for example, the prevention of smudging.

However, carrying out a conversation across a facial transparent protector or a transparent partition will undesirably cause the reflection of light to make it difficult to see the movement of the mouth, and in addition, cause the exhaled air to fog the facial transparent protector or the like, giving a sense of unease or stress to the other person conversing.

The present invention has been made to solve the above-mentioned problems. That is, an object is to provide: a transparent laminate that has an antireflection ability and an excellent anti-fogging ability, and is less prone to change in luminous reflectance even in an environment liable to fog; an image display device and a double-sided antireflection laminate that each include the transparent laminate; and a facial transparent protector including the double-sided antireflection laminate.

Solution to Problem

[1] A transparent laminate including a functional layer and a low-refractive-index layer having a refractive index lower than the refractive index of the functional layer, wherein the surface of the low-refractive-index layer is the surface of the transparent laminate, wherein the surface of the transparent laminate is not fogged as tested in an anti-fogging ability test in which the transparent laminate is left to stand in an environment of −15° C. for 5 minutes, then transferred into an environment of 20° C. or more and 25° C. or less and a relative humidity of 40% to 70%, and then left to stand for 5 minutes, and wherein the absolute value ΔY1 of a difference in the luminous reflectance Y of the surface of the transparent laminate between before and after the anti-fogging ability test is 0.2% or less.

[2] A transparent laminate including a functional layer and a low-refractive-index layer having a refractive index lower than the refractive index of the functional layer, wherein a ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ is 1.25 or more and 2.20 or less in an absorption spectrum obtained from the surface of the transparent laminate by Fourier transform infrared spectroscopy.

[3] A transparent laminate including a functional layer and a low-refractive-index layer having a refractive index lower than the refractive index of the functional layer, wherein a ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ is 0.01 or more and 0.40 or less in an absorption spectrum obtained from the surface of the transparent laminate by Fourier transform infrared spectroscopy.

[4] The transparent laminate according to any one of [1] to [3], wherein a ratio of an arithmetic average roughness to the maximum height of the surface of the transparent laminate is 0.02 or more and 0.15 or less.

[5] The transparent laminate according to any one of [1] to [4], wherein the indentation hardness of the surface of the transparent laminate is 20 MPa or more and 100 MPa or less, and wherein the composite elastic modulus of the surface of the transparent laminate is 0.15 GPa or more and 1.5 GPa or less.

[6] The transparent laminate according to any one of [1] to [5], wherein the low-refractive-index layer has a film thickness of 200 nm or less.

[7] The transparent laminate according to any one of [1] to [6], wherein the functional layer has a film thickness of 3 μm or more.

[8] The transparent laminate according to any one of [1] to [9], wherein the functional layer contains a hydrophilic group, and wherein the low-refractive-index layer is adjacent to the functional layer.

[9] The transparent laminate according to any one of [1] to [8], wherein the contact angle of the surface of the transparent laminate with water is 90° or more.

[10] The transparent laminate according to any one of [1] to [9], wherein the low-refractive-index layer contains hollow silica particles.

[11] The transparent laminate according to any one of [1] to [10], wherein the functional layer a hard coat layer.

[12] The transparent laminate according to any one of [1] to [11], further including a base material provided on the opposite side of the functional layer from the low-refractive-index layer side.

[13] The transparent laminate according to [12], wherein the base material contains a resin or glass.

[14] The transparent laminate according to any one of [1] to [13], for use in an image display device, a facial transparent protector, a transparent film curtain, or a transparent partition.

[15] The transparent laminate according to [14], wherein the image display device is an image display device for outdoor use.

[16] An image display device including a display panel and a light-transmitting front plate arranged on the observer side of the display panel with an air layer between the display panel and the light-transmitting front panel, wherein the front plate includes a base material and the transparent laminate according to any one of [1] to [13] arranged on at least any one of the display panel side or the observer side of the base material.

[17] A double-sided antireflection laminate having an antireflection function at both faces of the double-sided antireflection laminate, including: the transparent laminate according to any one of [1] to [13]; an antireflection film arranged on a back surface side of the transparent laminate opposite to the surface.

[18] The double-sided antireflection laminate according to [17], wherein the double-sided antireflection laminate is in use for a facial transparent protector, and wherein the surface of the transparent laminate is located toward an observer's face.

[19] The double-sided antireflection laminate according to [17] or [18], wherein the double-sided antireflection laminate has a total light transmittance of 90% or more.

[20] The double-sided antireflection laminate according to any one of [17] to [19], wherein the double-sided antireflection laminate has a double-sided reflectance of 0.1% or more and 2% or less, and wherein the luminous reflectance of the surface of the transparent laminate is equal to or greater than the luminous reflectance of the antireflection film.

[21] The double-sided antireflection laminate according to any one of [17] to [19], wherein the double-sided antireflection laminate has a double-sided reflectance of 0.1% or more and 2% or less, and wherein the absolute value ΔY2 of a difference between the luminous reflectance of the transparent laminate and the luminous reflectance of the antireflection film is 1.0% or less.

[22] A facial transparent protector including a supporting member and the double-sided antireflection laminate according to any one of [17] to [21] attached to the supporting member, wherein the surface of the transparent laminate is located toward an observer's face.

The present invention makes it possible to provide: a transparent laminate that has an antireflection ability and an excellent anti-fogging ability, and is less prone to change in luminous reflectance even in an environment liable to fog; an image display device and a double-sided antireflection laminate that each include the transparent laminate; and a facial transparent protector including the double-sided antireflection laminate.

DESCRIPTION OF EMBODIMENTS

Figure 1:
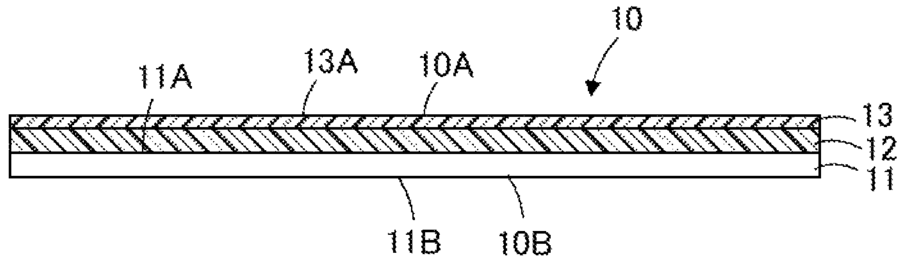
FIG. 1 is a schematic block diagram of a transparent laminate according to an embodiment.
Figure 2:
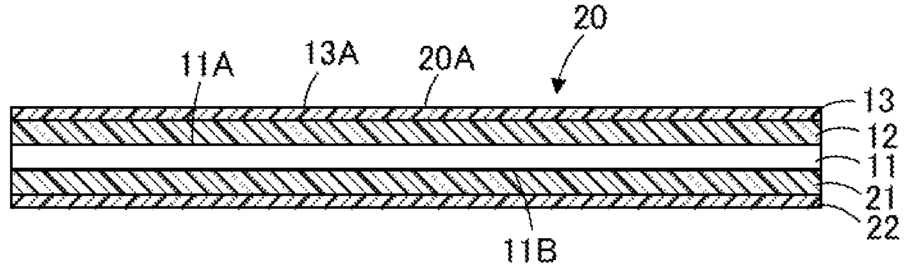
FIG. 2 is a schematic block diagram of another transparent laminate according to an embodiment.
Figure 6:
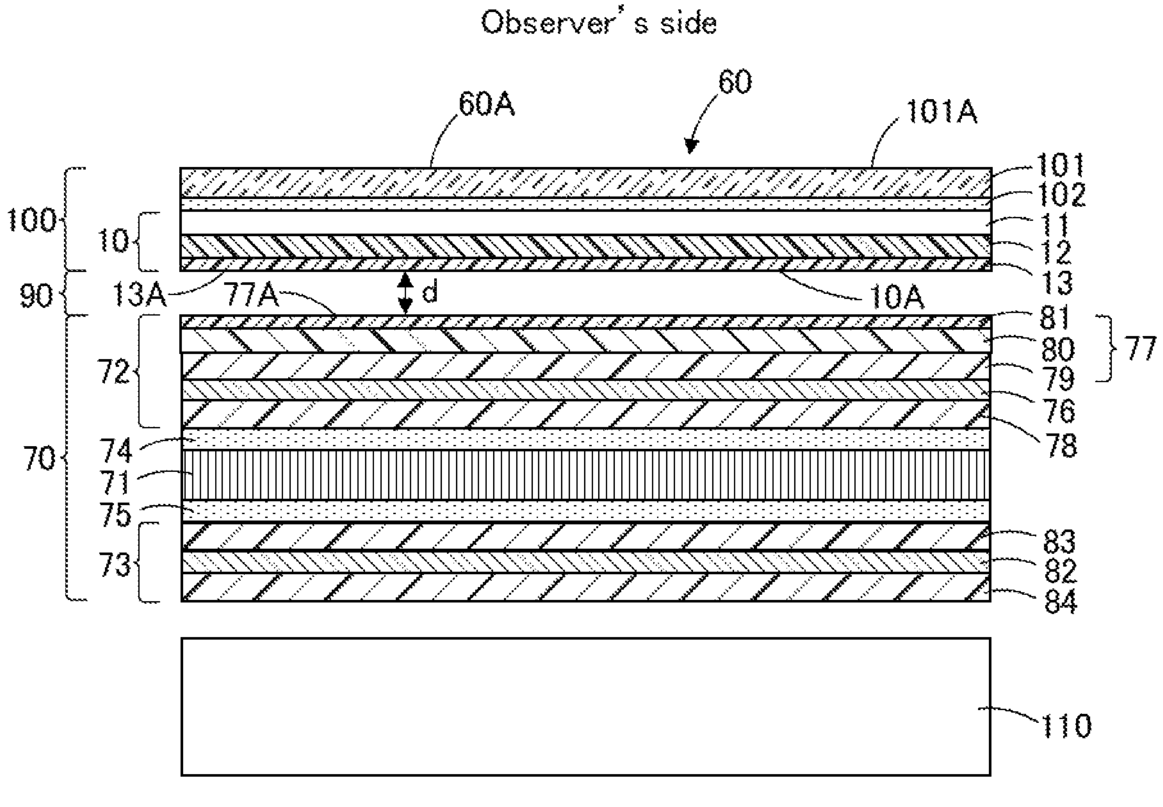
FIG. 6 is a schematic block diagram of an image display device according to an embodiment.
Figure 7:
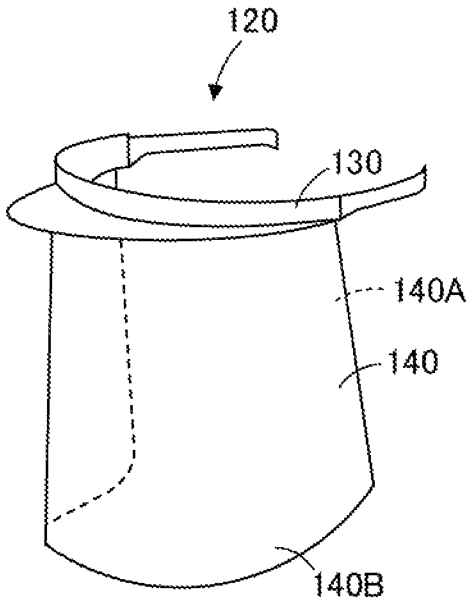
FIG. 7 is a schematic block diagram of a facial transparent protector according to an embodiment.
Figure 8:
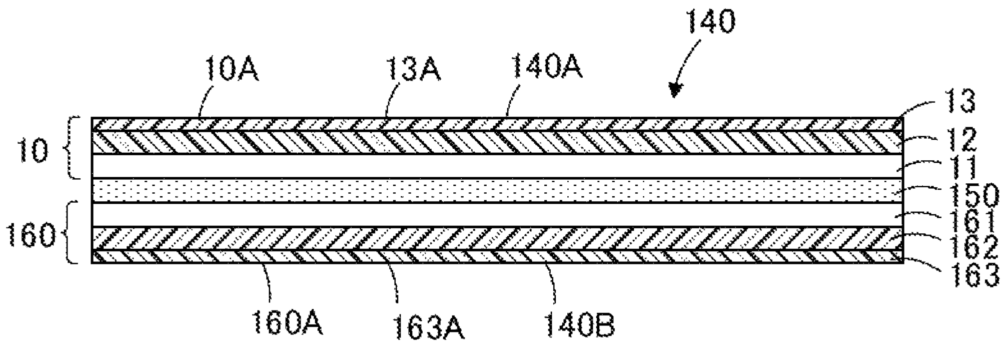
FIG. 8 is a schematic block diagram of a double-sided antireflection laminate depicted in FIG. 7.
Figure 9:
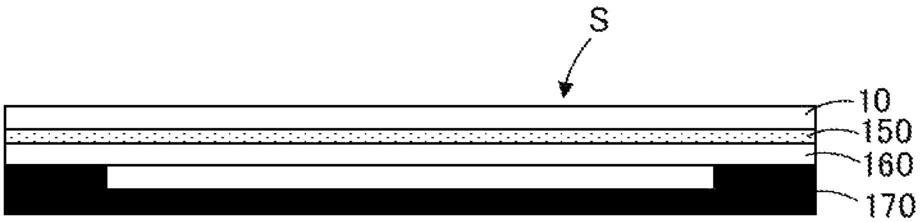
FIG. 9 is a schematic diagram illustrating a sample placed on a holder to measure a double-sided reflectance.
Figure 10:
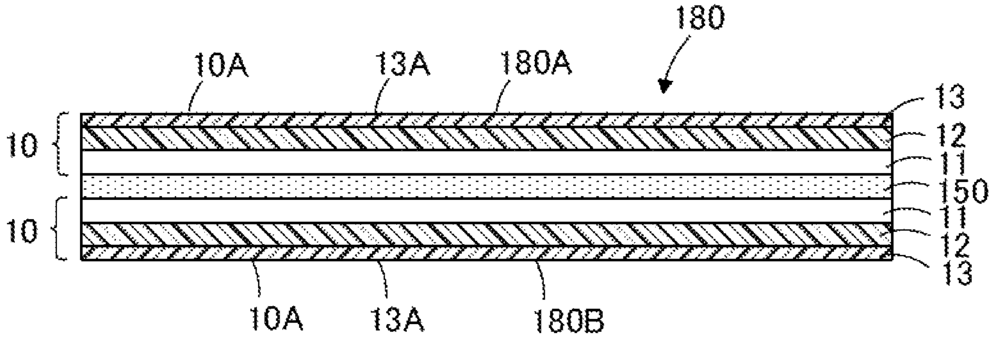
FIG. 10 is a schematic block diagram of another double-sided antireflection laminate according to an embodiment.
Figure 11:
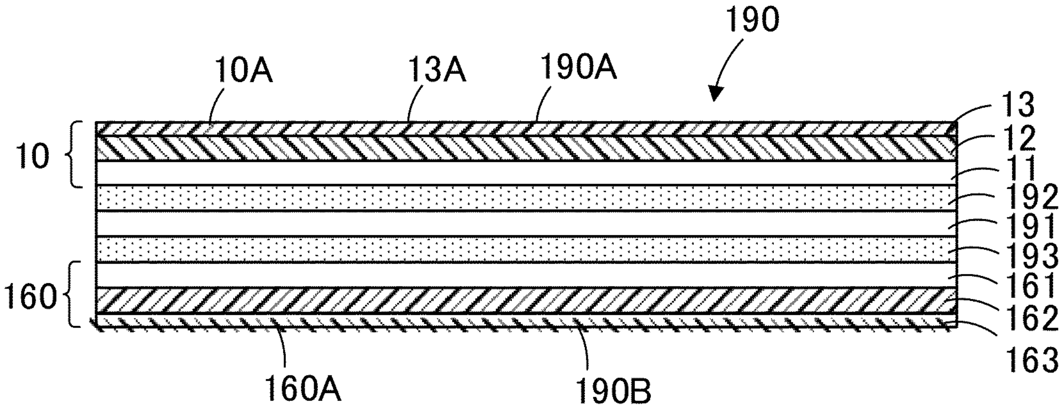
FIG. 11 is a schematic block diagram of another double-sided antireflection laminate according to an embodiment.
Figure 12:
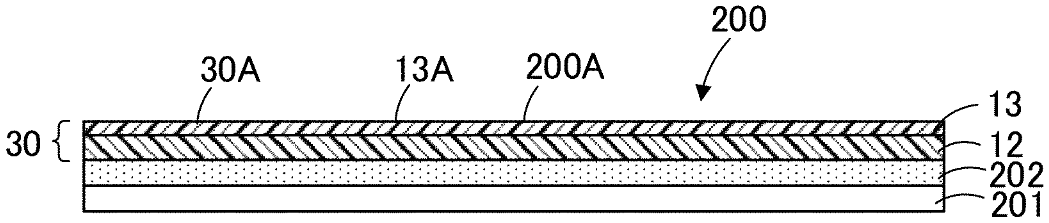
FIG. 12 is a schematic block diagram of a single-sided antireflection laminate according to an embodiment.

A transparent laminate, a double-sided antireflection laminate, an image display device, and a facial transparent protector according to an embodiment of the present invention will now be described with reference to the drawings. As used herein, the terms "film" and "sheet" are not distinguished from each other on the basis of the difference in naming alone. For example, the term "film" is thus used to refer inclusively to a member called a sheet. FIG. 1 is a schematic block diagram of a transparent laminate according to the present embodiment. FIG. 2 to FIG. 5 are schematic block diagrams of another transparent laminate according to the present embodiment. FIG. 6 is a schematic block diagram of an image display device according to the present embodiment. FIG. 7 is a schematic block diagram of a facial transparent protector according to the present embodiment. FIG. 8 is a schematic block diagram of a double-sided antireflection laminate depicted in FIG. 7. FIG. 9 to FIG. 11 are schematic block diagrams of other double-sided antireflection laminates according to the present embodiment. FIG. 12 is a schematic block diagram of a single-sided antireflection laminate according to the present embodiment.

<<<Transparent Laminate>>>

A transparent laminate 10 depicted in FIG. 1 is a transparent laminate having an antireflection ability and an anti-fogging ability. That is, the transparent laminate 10 functions as an antireflection film and an anti-fogging film. Being "transparent" as used herein can be transparent enough to achieve a transmitting visibility in accordance with the use.

The transparent laminate 10 includes a base material 11, a functional layer 12, and a low-refractive-index layer 13 having a refractive index lower than the refractive index of the functional layer 12, in this order. The low-refractive-index layer 13 is adjacent to the functional layer 12. The transparent laminate 10 includes the base material 11, or optionally does not include the base material 11. In addition, the low-refractive-index layer 13 may have at least one or more other functional layers provided thereon.

The surface 10A of the transparent laminate 10 depicted in FIG. 1 is the surface 13A of the low-refractive-index layer 13. As used herein, the word "surface" of the transparent laminate is used to mean the low-refractive-index layer side surface of the transparent laminate. The opposite face of the transparent laminate from the surface is referred to as the "back surface" to be distinguished from the surface of the transparent laminate. The back surface 10B of the transparent laminate 10 is the second face 11B of the base material 11. In cases where the low-refractive-index layer 13 has at least one or more other functional layers provided thereon, the surface of the transparent laminate is the surface of the uppermost layer of these functional layers. In this regard, examples of this functional layer include an extremely thin antismudging layer, antistatic layer, or the like 1 nm or more and 50 nm or less.

At least any one of the layers included in the transparent laminate 10 preferably contains an ultraviolet absorber. An ultraviolet absorber that can be used is any known ultraviolet absorber.

With the transparent laminate 10, the surface 10A of the transparent laminate 10 is not fogged as tested in an anti-fogging ability test in which the transparent laminate 10 is left to stand in an environment of −15° C. for 5 minutes, then transferred to an environment of 20° C. or more and 25° C. or less and a relative humidity of 40% or more and 70% or less, and left to stand for 5 minutes. In the anti-fogging ability test, the environment of −15° C. can be achieved by a refrigerator. When the anti-fogging ability test is performed, a sample cut out of the transparent laminate 10 is used. The size of the sample is 100 mm×100 mm. Then, this sample is bonded to a black acrylic plate 100 mm×100 mm×2 mm in size (for example, a product named "COMOGLAS Acrylic Sheet", manufactured by Kuraray Co., Ltd.) with a transparent adhesive having a film thickness of 25 μm (a product named "PD-S1", manufactured by Panac Co., Ltd.). This bond is done in such a manner that the back surface of the transparent laminate is the black acrylic plate side thereof, whereby the surface of the transparent laminate is made to be the observation side. Then, a piece formed in this manner is used as a measurement sample. The same measurement samples are produced, 3 sheets each. The measurement samples, 3 each (n=3), are used to perform each anti-fogging ability test. Whether the surface of the measurement sample (the surface 13A of the low-refractive-index layer 13) is not fogged is to be determined by visually observing the surface of the measurement sample immediately after the anti-fogging ability test is performed. In the anti-fogging ability test, the transparent laminate 10 is left to stand in an environment of 20° C. or more and 25° C. or less and a relative humidity of 40% or more and 70% or less for 5 minutes, because there are some cases where the transparent laminate 10 is not fogged immediately after being transferred to an environment of 20° C. or more and 25° C. or less, but is then fogged with time.

With the transparent laminate 10, the absolute value ΔY1 of a difference in the luminous reflectance Y of the surface 10A of the transparent laminate 10 between before and after the above-mentioned anti-fogging ability test (|the luminous reflectance of the transparent laminate before the anti-fogging ability test−the luminous reflectance of the transparent laminate after the anti-fogging ability test|) is 0.2% or less. The luminous reflectance Y can be measured using a spectrophotometer (for example, a product named "UV-2600", manufactured by Shimadzu Corporation). Specifically, a sample having the above-mentioned size is first cut out of the transparent laminate 10. Then, the spectrophotometer is used to radiate light at an incidence angle of 5 degrees to the surface (for example, the surface 13A of the low-refractive-index layer 13) of the sample before the anti-fogging ability test, receive the light reflected at the sample in the specular direction, and measure a reflectance in the wavelength range of from 380 nm to 780 nm. As used herein, the phrase "light at an incidence angle of 5 degrees" means light slanted at 5 degrees to the direction normal to the surface of the sample (the surface of the low-refractive-index layer), assuming that the normal direction is 0 degree. Then, the luminous reflectance Y is calculated with a software item (for example, a software item pre-installed in UV-2600) for conversion in terms of the brightness that a person senses with the eyes. Then, the sample undergoes the anti-fogging ability test. Then, the luminous reflectance Y of the sample after the anti-fogging ability test is determined in the same manner as the luminous reflectance Y of the sample before the anti-fogging ability test to determine the absolute value of a difference in the luminous reflectance Y of the surface 10A of the transparent laminate 10 between before and after the anti-fogging ability test. The luminous reflectance of the transparent laminate before the anti-fogging ability test and the luminous reflectance of the transparent laminate after the anti-fogging ability test are each determined as the arithmetic average of the luminous reflectance values measured at 40 points in the sample, in which the 40 points for measurement are selected randomly. The upper limit of the ΔY1 is more preferably 0.2% or less, 0.15% or less, or 0.125% or less. The lower limit of the ΔY1 is 0% or more, or may be 0.03% or more.

With the transparent laminate 10, the absolute value ΔY3 of a difference in the luminous reflectance Y of the transparent laminate 10 between before and after a light resistance test (|the luminous reflectance of the transparent laminate before the light resistance test−the luminous reflectance of the transparent laminate after the light resistance test|) is also preferably 0.5% or less, in which test light (for example, carbon arc lamp light) is radiated to the transparent laminate 10 in an environment of 63° C. and a relative humidity of 50% for 200 hours. The light resistance test can be performed using a fade meter (for example, a product named "Ultraviolet Fade Meter U48AU", manufactured by Suga Test Instruments Co., Ltd.). Specifically, a sample having the above-mentioned size is first cut out of the transparent laminate. Then, the spectrophotometer is used to determine a luminous reflectance Y before the light resistance test in the same manner as above-mentioned. Then, the sample is placed in the fade meter to undergo the light resistance test under the above-mentioned conditions. Then, the luminous reflectance Y of the sample after the light resistance test is determined in the same manner as the luminous reflectance Y of the sample before the light resistance test to determine the absolute value of a difference in the luminous reflectance Y of the surface 10A of the transparent laminate 10 between before and after the light resistance test. The luminous reflectance of the transparent laminate before the light resistance test and the luminous reflectance of the transparent laminate after the anti-fogging ability test are each determined as the arithmetic average of the luminous reflectance values measured at 40 points in the sample, in which the 40 points for measurement are selected randomly. The upper limit of the ΔY3 is more preferably 0.5% or less, 0.4% or less, 0.3% or less, or 0.2% or less. The lower limit of the ΔY3 is 0% or more.

With the transparent laminate 10, the luminous reflectance Y of the surface 10A of the surface 10A that is yet to undergo the anti-fogging ability test and the light resistance test is preferably 3.5% or less. This allows the light transmittance of the whole transparent laminate 10 to rise. Thus, for example, a facial transparent protector including the transparent laminate 10 makes it easier for a wearer of the facial transparent protector to see the other person or the like, and in addition, makes it easier for the other person to see the wearer. Furthermore, such a transparent laminate in an image display device enables the definition of an image to be enhanced. The luminous reflectance of the transparent laminate is determined as the arithmetic average of the luminous reflectance values measured at 40 points in the sample having the above-mentioned size, in which the 40 points for measurement are generally equally spaced so as to cover the whole transparent laminate. The luminous reflectance Y is more preferably 2.0% or less, 1.5% or less, or 1.2% or less, in terms of inhibiting the reflection of external light. In cases where the transparent laminate 10 is used for a transparent shield film of a facial transparent protector, it is best that the luminous reflectance of each of the wearer side face (inner face) and the other person side face (outer face) of the facial transparent protector is low. At least having a lower luminous reflectance on the other person side face than on the wearer side face makes it possible to improve communication problems.

A ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ (the second peak intensity/the first peak intensity) is preferably 1.25 or more and 2.20 or less in an absorption spectrum obtained from the surface 10A of the transparent laminate 10 by Fourier transform infrared spectroscopy (an FT-IR method). The peak in the first wave number region is a peak derived from an ester group, and the peak in the second wave number region is a peak derived from an ether group. Thus, having both a peak in the first wave number region and a peak in the second wave number region in the absorption spectrum means that the transparent laminate 10 (for example, at least any one of the functional layer 12 or the low-refractive-index layer 13) contains an ester component and an ether component such as an anti-fogging material. The ratio of 1.25 or more results in having a larger amount of an anti-fogging material containing an ether component, and thus, makes it possible to more enhance the anti-fogging ability and the flexibility. In addition, 2.20 or less results in not having too large an amount of an anti-fogging material containing an ether component, and thus, makes it possible to inhibit a decrease in hardness and a decrease in abrasion resistance. The ratio is preferably 1.30 or more and 2.20 or less, 1.35 or more and 2.20 or less, 1.40 or more and 2.20 or less, 1.25 or more and 2.15 or less, 1.30 or more and 2.15 or less, 1.35 or more and 2.15 or less, 1.40 or more and 2.15 or less, 1.25 or more and 2.10 or less, 1.30 or more and 2.10 or less, 1.35 or more and 2.10 or less, 1.40 or more and 2.10 or less, 1.25 or more and 2.00 or less, 1.30 or more and 2.00 or less, or 1.35 or more and 2.00 or less, 1.25 or more and 1.95 or less, 1.30 or more and 1.95 or less, or 1.35 or more and 1.95 or less. In particular, for example, in cases where the transparent laminate 10 is used for a facial transparent protector, the ability to withstand dust and the like outdoors is required, but dust durability cannot be evaluated by a steel wool resistance test. Thus, when a falling sand abrasion test (ASTM D 968) is performed as a test in which dust is allowed to attack, the ratio of 1.30 or more and 1.95 or less makes it possible to have both a dust durability and an anti-fogging ability during actual usage, and accordingly, the ratio is more preferably 1.30 or more and 1.95 or less. In addition, the ratio may be 1.25 or more and 1.30 or less in order to more enhance the dust durability, and may be 1.95 or more and 2.20 or less in order to more enhance the anti-fogging ability.

In cases where a peak exists in a third wave number region of from 1540 $cm^{-1}$ to 1560 $cm^{-1}$ in an absorption spectrum obtained from the surface 10A of the transparent laminate 10 by Fourier transform infrared spectroscopy (an FT-IR method) (for example, in cases where the transparent laminate contains a material having a urethane backbone), the ratio of the second peak intensity in the second wave number region of from 1150 $cm^{-1}$ to 1000 $cm^{-1}$ to the first peak intensity in the first wave number region of from 1780 $cm^{-1}$ to 1700 $cm^{-1}$ is preferably 0.01 or more and 0.4 or less. The ratio of 0.01 or more results in having a larger amount of an anti-fogging material containing an ether component, and thus, makes it possible to more enhance the anti-fogging ability and the flexibility. In addition, 0.4 or less results in not having too large an amount of an anti-fogging material containing an ether component, and thus, makes it possible to inhibit a decrease in hardness and a decrease in abrasion resistance. The ratio is preferably 0.03 or more and 0.4 or less, 0.05 or more and 0.4 or less, 0.01 or more and 0.35 or less, 0.03 or more and 0.35 or less, 0.05 or more and 0.35 or less, 0.10 or more and 0.35 or less, 0.01 or more and 0.30 or less, 0.03 or more and 0.30 or less, 0.05 or more and 0.30 or less, or 0.10 or more and 0.30 or less. In addition, the ratio may be 0.01 or more and 0.1 or less in order to more enhance the dust durability, and may be 0.3 or more and 0.4 or less in order to more enhance the anti-fogging ability.

A measurement by a Fourier transform infrared analysis method can be made as below-mentioned. First, a sample 10 mm×10 mm or larger in size is cut out of a transparent laminate. In addition, a background measurement is made using a measurement device composed of a Fourier transform infrared spectrophotometer (a product named "Nicolet iS10 FT-IR", manufactured by Thermo Fisher Scientific Inc.) with a measurement accessory (a product named "Thunderdome", manufactured by Spectra-Tech Inc.; ATR crystal, Ge; infrared incidence angle, 45°) attached, in which device no sample is placed. Then, the sample is placed in the measurement accessory with the measurement face of the sample facing the crystal side of the measurement accessory. Then, the knob of the presser jig is turned to bring the sample in sufficient contact with the crystal. Then, an absorption spectrum of the sample is checked on the monitor, and then, a measurement is started on the measurement device under the below-mentioned measurement conditions. From the background in the resulting absorption spectrum, the height to the peak top of each of the peak in the first wave number region and the peak in the second wave number region is determined using a computing software item accompanying the measurement device. From the results, the intensity ratio is calculated.

(Measurement Conditions)

Wave number range: 4000 to 800 $cm^{-1}$

Number of scans: 64

Resolution: 8 $cm^{-1}$

Detector: TGS

ATR correction: not done

Measurement and analysis software: Thermo Scientific OMINIC

The ester component is a component contained mainly in the functional layer 12 and the low-refractive-index layer 13, and is derived from a polymer of an ionizing-radiation-polymerizable compound. The ether component is mainly a component contained in the below-mentioned anti-fogging material, for example, a component derived from an alkylene oxide in cases where the anti-fogging material is a material having an alkylene oxide such as ethylene oxide (EO), or a component derived from a polyether in cases where the anti-fogging material is a polyether-based urethane (meth)acrylate.

A ratio (Ra/Rz) of the arithmetic average roughness (Ra) to the maximum height (Rz) on the surface 10A of the transparent laminate 10 is preferably 0.02 or more and 0.15 or less. For the sake of the anti-fogging ability, a larger surface area of the surface of the transparent laminate is more advantageous, and thus, the surface of the transparent laminate preferably has an irregular shape. However, this irregular shape, if too large, will undesirably cause glareproofness to be expressed, worsening the visibility. Because of this, to inhibit a decrease in the visibility and enhance the anti-fogging ability, the ratio is preferably 0.02 or more and 0.15 or less. That is, the ratio of 0.02 or more makes it possible to inhibit the glareproofness of the surface 10A of the transparent laminate 10, thus, making it possible to obtain favorable visibility. In addition, 0.15 or less makes it possible to enhance the anti-fogging ability. The ratio is more preferably 0.03 or more and 0.15 or less, 0.04 or more and 0.15 or less, 0.05 or more and 0.15 or less, 0.02 or more and 0.14 or less, 0.03 or more and 0.14 or less, 0.04 or more and 0.14 or less, 0.05 or more and 0.14 or less, 0.02 or more and 0.13 or less, 0.03 or more and 0.13 or less, 0.04 or more and 0.13 or less, 0.05 or more and 0.13 or less, 0.02 or more and 0.12 or less, 0.03 or more and 0.12 or less, 0.04 or more and 0.12 or less, or 0.05 or more and 0.12 or less.

The above-mentioned Ra and Rz are obtained by three-dimensionally extending a roughness as the two-dimensional roughness parameter described in the instruction manual (SPM-9600 February, 2016, P. 194-195) for the upgrade kit of a scanning probe microscope SPM-9600. Ra is determined in accordance with the following formula, wherein only the criterion length (L) is extracted from the roughness curve in the average line direction thereof, the average line direction of this extracted portion is taken as the X-axis, the longitudinal magnification direction is taken as the Y-axis, and the roughness curve is expressed as y=f(x).

$$Ra = \frac{1}{L}\int_0^L |f(x)|dx \quad \text{[Math. 1]}$$

Rz is a value obtained by extracting only the criterion length from the roughness curve in the average line direction thereof, and measuring the distance between the mountain-top line and the valley-bottom line of this extracted portion in the longitudinal magnification direction of roughness curve.

For the ratio, Rz and Ra are used for the below-mentioned reason. Ra is an average value obtained by calculating the area of all of the irregularities existing on the criterion length, and dividing the resulting value by the criterion length, and thus is not the average value of the actual irregularities. In addition, too small irregularities and too large irregularities, if any, are completely averaged, and thus, such noticeable irregularities cannot be measured. Rz is the maximum height, and thus, makes it possible to measure noticeable irregularities. Accordingly, Ra is used to know the size of the surface area, and Rz is used to know the limit value of the irregularities.

The Rz and Ra can be measured as below-mentioned. First, a sample 5 mm×5 mm in size is cut out of a transparent laminate. Then, using an atomic force microscope (Atomic Force Microscope, AFM) SPM-9700 manufactured by Shimadzu Corporation, the surface shape of the sample is measured on software SPM manager in the On-Line (measurement) mode under the following conditions. Then, the Off-Line (analysis) mode is used for image processing. The resulting AFM image is analyzed to obtain the Rz (maximum height) and Ra (arithmetic average roughness) of each sample. The arithmetic average of the Rz values and the arithmetic average of the Rz/Ra values are each determined from each of 14 points in each sample, and these average values are regarded as Rz and Rz/Ra.

(AFM Measurement Conditions)

Measurement mode: phase

Scanning range: 5 μm×5 μm

Scanning rate: 0.2 Hz

Number of pixels: 512×512

Cantilever used: NCHR (resonance frequency, 320 kHz; and spring constant, 42 N/m) manufactured by NanoWorld AG (AFM Image Processing Conditions)

Slope correction: the average value in the X direction, face fit (automatic)

The indentation hardness ($H_{IT}$) at the surface 10A of the transparent laminate 10 is preferably 20 MPa or more and 100 MPa or less. The indentation hardness $H_{IT}$ is a value obtained by using an unloading curve to calculate a depth along which a measurement sample is in contact with an indenter (depth of contact), determining the area of contact from the depth of contact, and dividing the maximum load by the area of contact. The indentation hardness $H_{IT}$ of 20 MPa or more makes it more difficult for the surface 10A of the transparent laminate 10 to be scratched, and 100 MPa or less makes it possible to obtain favorable flexibility and favorable moldability. The indentation hardness $H_{IT}$ measured at the surface 10A of the transparent laminate 10 is preferably 25 MPa or more and 100 MPa or less, 30 MPa or more and 100 MPa or less, 20 MPa or more and 90 MPa or less, 25 MPa or more and 90 MPa or less, 30 MPa or more and 90 MPa, 20 MPa or more and 80 MPa or less, 25 MPa or more and 80 MPa or less, or 30 MPa or more and 80 MPa or less or less, and is particularly preferably 30 MPa or more and 80 MPa or less among these. In addition, the indentation hardness $H_{IT}$ may be 20 MPa or more and 30 MPa or less in terms of more enhancing the anti-fogging ability and affording moldability, and may be 80 MPa or more and 100 MPa or less in terms of enhancing the abrasion resistance.

The composite elastic modulus (Er) at the surface 10A of the transparent laminate 10 is preferably 0.15 GPa or more and 1.5 GPa or less. The composite elastic modulus Er is a value calculated from the slope of an unloading curve. The composite elastic modulus Er of 0.15 GPa or more makes it more difficult for the surface 10A of the transparent laminate 10 to be scratched, and 1.5 GPa or less makes it possible to obtain favorable flexibility and favorable moldability. The composite elastic modulus Er measured at the surface 10A of the transparent laminate 10 is preferably 0.16 GPa or more and 1.5 GPa or less, 0.17 GPa or more and 1.5 GPa or less, 0.15 GPa or more and 1.45 GPa or less, 0.16 GPa or more and 1.45 GPa or less, 0.17 GPa or more and 1.45 GPa or less, 0.15 GPa or more and 1.40 GPa or less, 0.16 GPa or more and 1.40 GPa or less, or 0.17 GPa or more and 1.40 GPa or less, and is particularly preferably 0.25 GPa or more and 1.00 G or less. In addition, the composite elastic modulus Er may be 0.15 GPa or more and 0.25 GPa or less in terms of more enhancing the anti-fogging ability and affording moldability, and may be 1.0 GPa or more and 1.5 GPa or less in terms of enhancing the abrasion resistance.

The indentation hardness $H_{IT}$ and the composite elastic modulus Er are measured by the below-mentioned method. First, a transparent laminate cut to 20 mm×20 mm in size is fixed to a commercially available slide glass via an adhesive resin (a product named "ARON ALPHA (registered trademark) for General Use", manufactured by Toagosei Co., Ltd.) in such a manner that the surface side of the transparent laminate is the upper face. Specifically, a drop of the adhesive resin is placed in the center of a slide glass 1 (a product named "Slide Glass (Strainer), 1-9645-11", manufactured by AS One Corporation). In this step, the adhesive resin is not spread over the slide glass, and one drop of the adhesive resin is applied in such a manner that the adhesive resin does not extend beyond the transparent laminate when pressed and spread as described below. Subsequently, the transparent laminate cut to the above-mentioned size is brought in contact with the slide glass in such a manner that the surface side of the transparent laminate is the upper side, and that the adhesive resin is located in the center of the transparent laminate. Then, the adhesive resin is pressed and spread between the slide glass 1 and the transparent laminate for temporary adhesion. Then, another new slide glass 2 is placed on the transparent laminate to obtain a laminate composed of the slide glass 1, the adhesive resin, the transparent laminate, and the slide glass 2. Subsequently, a weight of from 30 g to 50 g is left to stand on the slide glass 2 at room temperature for 12 hours. Then, the weight and the slide glass 2 are removed from the laminate, and the rest is used as a measurement sample. The four corners of the transparent laminate fixed with the adhesive resin may further be fixed with tape (a product named "Cello-tape (registered trademark)", manufactured by Nichiban Co., Ltd.). The measurement sample is fixed on the measurement stage of a microhardness tester (a product named "TI950 TriboIndenter", manufactured by Hysitron Inc.) placed horizontally on an anti-vibration table. The measurement sample may be fixed by any method, for example, by fixing the four edges of the slide glass 1 with a tape (a product named "Cello-tape (registered trademark)", manufactured by Nichiban Co., Ltd.) or the like as long as the measurement sample does not move. Additionally, in cases where the microhardness tester is equipped with an air suction system, the measurement sample may be fixed with the air suction system. After the measurement sample is fixed on the measurement stage of the microhardness tester, the indentation hardness $H_{IT}$ and composite elastic modulus Er of the surface of the transparent laminate are each measured under the following measurement conditions. The indentation hardness $H_{IT}$ and the composite elastic modulus Er are measured at five points freely selected at or near the center (the region where the adhesive resin exists) of the surface of the transparent laminate as the measurement sample to determine the arithmetic average of the resulting five hardness values. However, the five points to be freely selected for measurement should be selected from a portion as flat as possible in the transparent laminate by observing the transparent laminate at a magnification of 50 to 500 times under a microscope accessory to the TI950 TriboIndenter, avoiding areas with extreme protrusions and areas with extreme depressions on the contrary.

(Measurement Conditions)

Indenter shape: Berkovich

Load control mode: up to a maximum of 40 mN

Loading time: 4 seconds

Creep time: 5 seconds

Unloading time: 4 seconds

Measurement temperature: 25° C.

Measurement humidity: 50%

The contact angle with water on the surface 10A of the transparent laminate 10 is preferably 90° or more. That is, the surface 10A of the transparent laminate 10 is preferably hydrophobic. This contact angle of less than 90°, which represents higher fittability with water, will undesirably lead to increasing the water absorptiveness (moisture absorptiveness), resulting in distorting or expanding the functional layer and the base material. In cases where this contact angle is 90° or more, water droplets, even if generated, will not be collected on the surface but run down, and a smudge such as a fingerprint is less likely to be left during processing. The contact angle with water on the surface 10A of the transparent laminate 10 is measured using a microscopic contact angle meter (a product named "DropMaster 300", manufactured by Kyowa Interface Science Co., Ltd.) in accordance with the sessile drop method described in JIS R3257: 1999. Specifically, a sample 25 mm×30 mm in size is first cut out of a transparent laminate 10. Then, this sample is flatly bonded onto a slide glass 50 mm×125 mm in size with a double-sided tape. Accordingly, the resulting object is a laminate composed of the slide glass, the double-sided tape, and the sample. Subsequently, the sample is exposed to ions from an ionizer (for example, a product named "KD-730B", manufactured by Kasuga Denki, Inc.) for 30 seconds to eliminate static electricity on the sample and thereby to prevent static electricity on the sample from influencing the measurement result. After the static electricity is eliminated, 1 μL of water is dropped onto the surface of the sample (the surface of the low-refractive-index layer) using a syringe, and is left to stand for 5 seconds. Then, the microscopic contact angle meter is switched on to measure the contact angle with water. The contact angle is measured in an environment of a temperature of 20° C. or more and 25° C. or less and a relative humidity of 40% or more and 70% or less. The contact angle is measured at 10 different points, and the arithmetic average of the measured values is regarded as the contact angle of the surface 10A of the transparent laminate 10. The contact angle with water on the surface 10A of the transparent laminate 10 is more preferably 90° or more and 130° or less, 90° or more and 125° or less, 90° or more and 120° or less, 92° or more and 130° or less, 92° or more and 125° or less, 92° or more and 120° or less, 95° or more and 130° or less, 95° or more and 125° or less, or 95° or more and 120° or less.

The transparent laminate 10 preferably has a total light transmittance of 90% or more. The transparent laminate 10 having a total light transmittance of 90% or more makes it possible to obtain a sufficient optical performance. The transparent laminate 10 more preferably has a total light transmittance of 91% or more, or 92% or more. The upper limit of the total light transmittance of the transparent laminate 10 is 100% or less.

The total light transmittance can be measured using a haze meter (for example, a product named "HM-150", manufactured by Murakami Color Research Laboratory Co., Ltd.) by a method based on JIS K7361-1:1997 in an environment of a temperature of 23±5° C. and a relative humidity of 30% or more and 70% or less. The total light transmittance is determined as the arithmetic average of three measurements obtained from a sample 50 mm×100 mm in size cut out of a transparent laminate 10 and set without any curl or wrinkle and without any fingerprint or dirt, in which the three measurements are made per sample. As used herein, the phrase "three measurements" refers not to three measurements made at the same point but to three measurements made at three different points. In the transparent laminate 10, the surface 10A is flat by visual observation, and the laminated layers such as the functional layer 12 are also flat. In addition, the deviation of film thickness is also within +10%. Accordingly, it is considered that an approximate average total light transmittance of the whole surface of the transparent laminate can be obtained by measuring the total light transmittance at three different points of the cut-out sample. In cases where a sample having the above-mentioned size cannot be cut out of the transparent laminate, a sample 22 mm×22 mm or larger may be suitably cut out. In cases where the sample is smaller in size, three points of measurement should be secured by gradually shifting or turning the sample to such an extent that the light source spot is within the sample.

The transparent laminate 10 preferably has a haze value (total haze value) of 1% or less. The transparent laminate 10 having a haze value of 1% or less makes it possible to obtain sufficient optical performance and transparency. The haze value can be measured using a haze meter (a product named "HM-150", manufactured by Murakami Color Research Laboratory Co., Ltd.) by a method based on JIS K7136:2000 in an environment of a temperature of 23±5° C. and a relative humidity of 30% or more and 70% or less. Specifically, the haze value is measured by the same method as the total light transmittance. The arithmetic average of three measurements is regarded as the haze value. The transparent laminate 10 more preferably has a haze value of 0.8% or less, or 0.5% or less. The lower limit of the haze value of the transparent laminate 10 is 0% or more.

The surface 10A of the transparent laminate 10 preferably has a pencil hardness of H or harder. The surface 10A of the transparent laminate 10, having a pencil hardness of H or harder, makes it possible to enhance the durability. The pencil hardness test should be performed as follows: using a pencil hardness testing machine (a product named "Pencil Scratch Hardness Tester (electric type)", manufactured by Toyo Seiki Seisaku-sho, Ltd.), a pencil (a product named "uni", manufactured by Mitsubishi Pencil Co., Ltd.) is moved on the surface of a sample 50 mm×100 mm in size cut out of a transparent laminate 10, at a moving speed of 1.4 mm/second, in an environment of a temperature of 23±5° C. and a relative humidity of 30% or more and 70% or less while a load of 500 g is applied to the pencil. The grade of the hardest pencil that does not scratch the surface 10A of the transparent laminate 10 during the pencil hardness test is regarded as the pencil hardness of the surface. Different pencils with different hardnesses are used for the measurement of pencil hardness, and the pencil hardness test is repeated five times per pencil. In cases where no scratch is made on the surface 10A of the transparent laminate 10 in four or more out of the five repeats, the pencil with the hardness is judged as making no scratch on the surface 10A of the transparent laminate 10. The scratch refers to that which is visibly detectable when the surface 10A of the transparent laminate 10 subjected to the pencil hardness test is observed under transmitting fluorescent light.

The thickness (total thickness) of the transparent laminate 10 varies depending on the use of the transparent laminate 10. In cases where the transparent laminate 10 is used for an image display device, the transparent laminate 10 preferably has a thickness of 25 μm or more and 400 μm or less. This thickness provides easy handling (for example, favorable processability) as well as a sufficient function (for example, for making it more difficult to deform the transparent laminate 10 depending on the humidity and the temperature, thus maintaining the flatness that enables an image to be seen clearly) necessary for an image display device.

In cases where the transparent laminate 10 is used for a facial transparent protector, the transparent laminate 10 is required to be thinner and lighter, and thus, the transparent laminate 10 preferably has a thickness of 400 μm or less. In this use, the transparent laminate having too small a thickness is prone to be deformed, and is poorer in processability and handleability during wear. In addition, a long time wear causes a sense of discomfort in some cases. To inhibit this and make an attempt at more thinness and more lightness, the thickness of the transparent laminate 10 is more preferably 30 μm or more and 400 μm or less, 40 μm or more and 400 μm or less, 25 μm or more and 300 μm or less, 30 μm or more and 300 μm or less, 40 μm or more and 300 μm or less, 25 μm or more and 200 μm or less, 30 μm or more and 200 μm or less, or 40 μm or more and 200 μm or less.

In cases where the transparent laminate 10 is used for a transparent partition, the transparent laminate 10 is required to be transparent and handleable for hand carry and the like, and thus, the transparent laminate 10 preferably has a thickness of 10000 μm or less. In terms of obtaining a self-standing ability and a degree of strength, and obtaining a more favorable transparency and a more favorable handleability, the thickness of the transparent laminate 10 for this use is more preferably 500 μm or more and 10000 μm or less, 1000 μm or more and 10000 μm or less, or 3000 μm or more and 10000 μm or less, 500 μm or more and 9000 μm or less, 1000 μm or more and 9000 μm or less, 3000 μm or more and 9000 μm or less, 500 μm or more and 8000 μm or less, 1000 μm or more and 8000 μm or less, 3000 μm or more and 8000 μm or less, 500 μm or more and 5000 μm or less, 1000 μm or more and 5000 μm or less, or 3000 μm or more and 5000 μm or less.

In cases where the transparent laminate 10 is used for a transparent film curtain, the transparent laminate 10 is required to provide easiness of attachment (handleability), lightness, flexibility, and strength, and thus, the transparent laminate 10 preferably has a thickness of 3000 μm or less. With the transparent film curtain, the easiness of attachment encompasses, for example, allowing the transparent film curtain to be less prone to break, for example, when the transparent film curtain is cut, perforated, or attached. In terms of obtaining a more favorable handleability and a more favorable strength and in terms of making an attempt at lightness and obtaining a favorable transparency, the thickness of the transparent laminate 10 for this use is more preferably 25 μm or more and 3000 μm or less, 30 μm or more and 3000 μm or less, 40 μm or more and 3000 μm or less, 25 μm or more and 800 μm or less, 30 μm or more and 800 μm or less, 40 μm or more and 800 μm or less, 25 μm or more and 400 μm or less, 30 μm or more and 400 μm or less, 40 μm or more and 400 μm or less, 25 μm or more and 200 μm or less, 30 μm or more and 200 μm or less, 40 μm or more and 200 μm or less.

The thickness of the transparent laminate 10 is determined as the arithmetic average of the thickness values at 10 different points on the transparent laminate 10, in which the thickness values are measured at the 10 different points, for example, using a thickness measurement device (a product named "Digimatic Indicator IDF-130", manufactured by Mitutoyo Corporation).

The weight (total weight) of the transparent laminate 10 varies depending on the use of the transparent laminate 10. In cases where the transparent laminate 10 is used for an image display device, the transparent laminate 10 preferably has a weight of 30 g/m$^2$ or more and 500 g/m$^2$ or less. Such a weight provides easiness of handling (for example, favorable processability) as well as a sufficient function.

In cases where the transparent laminate 10 is used for a facial transparent protector, the transparent laminate 10 is required to be thinner and lighter, and thus, the transparent laminate 10 preferably has a weight of 500 g/m$^2$ or less. In this use, the transparent laminate having too small a thickness is prone to be deformed, and is poorer in processability in some cases. To inhibit this and make an attempt at more thinness and more lightness, the weight of the transparent laminate 10 is more preferably 35 g/m$^2$ or more and 500 g/m$^2$ or less, 40 g/m$^2$ or more and 500 g/m$^2$ or less, or 45 g/m$^2$ or more and 500 g/m$^2$ or less, 35 g/m$^2$ or more and 400 g/m$^2$ or less, 40 g/m$^2$ or more and 400 g/m$^2$ or less, 45 g/m$^2$ or more and 400 g/m$^2$ or less, 35 g/m$^2$ or more and 350 g/m$^2$ or less, 40 g/m$^2$ or more and 350 g/m$^2$ or less, 45 g/m$^2$ or more and 350 g/m$^2$ or less, 35 g/m$^2$ or more and 300 g/m$^2$ or less, 40 g/m$^2$ or more and 300 g/m$^2$ or less, or 45 g/m$^2$ or more and 300 g/m$^2$ or less.

In cases where the transparent laminate 10 is used for a transparent partition, the transparent laminate 10 is required to be transparent and handleable, and thus, the transparent laminate 10 preferably has a weight of 10000 g/m$^2$ or less. In terms of obtaining a self-standing ability and a degree of strength, and obtaining a more favorable transparency and a more favorable handleability, the weight of the transparent laminate 10 for this use is more preferably 100 g/m$^2$ or more and 10000 g/m$^2$ or less, 200 g/m$^2$ or more and 10000 g/m$^2$ or less, or 500 g/m$^2$ or more and 10000 g/m$^2$ or less, 100 g/m$^2$ or more and 7000 g/m$^2$ or less, 200 g/m$^2$ or more and 7000 g/m$^2$ or less, 500 g/m$^2$ or more and 7000 g/m$^2$ or less, 100 g/m$^2$ or more and 6000 g/m$^2$ or less, 200 g/m$^2$ or more and 6000 g/m$^2$ or less, 500 g/m$^2$ or more and 6000 g/m$^2$ or less, 100 g/m$^2$ or more and 5000 g/m$^2$ or less, 200 g/m$^2$ or more and 5000 g/m$^2$ or less, or 500 g/m$^2$ or more and 5000 g/m$^2$ or less.

In cases where the transparent laminate 10 is used for a transparent film curtain, the transparent laminate 10 is required to provide easiness of attachment (handleability), lightness, flexibility, and strength, and thus, the transparent laminate 10 preferably has a weight of 2000 g/m$^2$ or less. In terms of obtaining a more favorable handleability and a more favorable strength and in terms of making an attempt at lightness and obtaining a favorable transparency, the weight of the transparent laminate 10 for this use is more preferably 50 g/m$^2$ or more and 2000 g/m$^2$ or less, 100 g/m$^2$ or more and 2000 g/m$^2$ or less, or 200 g/m$^2$ or more and 2000 g/m$^2$ or less, 50 g/m$^2$ or more and 1700 g/m$^2$ or less, 100 g/m$^2$ or more and 1700 g/m$^2$ or less, 200 g/m$^2$ or more and 1700 g/m$^2$ or less, 50 g/m$^2$ or more and 1600 g/m$^2$ or less, 100 g/m$^2$ or more and 1600 g/m$^2$ or less, 200 g/m$^2$ or more and 1600 g/m$^2$ or less, 50 g/m$^2$ or more and 1500 g/m$^2$ or less, 100 g/m$^2$ or more and 1500 g/m$^2$ or less, 200 g/m$^2$ or more and 1500 g/m$^2$ or less.

<Base Material>

The thickness of the base material 11 varies depending on the use. For example, in cases where the transparent laminate 10 is used for an image display device, the base material 11 preferably has a thickness of 25 μm or more and 300 μm or less. The base material 11 having a thickness of 25 μm or more achieves a high hardness, and in addition, makes it possible to inhibit curl, thus providing easiness of processing. In addition, the base material 11 having a thickness of 300 μm or less makes it possible to inhibit a rise in cost, and does not cause too large a weight increase, providing easiness of handling. In terms of obtaining an excellent hardness and making an attempt at more lightness, the thickness of the base material 11 is more preferably 30 μm or more and 300 μm, 40 μm or more and 300 μm, 50 μm or more and 300 μm, 25 μm or more and 200 μm or less, 30 μm or more and 200 μm or less, 40 μm or more and 200 μm or less, 50 μm or more and 200 μm or less, 25 μm or more and 150 μm or less, 30 μm or more and 150 μm or less, 40 μm or more and 150 μm or less, 50 μm or more and 150 μm or less, 25 μm or more and 100 μm or less, 30 μm or more and 100 μm or less, 40 μm or more and 100 μm or less, or 50 μm or more and 100 μm or less.

In cases where the transparent laminate 10 is used for a facial transparent protector, the base material 11 preferably has a thickness of 20 μm or more and 200 μm or less. The base material 11 having a thickness of 20 μm or more has a sufficient performance and provides a favorable usage feeling and handleability. In addition, the base material 11 having a thickness of 200 μm or less makes it possible to inhibit a rise in cost, and is light and easy to process. In terms of obtaining a more favorable handleability and making an attempt at more lightness, the thickness of the base material 11 is more preferably 25 μm or more and 200 μm or less, 40 μm or more and 200 μm or less, 50 μm or more and 200 μm or less, 20 μm or more and 150 μm or less, 25 μm or more and 150 μm or less, 40 μm or more and 150 μm or less, 50 μm or more and 150 μm or less, 20 μm or more and 100 μm or less, 25 μm or more and 100 μm or less, 40 μm or more and 100 μm or less, 50 μm or more and 100 μm or less, 20 μm or more and 80 μm or less, 25 μm or more and 80 μm or less, 40 μm or more and 80 μm or less, or 50 μm or more and 80 μm or less.

In cases where the transparent laminate 10 is used for a transparent partition, the base material 11 preferably has a thickness of 20 μm or more and 9500 μm or less. The base material 11 having a thickness of 20 μm or more makes it possible to obtain a favorable handleability as well as to have a sufficient performance. In addition, the base material 11 having a thickness of 9500 μm or less makes it possible to obtain a favorable transparency (a light-transmitting ability). In terms of obtaining a self-standing ability and a degree of strength, and obtaining a more favorable transparency (a light-transmitting ability) and a more favorable handleability, the thickness of the base material 11 is more preferably 450 μm or more and 9500 μm or less, 950 μm or more and 9500 μm or less, 2500 μm or more and 9500 μm or less, 20 μm or more and 6500 μm or less, 450 μm or more and 6500 μm or less, 950 μm or more and 6500 μm or less, 2500 μm or more and 6500 μm or less, 20 μm or more and 5500 μm or less, 450 μm or more and 5500 μm or less, 950 μm or more and 5500 μm or less, 2500 μm or more and 5500 μm or less, 20 μm or more and 4500 μm or less, 450 μm or more and 4500 μm or less, 950 μm or more and 4500 μm or less, 2500 μm or more and 4500 μm or less.

In cases where the transparent laminate 10 is used for a transparent film curtain, the thickness of the base material 11 is preferably 20 μm or more and 2500 μm or less. The base material 11 having a thickness of 20 μm or more makes it possible to obtain a favorable handleability and a favorable strength. In addition, the base material 11 having a thickness of 2500 μm or less makes it possible to obtain a favorable lightness and a favorable transparency. In terms of obtaining a more favorable handleability and a more favorable strength and in terms of making an attempt at more lightness and obtaining a more favorable transparency, the thickness of the base material 11 is more preferably 25 μm or more and 2500 μm or less, 30 μm or more and 2500 μm or less, 40 μm or more and 2500 μm or less, 20 μm or more and 750 μm or less, 25 μm or more and 750 μm or less, 30 μm or more and 750 μm or less, 40 μm or more and 750 μm or less, 20 μm or more and 550 μm or less, 25 μm or more and 550 μm or less, 30 μm or more and 550 μm or less, 40 μm or more and 550 μm or less, 20 μm or more and 350 μm or less, 25 μm or more and 350 μm or less, 30 μm or more and 350 μm or less, or 40 μm or more and 350 μm or less.

The thickness of the base material 11 can be determined as the arithmetic average of the thickness values at 10 points on the base material 11, in which the thickness values are measured at the 10 points on a cross-sectional image of the base material 11 photographed using a scanning electron microscope (SEM). Specifically, the method of photographing the cross-sectional image should be as below-mentioned. First, a sample 1 mm×10 mm in size is cut out of a transparent laminate 10. The sample cut out is embedded in an embedding resin to produce a block. Then, out of this block, a homogeneous section(s) having a thickness of 70 nm or more and 100 nm or less and having no opening or the like is/are cut out according to a common sectioning technique. For the production of the section(s), for example, an Ultramicrotome EM UC7 manufactured by Leica Microsystems GmbH is used. Then, the block remaining after cutting out the homogeneous section(s) with no opening or the like is used as a measurement sample. Subsequently, a cross-sectional image of the measurement sample is photographed using a scanning electron microscope (SEM) (a product named "S-4800" manufactured by Hitachi High-Technologies Corporation). When the cross-sectional image is photographed using the above-mentioned S-4800, the cross-section is observed with the detector, the accelerating voltage, and the emission current set at "SE," "5 kV," and "10 μA" respectively. The focus, contrast, and brightness are appropriately adjusted at a magnification of 100 to 100,000 times so that each layer can be identified by observation. Furthermore, the beam monitor aperture, the objective lens aperture, and the WD are set at "3," "3," and "8 mm" respectively. The image should be photographed with a scanning electron microscope at a magnification suitable for the thickness of the base material, at which magnification the interfacial boundary between the base material and the functional layer is clearly delineated. Specifically, the magnification is set appropriately depending on the thickness of the base material, as the magnification is set, for example, at 1,000 times for 50 μm as the thickness of the base material and at 500 times for 100 μm. The base material 11 preferably has a deviation in thickness within 15% or less, 10% or less, or 7% or less. The lower limit of the deviation in the thickness of the base material 11 is 0% or more.

The constituent materials of the base material 11 are not subject to any particularly limitation as long as such materials are light-transmitting. Examples of such materials include glasses or resins (for example, acetyl cellulose resins, cycloolefin polymer resins, polycarbonate resins, acrylic resins, or polyester resins). Using a polyester resin, such as polyethylene terephthalate, or a polycarbonate resin as a constituent material of the base material 11 is advantageous in that such a material is suitable for a large display, is less prone to crack when dropped, has a favorable durability when used repeatedly, and in addition, has an excellent stiffness. In addition, using an acetyl cellulose resin such as triacetyl cellulose as a constituent material of the base material 11 is advantageous in that such a material is rich in flexibility, and has an excellent anti-fogging function because the base material itself tends to dehydrate.

Examples of glasses include soda-lime-silica glass, borosilicate glass, non-alkali glass, and the like.

Examples of acetyl cellulose resins include triacetyl cellulose (TAC) and diacetyl cellulose. Triacetyl cellulose is a resin capable of having an average light transmittance of 50% or more in the visible light range of from 380 to 780 nm. Triacetyl cellulose preferably has an average light transmittance of 50% or more, 70% or more, or 85% or more. The upper limit of the average light transmittance of triacetyl cellulose is 100% or less.

In this regard, a base material composed of a triacetyl cellulose resin may be not only pure triacetyl cellulose but also a material in which a component other than acetic acid is used in combination as a fatty acid for forming an ester with cellulose, examples of such materials including cellulose acetate propionate and cellulose acetate butyrate. To such a triacetyl cellulose, another cellulose-lower fatty acid ester, such as diacetyl cellulose, or any kind of additive may be added, if necessary, examples of such additives including a plasticizer, an ultraviolet absorber, and a lubricant.

Examples of cycloolefin polymer resins include norbornene resins, monocyclic cycloolefin resins, cyclic conjugated diene resins, or vinyl alicyclic hydrocarbon resins. Examples of cycloolefin copolymer resins include copolymers composed of ethylene and a norbornene monomer, and copolymers composed of ethylene and tetracyclododecene.

Examples of polycarbonate resins include aromatic polycarbonate resins based on a bisphenol (such as bisphenol A), and aliphatic polycarbonate resins such as diethylene glycol bis(allyl carbonate).

Examples of acrylic resins include poly(methyl (meth) acrylate) resins, poly(ethyl (meth)acrylate) resins, and methyl (meth)acrylate-butyl (meth)acrylate copolymer resins.

Examples of polyester resins include resins containing, as a constituent component, at least one of polyethylene terephthalate (PET), polypropylene terephthalate, polybutylene terephthalate, and polyethylene naphthalate.

<Functional Layer>

The functional layer 12 is a layer that performs a function in the transparent laminate 10. The anti-fogging function is performed mainly in the functional layer, and besides the anti-fogging function, a hard coat function may be performed therein. The "functional layer" in the present embodiment has a monolayer structure. The functional layer 12 depicted in FIG. 1 is that which performs the anti-fogging function and the hard coat function, and accordingly, the functional layer 12 will be described as an anti-fogging hard coat layer.

The functional layer 12 is an anti-fogging hard coat layer, and thus, is a layer that affords hardness to the transparent laminate 10 to achieve a pencil hardness of "H" or harder at the surface 10A of the transparent laminate 10 (the surface 13A of the low-refractive-index layer 13). The functional layer 12 is formed on the first face 11A of the base material 11 as depicted in FIG. 1.

The refractive index of the functional layer 12 is not subject to any particular limitation as long as the refractive index is higher than the refractive index of the low-refractive-index layer 13, and may be, for example, 1.45 or more and 1.60 or less. As used herein, a "refractive index" means a refractive index at a wavelength of 550 nm. The refractive index of the functional layer 12 may be 1.48 or more and 1.60 or less, 1.45 or more and 1.57 or less, or 1.48 or more and 1.57 or less.

The refractive index of the functional layer 12 or the low-refractive-index layer 13 can be measured or calculated, for example, by using the following technique after determining, from a cross-sectional image of the transparent laminate, whether the film thickness of each layer is more than 780 nm or 780 nm or less.

For the refractive index of a layer having a film thickness of more than 780 nm, the refractive index of the binder component of this layer is regarded as the refractive index of this layer. The refractive index of a layer (for example, the functional layer 12) having a film thickness of more than 780 nm can be measured, for example, by the Becke method. The "Becke method" is a technique that is as follows: a layer as an object of measurement of a refractive index is sliced off using a cutter or the like; a sample containing a binder component in a powdery state is produced; and the refractive index is measured in accordance with the B method (for powdery or granular transparent materials) in JIS K7142: 2008. In cases where the refractive index of a layer is measured by the Becke method, the refractive index of the layer is determined as the arithmetic average of the refractive index measurement values of 10 samples, in which the refractive index of each of the 10 samples is measured by the Becke method.

From a layer having a film thickness of 780 nm or less, it is difficult to collect a binder component. Because of this, the refractive index of a layer (for example, the low-refractive-index layer) having a film thickness of 780 nm or less can be calculated in accordance with the following (procedure 1) and (procedure 2) in this order, for example, using a transparent laminate containing a layer having a thickness of 780 nm or less.

(Procedure 1) From a cross-sectional image of a transparent laminate, the film thickness of a layer having a film thickness of more than 780 nm and the film thickness of a layer having a film thickness of 780 nm or less are calculated. Then, the refractive index of the layer having a film thickness of more than 780 nm, among the constituent layers of the transparent laminate, is calculated by the above-mentioned Becke method.

(Procedure 2) The refractive index of the layer having a film thickness of 780 nm or less is calculated by the fitting method using the information on the refractive index and film thickness of the layer having a film thickness of more than of 780 nm, which are calculated in the (procedure 1), and the information on the film thickness of the layer having a film thickness of 780 nm or less. The "fitting method" is a technique of calculation by fitting between the reflection spectrum measured with a reflection photometer and the reflection spectrum calculated from an optical model of a multilayer thin film using a Fresnel coefficient.

A ratio of the film thickness of the functional layer 12 to the film thickness of the low-refractive-index layer 13 (the film thickness of the functional layer 12/the film thickness of the low-refractive-index layer 13) is preferably 30 or more. With this ratio of 30 or more, the film thickness of the functional layer 12 is not too small, and the film thickness of the low-refractive-index layer 13 is not too large, thus making it possible to attempt to achieve both a favorable hardness and a favorable antireflection ability. In terms of obtaining an excellent hardness and an excellent antireflection ability and in terms of inhibiting a rise in cost, a decrease in transparency, or a decrease in processability, this ratio is more preferably 30 or more and 250 or less, 35 or more and 250 or less, 40 or more and 250 or less, 45 or more and 250 or less, 30 or more and 200 or less, 35 or more and 200 or less, 40 or more and 200 or less, 45 or more and 200 or less, 30 or more and 150 or less, 35 or more and 150 or less, 40 or more and 150 or less, 45 or more and 150 or less, 30 or more and 100 or less, 35 or more and 100 or less, 40 or more and 100 or less, or 45 or more and 100 or less.

The functional layer 12 preferably has a film thickness of 3 μm or more. The functional layer 12 having a film thickness of 3 μm or more makes it possible to obtain a desired hardness, and to allow the functional layer 12 to contain a desired amount of an anti-fogging material. In terms of obtaining an excellent hardness and in terms of inhibiting a rise in cost, a decrease in transparency, or a decrease in processability, the thickness of the functional layer 12 is more preferably 3 μm or more and 25 μm or less, 3.5 μm or more and 25 μm or less, 4 μm or more and 25 μm or less, 4.5 μm or more and 25 μm or less, 3 μm or more and 20 μm or less, 3.5 μm or more and 20 μm or less, 4 μm or more and 20 μm or less, 4.5 μm or more and 20 μm or less, 3 μm or more and 15 μm or less, 3.5 μm or more and 15 μm or less, 4 μm or more and 15 μm or less, 4.5 μm or more and 15 μm or less, 3 μm or more and 10 μm or less, 3.5 μm or more and 10 μm or less, 4 μm or more and 10 μm or less, 4.5 μm or more and 10 μm or less, 3 μm or more and 10 μm less than, 3.5 μm or more and 10 μm less than, 4 μm or more and 10 μm less than, 4.5 μm or more and 10 μm less than, 3 μm or more and 9.5 μm or less, 3.5 μm or more and 9.5 μm or less, or 4 μm or more and 9.5 μm or less, 4.5 μm or more and 9.5 μm or less.

The film thickness of the functional layer 12 is determined as the arithmetic average of the film thickness values at 20 different points on a cross-sectional image of the functional layer 12, in which the film thickness values are measured at the 20 different points on the cross-sectional image of the functional layer 12 photographed using a scanning transmission electron microscope (STEM) or a transmission electron microscope (TEM). A specific method of photographing a cross-sectional image is described below. First, a piece 1 mm×10 mm in size cut out of a transparent laminate is embedded in an embedding resin to produce a block, and out of this block, a homogeneous section having a thickness of 70 nm or more and 100 nm or less and having no opening or the like is cut out according to a common sectioning technique. For the production of the section, for example, an Ultramicrotome EM UC7 manufactured by Leica Microsystems GmbH or the like can be used. Then, this homogeneous section having no opening or the like is used as a measurement sample. Subsequently, a cross-sectional image of the measurement sample is photographed using a scanning transmission electron microscope (STEM) (a product named "S-4800" manufactured by Hitachi High-Technologies Corporation). When the cross-sectional image is photographed using the above-mentioned S-4800, the cross-section is observed with the detector, the accelerating voltage, and the emission current set at "TE," "30 KV," and "10 μA" respectively. The focus, contrast, and brightness are appropriately adjusted at a magnification of 5,000 to 200,000 times so that each layer can be identified by observation. The magnification is preferably 10,000 times to 100,000 times, more preferably 10,000 times to 50,000 times, most preferably 25,000 times to 50,000 times. When the cross-sectional image is photographed using the above-mentioned S-4800, the beam monitor aperture, the objective lens aperture, and the WD may be set at "3," "3," and "8 mm" respectively. For the measurement of the film thickness of the functional layer, it is important that the contrast at the interfacial boundary between the functional layer and another layer (for example, a base material) can be observed as clearly as possible when the cross-section is observed. If this interfacial boundary is difficult to observe owing to lack of contrast, a staining process may be applied because an interfacial boundary between organic layers become easily observed by application of a staining process with osmium tetraoxide, ruthenium tetraoxide, phosphotungstic acid, or the like. Additionally, a higher magnification makes it more difficult to find the interfacial contrast in some cases. In this case, the observation is carried out also at a lower magnification. For example, the functional layer is observed at two different magnifications consisting of a higher magnification, such as 25,000 or 50,000 times, and a lower magnification, such as 50,000 or 100,000 times, to determine the above-mentioned arithmetic averages at both of the magnifications, which are further averaged to determine the film thickness of the functional layer.

The functional layer 12 can be composed, for example, of a resin. The resin contains a polymer (cross-linked product) of a polymerizable compound and an anti-fogging material. The functional layer 12 preferably contains particles in addition to the resin to have an enhanced hardness. The resin may contain a solvent-evaporation type resin in addition to a polymer (cross-linked product) of a polymerizable compound and an anti-fogging material.

The functional layer 12 preferably contains a hydrophilic group, examples of which include: a hydroxyl group; a carboxyl group; an alkylene oxide group such as an ethylene oxide group; an amino group; and a quaternary ammonium base such as an ammonium chloride group. The functional layer 12 having a hydrophilic group can be obtained by inclusion of an anti-fogging material. The functional group can be verified, for example, by Fourier transform infrared spectroscopy (an FT-IR method).

(Polymerizable Compound)

The polymerizable compound refers to a compound having at least one polymerizable functional group in the molecule. Examples of polymerizable compounds include ionizing-radiation-polymerizable compounds and/or thermopolymerizable compounds. The ionizing-radiation-polymerizable compound refers to a compound having at least one ionizing-radiation-polymerizable functional group in one molecule. The term "ionizing-radiation-polymerizable functional group" as used herein refers to a functional group which can undergo ionizing-radiation-induced polymerization. Examples of ionizing-radiation-polymerizable functional groups include ethylenic unsaturated groups such as a (meth)acryloyl group, vinyl group, and allyl group. A "(meth)acryloyl group" encompasses both an "acryloyl group" and a "methacryloyl group." In addition, the types of ionizing radiation applied to induce polymerization of an ionizing-radiation-polymerizable compound include visible light, ultraviolet light, X rays, electron beams, $\alpha$ rays, $\beta$ rays, and $\gamma$ rays.

Examples of ionizing-radiation-polymerizable compounds include ionizing-radiation-polymerizable monomers, ionizing-radiation-polymerizable oligomers, and ionizing-radiation-polymerizable prepolymers, and these compounds can be prepared as appropriate for use. A combination of an ionizing-radiation-polymerizable monomer and an ionizing-radiation-polymerizable oligomer or an ionizing-radiation-polymerizable prepolymer is preferable as the ionizing-radiation-polymerizable compound.

Examples of ionizing-radiation-polymerizable compounds include ionizing-radiation-polymerizable monomers, ionizing-radiation-polymerizable oligomers, and ionizing-radiation-polymerizable polymers, and these compounds can be prepared as appropriate for use.

The ionizing-radiation-polymerizable monomer is preferably a polyfunctional monomer having two or more polymerizable functional (that is, bifunctional or more polyfunctional) groups. Examples of polyfunctional monomers include trimethylolpropane tri(meth)acrylate, tripropylene glycol di(meth)acrylate, diethylene glycol di(meth)acrylate, dipropylene glycol di(meth)acrylate, pentaerythritol tri (meth)acrylate, pentaerythritol tetra(meth)acrylate, dipentaerythritol hexa(meth)acrylate, 1,6-hexanediol di(meth) acrylate, neopentyl glycol di(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri (meth)acrylate, isocyanuric acid di(meth)acrylate, polyester tri(meth)acrylate, polyesterdi(meth)acrylate, bisphenol di(meth)acrylate, diglycerine tetra(meth)acrylate, adamantyl di(meth)acrylate, isobornyl di(meth)acrylate, dicyclopentane di(meth)acrylate, tricyclodecane di(meth)acrylate, and these compounds modified with PO, EO, or the like.

Among these, trimethylolpropane tri(meth)acrylate, dipentaerythritol hexa(meth)acrylate, 1,6-hexanediol di(meth)acrylate, and the like are preferable in terms of compatibility with an anti-fogging material.

The ionizing-radiation-polymerizable oligomer is preferably a bifunctional or more polyfunctional oligomer. Examples of polyfunctional oligomers include polyester (meth)acrylate, urethane (meth)acrylate, polyester-urethane (meth)acrylate, polyether (meth)acrylate, polyol (meth) acrylate, melamine (meth)acrylate, isocyanurate (meth) acrylate, and epoxy (meth)acrylate.

The ionizing-radiation-polymerizable prepolymer preferably has a weight-average molecular weight of 3000 or more, and more preferably 3000 or more and 80000 or less, 3000 or more and 40000 or less, 10000 or more and 80000 or less, 10000 or more and 40000 or less. In cases where the polymerizable prepolymer has a weight-average molecular weight of more than 80,000, the coating suitability is reduced owing to the high viscosity of the prepolymer, whereby the appearance of the resulting transparent laminate will be undesirably worsened. Examples of the prepolymer include urethane (meth)acrylate, isocyanurate (meth)acrylate, polyester-urethane (meth)acrylate, and epoxy (meth) acrylate. As used herein, the "weight-average molecular weight" is measured by gel permeation chromatography (GPC) as a value in terms of polystyrene.

The thermopolymerizable compound refers to a compound having at least one thermopolymerizable functional group in one molecule. The term "thermopolymerizable functional group" as used herein refers to a functional group which can undergo heat-induced polymerization with the same type of functional group or with another type of functional group. Examples of thermopolymerizable functional groups include: cyclic ether groups such as an epoxy group; a hydroxyl group; an isocyanate group; an amino group; and the like.

Examples of thermopolymerizable compounds include, but are not limited particularly to, epoxy compounds, polyol compounds, isocyanate compounds, melamine compounds, urea compounds, phenol compounds, and the like.

The solvent-evaporation type resin refers to a resin, such as a thermoplastic resin, which forms a coating film just by evaporation of a solvent added to the resin to adjust the solid content in a coating process. In forming the functional layer 12, addition of a solvent-evaporation type resin can effectively prevent failure in coating on a surface where a coating liquid is applied. The solvent-evaporation type resin is not limited to a particular resin, and as this resin, a thermoplastic resin can generally be used.

Examples of thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, rubbers or elastomers, and the like.

The thermoplastic resin is preferably amorphous and soluble in an organic solvent (particularly, a common solvent which can generally dissolve a plurality of polymers or curable compounds). In particular, for example, styrenic resins, (meth)acrylic resins, alicyclic olefinic resins, polyester resins, and cellulose derivatives (such as cellulose esters) are preferable in terms of transparency and weather resistance.

(Anti-Fogging Material)

The anti-fogging material is a material for inhibiting the surface 10A of the transparent laminate 10 from being fogged. The anti-fogging material may be a resin. The amount of the anti-fogging material in the functional layer 12 is preferably 10% by mass or more and 85% by mass or less. Containing the anti-fogging material in an amount of 10% by mass or more makes it possible to obtain a sufficient anti-fogging ability, and containing the anti-fogging material in an amount of 85% by mass or less makes it possible to obtain a sufficient hardness and transparency. The amount of the anti-fogging material contained in the functional layer 12 is preferably 30% by mass or more and 85% % by mass or less, 50% by mass or more and 85% by mass or less, or 70% by mass or more and 85% by mass or less. In this regard, increasing the amount of the anti-fogging material makes it possible to enhance the moldability and the bendability. Thus, for the purpose of enhancing the moldability and the bendability, the amount of the anti-fogging material contained in the functional layer 12 is preferably 10% by mass or more and 95% by mass or less, 50% by mass or more and 95% by mass or less, or 70% by mass or more and 95% by mass or less.

The anti-fogging material may be a non-polymerizable anti-fogging material having no polymerizable functional group, but is preferably a polymerizable anti-fogging material having a polymerizable functional group in terms of fixing the anti-fogging material in the functional layer.

Examples of polymerizable anti-fogging materials include polyether-based or other urethane (meth)acrylates, ethylene oxide (EO)-modified (meth)acrylates, (meth)acrylamide compounds, hydroxyalkyl (meth)acrylates, and the like.

A urethane (meth)acrylate can be obtained by allowing an isocyanate to react with a (meth)acrylate having a hydroxyl group. When this is done, any kind of polyol may be used in combination. The urethane (meth)acrylate is preferably a polyfunctional urethane (meth)acrylate having two or more (meth)acryloyl groups in terms of enhancing the hardness and the adherence to the low-refractive-index layer. The urethane (meth)acrylate preferably has a weight-average molecular weight of 1000 or more and 50000 or less in terms of inhibiting coating failure due to a rise in viscosity.

Examples of isocyanates to be used to produce urethane (meth)acrylates include: aromatic isocyanates such as o-tolylene diisocyanate, p-phenylene diisocyanate, m-phenylene diisocyanate, p-xylene diisocyanate, m-xylene diisocyanate, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, and naphthalene diisocyanate; aliphatic or alicyclic isocyanates such as isophorone diisocyanate, hexamethylene diisocyanate, 4,4'-dicyclohexylmethane diisocyanate, hydrogenerated xylene diisocyanate, norbornene diisocyanate, and lysine diisocyanate; and the like.

The ethylene oxide-modified (meth)acrylate is preferably a polyfunctional ethylene oxide-modified (meth)acrylate having two or more (meth)acryloyl groups in terms of enhancing the hardness and the adherence to the low-refractive-index layer. The average number of added moles of ethylene oxide in the ethylene oxide-modified (meth) acrylate is preferably more than 0 and 30 or less. The average number of added moles of ethylene oxide, if 0, will undesirably not make it possible to obtain a sufficient anti-fogging ability. The average number of added moles of ethylene oxide, if more than 30, will undesirably cause the flexible ethylene oxide chain to be too long, and cause the transparent laminate to have poorer abrasion resistance.

Examples of ethylene oxide (EO)-modified (meth)acrylates include ethoxylated pentaerythritol tetra(meth)acrylate, ethoxylated glycerine tri(meth)acrylate, and the like.

Examples of (meth)acrylamide compounds include (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, diacetone (meth)acrylamide, N-(meth)acryloyl piperidine, N-(meth)acryloyl morpholine, and the like. In addition, examples of hydroxyalkyl (meth) acrylates include hydroxyethyl (meth)acrylate, hydroxypropyl (meth)acrylate, and the like.

Examples of anti-fogging materials that can be used include the following compound.

[Chem. 1]

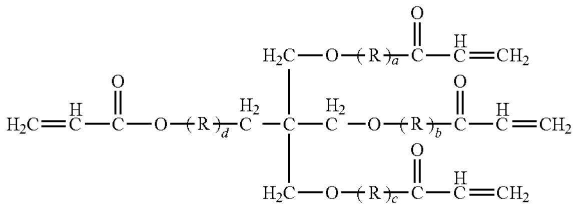

In the formula, R is an ethylene oxide group, and a+b+c+d is 25 to 45. As used herein, an ethylene oxide group means a group represented by $-CH_2-CH_2-O-$.

[Chem. 2]

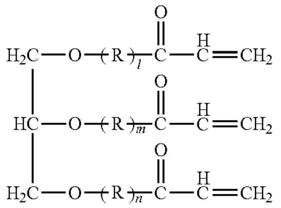

In the formula, R is an ethylene oxide group, and l+m+n is 4 to 14.

[Chem. 3]

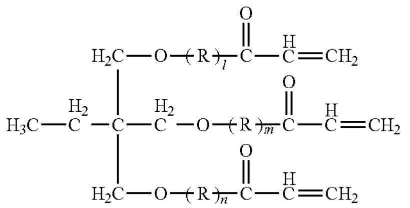

In the formula, R is an ethylene oxide group, and l+m+n is 10 to 30.

Examples of commercially available anti-fogging materials include NFX-551 manufactured by NEOS Company Limited, 8WX-022A, 8WX-030, and 8WX-083 manufactured by Taisei Fine Chemical Co., Ltd., KRM8713B manufactured by Daicel-Allnex Ltd., ATM-35E and A-GLY-20E manufactured by Shin-Nakamura Chemical Co., Ltd., KBP-1 manufactured by Kyoeisha Chemical Co., Ltd., urethane acrylate NOSTRA (registered trademark) manufactured by Mitsui Chemicals, Inc., ARONIX (registered trademark) MT-3563 to 3567 for anti-fogging coating material use manufactured by Toagosei Co., Ltd., DHY-1 manufactured by Arakawa Chemical Industries, Ltd., UVF-1 manufactured by Showa Ink Manufacturing C., Ltd., SA-TE60 manufactured by Sakamoto Yakuhin Kogyo Co., Ltd., LAMBIC-771W manufactured by Osaka Organic Chemical Industry Ltd., FOM series manufactured by Fujifilm Corporation, R-1220 manufactured by DKS Co., Ltd., and the like.

(Particles)

The particles may be either organic particles or inorganic particles as long as the particles can enhance the hardness. Examples of organic particles include plastic beads. Specific examples of plastic beads include polystyrene beads, melamine resin beads, acrylic beads, acryl-styrene beads, silicone beads, benzoguanamine beads, benzoguanamine-formaldehyde condensation beads, polycarbonate beads, and polyethylene beads. Examples of inorganic particles include inorganic oxide particles, such as silica ($SiO_2$) particles, alumina particles, titania particles, tin oxide particles, antimony-doped tin oxide (ATO for short) particles, and zinc oxide particles. Among these inorganic oxide particles, silica particles are preferable in terms of obtaining an excellent hardness. Among these silica particles, reactive silica particles are preferable. The reactive silica particles are silica particles that can form a cross-linked structure with the above-mentioned polyfunctional (meth)acrylate. Containing such reactive silica particles makes it possible to fix in the functional layer.

The reactive silica particle preferably carries a reactive functional group on the surface thereof. Examples of reactive functional groups that are suitably used include the above-mentioned ionizing-radiation-polymerizable functional groups.

Examples of the reactive silica particles that can be used include, but are not limited particularly to, conventionally known reactive silica particles, such as described in JP2008-165040A. In addition, examples of commercially available products of the reactive silica particles include: MIBK-SD and MIBK-SD-L manufactured by Nissan Chemical Industries, Ltd.; and the like.

In addition, the silica particles may be spherical silica particles, but are preferably deformed particles. Spherical silica particles and deformed particles may be mixed. In this regard, the "spherical particle" as used herein refers to, for example, a spherical or ellipsoidal particle. The "deformed particle" refers to a particle with a randomly irregular surface such as observed on a potato tuber. The surface area of the deformed particle is larger than that of a spherical particle. Thus, containing such deformed particles increases the area of contact with, for example, the above-mentioned polymerizable compound, making it possible to enhance the pencil hardness of the functional layer 12. Whether the functional layer 44 contains the deformed silica particles can be verified by observing a cross-section of the functional layer 12 under a transmission electron microscope (TEM) or a scanning transmission electron microscope (STEM).

The particles preferably have an average particle diameter of 0.01 μm or more and 10 μm or less. The average particle diameter of 0.01 μm or more makes it possible to inhibit the aggregation of particles, and furthermore makes it possible to inhibit a decrease in the dispersibility of the particles in the composition in the stage previous to the coating. In addition, the particles having an average particle diameter of 10 μm or less make it possible to inhibit the formation of large irregularities on the functional layer, and to inhibit the occurrence of a problem such as an increase in the haze value. In cases where the particles are spherical particles, the average particle diameter of the particles is determined as the arithmetic average of the particle diameter values of 20 particles, in which the particle diameter values of the 20 particles are measured on a cross-sectional image of the particles photographed using a scanning electron microscope (SEM). In cases where the particles are deformed particles, the average particle diameter of the particles is determined as the arithmetic average of the particle diameter values of 20 particles, in which the maximum (major axis) values and minimum (minor axis) values of the distance between two points on the circumference of each particle are measured on a cross-sectional image of the functional layer photographed using a scanning electron microscope (SEM), and these values are averaged to determine the particle diameter of the particle. When a cross-sectional image is photographed using a scanning transmission electron microscope (STEM) (for example, a product named "S-4800 (Type 2)", manufactured by Hitachi High-Technologies Corporation), the cross-section is observed with the detector switch (signal selection), the accelerating voltage, and the emission current set at "TE," "30 kV," and "10 μA" respectively.

<Low-Refractive-Index Layer>

The low-refractive-index layer 13 is a layer having a refractive index lower than the refractive index of the functional layer 12. Specifically, the low-refractive-index layer 13 may have a refractive index of 1.20 or more and 1.50 or less. The refractive index of the low-refractive-index layer 13 is measured by the same method as described in the section on the functional layer 12. The refractive index of the low-refractive-index layer 13 may be 1.20 or more and 1.49 or less, 1.20 or more and 1.40 or less, or 1.20 or more and 1.32 or less. A difference in the refractive index between the functional layer 12 and the low-refractive-index layer 13 may be 0.10 or more and 0.25 or less.

The low-refractive-index layer 13 preferably has a film thickness of 200 nm or less. The low-refractive-index layer 13 having a film thickness of 200 nm or less makes it possible to inhibit the reflection of external light. In addition, the low-refractive-index layer having a larger film thickness will undesirably cause the anti-fogging function of the functional layer to be blocked by the low-refractive-index layer. However, in cases where the low-refractive-index layer 13 has a film thickness of 200 nm or less, the low-refractive-index layer 13 has an extremely thin film thickness, and thus, enables the surface 10A of the transparent laminate 10 to perform the anti-fogging function, whereby making it possible to obtain a transparent laminate 10 having a better anti-fogging ability. The film thickness of the low-refractive-index layer 13 is determined as the arithmetic average of the film thickness values at 20 points, in which the values are measured at the 20 points on a cross-sectional image of the low-refractive-index layer 13 photographed using a transmission electron microscope (TEM) or a scanning transmission electron microscope (STEM). The film thickness of the low-refractive-index layer 13 can be measured by the same method as the film thickness of the functional layer 12. The film thickness of the low-refractive-index layer 13 is preferably 50 nm or more and 200 nm or less, 60 nm or more and 200 nm or less, 70 nm or more and 200 nm or less, 80 nm or more and 200 nm or less, 50 nm or more and 175 nm or less, 60 nm or more and 175 nm or less, 70 nm or more and 175 nm or less, 80 nm or more and 175 nm or less, 50 nm or more and 150 nm or less, 60 nm or more and 150 nm or less, 70 nm or more and 150 nm or less, 80 nm or more and 150 nm or less, 50 nm or more and 125 nm or less, 60 nm or more and 125 nm or less, 70 nm or more and 125 nm or less, 80 nm or more and 125 nm or less, 50 nm or more and 100 nm or less, 60 nm or more and 100 nm or less, 70 nm or more and 100 nm or less, or 80 nm or more and 100 nm or less.

The low-refractive-index layer 13 is not subject to any particular limitation as long as the layer has a refractive index lower than the refractive index of the functional layer 12. The low-refractive-index layer 13 can be constituted, for example, by a binder resin and low-refractive-index particles or by a low-refractive-index resin. The low-refractive-index layer 13 may additionally contain an antismudging agent and/or the like.

(Low-Refractive-Index Particle)

Examples of low-refractive-index particles include solid or hollow particles composed of silica or magnesium fluoride. Among these, hollow silica particles are preferable. Such hollow silica particles can be produced, for example, by a production method described in the Examples section in JP2005-099778A.

The low-refractive-index particles preferably have an average particle diameter of 5 nm or more and 100 nm or less. The low-refractive-index particles having an average particle diameter in this range will not cause the transparency of the low-refractive-index layer to be impaired, and makes it possible to achieve favorable dispersion of particles. The average particle diameter of the low-refractive-index particles is determined as the arithmetic average of the particle diameter values of 20 low-refractive-index particles, in which the particle diameter values of the 20 low-refractive-index particles are measured on a cross-sectional image of the low-refractive-index layer photographed using a transmission electron microscope (TEM) or a scanning transmission electron microscope (STEM). The average particle diameter of the low-refractive-index particles is more preferably 10 nm or more and 100 nm or less, 5 nm or more and 80 nm or less, 10 nm or more and 80 nm or less, 5 nm or more and 70 nm or less, or 10 nm or more and 70 nm or less.

Low-refractive-index particles to be used are preferably silica particles having a reactive group in the surface thereof (reactive silica particles), and are particularly preferably reactive hollow silica particles. Such silica particles having a reactive group in the surface thereof can be produced by surface-treating silica particles with a silane coupling agent or the like. Examples of a method of treating the surface of silica particles with a silane coupling agent include a dry method in which the silane coupling agent is sprayed over the silica particles, and a wet method in which the silica particles are dispersed in a solvent, and the silane coupling agent is then added to the solvent and allowed to react with the silica particles.

(Binder Resin)

Examples of a binder resin contained in the low-refractive-index layer 13 include a polymer of a polymerizable compound. Examples of polymerizable compounds that can be used include, but are not limited to, ionizing-radiation-polymerizable monomers, oligomers, and prepolymers. However, the binder resin may be mixed with a material having a low refractive index, such as: a resin having a fluorine atom introduced therein; and/or an organopolysiloxane. Examples of monofunctional ionizing-radiation-polymerizable monomers include ethyl (meth)acrylate, ethylhexyl (meth)acrylate, styrene, methylstyrene, and N-vinylpyrrolidone. In addition, examples of bifunctional or more polyfunctional ionizing-radiation-polymerizable monomers include: polymethylolpropane tri(meth)acrylate, hexanediol (meth)acrylate, tripropylene glycol di(meth)acrylate, diethylene glycol di(meth)acrylate, pentaerythritol tri(meth)acrylate, pentaerythritol tetra(meth)acrylate, dipentaerythritol penta(meth)acrylate, dipentaerythritol hexa(meth)acrylate, 1,6-hexanediol di(meth)acrylate, and neopentyl glycol di(meth)acrylate; compounds obtained by modifying these compounds with ethylene oxide, polyethylene oxide, or the like; and the like.

(Low-Refractive-Index Resin)

Examples of low-refractive-index resins include resins having a low refractive index, such as: resins having a fluorine atom introduced therein; and organopolysiloxanes.

<<Method of Producing Transparent Laminate>>

The transparent laminate 10 can be produced, for example, by the following method. First, a composition for a functional layer is applied to the first face 11A of a base material 11 to form a coating film of the composition for a functional layer.

<Composition for Functional Layer>

The composition for a functional layer contains a polymerizable compound and an anti-fogging material. The composition for a functional layer may additionally contain particles, a leveling agent, a solvent, and/or a polymerization initiator, if necessary.

(Solvent)

Examples of the solvent include alcohols (for example, methanol, ethanol, propanol, isopropanol, n-butanol, s-butanol, t-butanol, benzyl alcohol, PGME, ethylene glycol, and diacetone alcohol), ketones (for example, acetone, methyl ethyl ketone, methyl isobutyl ketone, cyclopentanone, cyclohexanone, heptanone, diisobutyl ketone, diethyl ketone, and diacetone alcohol), esters (methyl acetate, ethyl acetate, butyl acetate, n-propyl acetate, isopropyl acetate, methyl formate, and PGMEA), aliphatic hydrocarbons (for example, hexane and cyclohexane), halogenated hydrocarbons (for example, methylene chloride, chloroform, and carbon tetrachloride), aromatic hydrocarbons (for example, benzene, toluene, and xylene), amides (for example, dimethylformamide, dimethylacetamide, and n-methylpyrrolidone), ethers (for example, diethyl ether, dioxane, and tetrahydrofurane), ether alcohols (for example, 1-methoxy-2-propanol), and carbonates (dimethyl carbonate, diethyl carbonate, and ethylmethyl carbonate). These solvents may be used singly or in combination of two or more kinds thereof. Among these, preferable solvents are methyl isobutyl ketone and methyl ethyl ketone because these ketones make it possible to dissolve or disperse a component such as a polymerizable compound, and to apply the composition for a functional layer in a suitable manner.

(Polymerization Initiator)

The polymerization initiator is a component which degrades under exposure to ionizing radiation, and generates radicals to initiate or promote polymerization (cross-linking) of a polymerizable compound.

The polymerization initiator is not subject to any particular limitation as long as the polymerization initiator can generate a substance that initiates radical polymerization under exposure to ionizing radiation. Any known polymerization initiator can be used without any particular limitation, and specific examples include acetophenones, benzophenones, Michler's benzoyl benzoate, α-amyloxime esters, thioxantones, propyophenones, benzyls, benzoins, and acylphosphine oxides. In addition, the polymerization initiator is preferably used in mixture with a photosensitizer, and specific examples of photosensitizers include n-butylamine, triethylamine, and poly-n-butylphosphine.

After the coating film of the composition for a functional layer is formed, the coating film is heated and dried, for example, at a temperature of 30° C. or more and 120° C. or less by any kind of known technique to evaporate the solvent.

After the coating film is dried, the coating film is cured under exposure to ionizing radiation such as ultraviolet light to form a functional layer 12. After the functional layer 12 is formed, the composition for a low-refractive-index layer is applied to the functional layer 12 to form a coating film of the composition for a low-refractive-index layer.

<Composition for Low-Refractive-Index Layer>

The composition for a low-refractive-index layer contains, for example, a polymerizable compound and low-refractive-index particles. The composition for a low-refractive-index layer may contain a low-refractive-index resin instead of a polymerizable compound and low-refractive-index particles. The low-refractive-index resin may additionally contain a leveling agent, a solvent, and/or a polymerization initiator, if necessary.

After the coating film of the composition for a low-refractive-index layer is formed, the coating film is heated and dried, for example, at a temperature of 30° C. or more and 120° C. or less by any kind of known technique to evaporate the solvent.

After the coating film is dried, the coating film is cured under exposure to ionizing radiation such as ultraviolet light. Thus, the low-refractive-index layer 13 is formed, and the transparent laminate 10 is produced.

According to the present embodiment, the transparent laminate 10 has the low-refractive-index layer 13, and thus, has an antireflection ability. In addition, when the transparent laminate 10 is tested in the above-mentioned anti-fogging ability test, the surface 10A of the transparent laminate 10 is not fogged. Thus, the transparent laminate 10 can obtain an excellent anti-fogging ability. In addition, the transparent laminate 10 achieves a ΔY1 value of 0.2% or less, and hence, the luminous reflectance Y is less prone to change in an environment liable to fog. Accordingly, it is possible to provide a transparent laminate 10 that has an antireflection ability and an excellent anti-fogging ability, and is less prone to change in luminous reflectance Y even in an environment liable to fog.

The transparent laminate 10 has an antireflection ability and an excellent anti-fogging ability, and is less prone to change in luminous reflectance Y even in an environment liable to fog. Hence, in cases where the transparent laminate 10 is used for an image display device, the surface 10A of the transparent laminate 10 can inhibited from being fogged by the moisture in the air layer during use of the image display device. Thus, it is possible to inhibit a decrease in the clearness, visibility, and transmission of an image from being caused by a decrease in the luminous reflectance. In addition, in a large type of image display device, the transparent laminate 10 can inhibit the surface of part of the antireflection film from fogging, and thus, makes it possible to inhibit unevenness from being generated by a partial decrease in the clearness of an image. Additionally, in cases where the transparent laminate 10 is used for a facial transparent protector or a transparent partition, and even in cases where a conversation is carried out across such a facial transparent protector or transparent partition, the transparent laminate 10 makes it possible to inhibit the movement of the mouth from being made difficult to see by the reflection of light, and in addition, to inhibit exhaled air from fogging the facial transparent protector or the like and giving a sense of unease and stress to the other person conversing.

The low-refractive-index layer has a film thickness much smaller than the functional layer. Thus, allowing only the low-refractive-index layer to contain an anti-fogging material causes the amount of the anti-fogging material to be too small. When the above-mentioned anti-fogging ability test is performed, the surface of the transparent laminate will undesirably be fogged accordingly. In view of this, the present inventors have made studies vigorously, and have discovered that, even in cases where a low-refractive-index layer exists on a functional layer, allowing at least the functional layer to contain an anti-fogging material makes it possible to achieve an excellent anti-fogging ability at the surface of the transparent laminate. In the present embodiment, the functional layer 12 contains an anti-fogging material, and thus, the surface 10A of the transparent laminate 10 can be prevented from fogging.

It is generally known that hollow silica particles are hollow, and thus, tend to absorb moisture. When hollow silica particles absorb moisture, the hollow silica particles become turbid in white, and thus, will undesirably leave a stain in the transparent laminate. On the other hand, even in cases where hollow silica particles are used in the transparent laminate 10 in the present embodiment, the transparent laminate 10 is less prone to generate a stain left by the hollow silica particles that can become turbid in white. Although the reason for this is not clear, it can be considered to be because the anti-fogging material in the functional layer 12 absorbs moisture earlier than the hollow silica particles.

The present inventors have made studies on an anti-fogging ability vigorously, and have discovered that an anti-fogging ability is more enhanced in cases where at least any one of a functional layer or a low-refractive-index layer contains, to a certain degree, an anti-fogging material containing an ether component such as alkylene oxide, for example, ethylene oxide. Specifically, in cases where a ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ is 1.25 or more and 2.20 or less in an absorption spectrum obtained from the surface 10A of the transparent laminate 10 by Fourier transform infrared spectroscopy, the transparent laminate 10 makes it possible that, when the transparent laminate 10 is tested in the above-mentioned anti-fogging ability test, the surface 10A of the transparent laminate 10 is not fogged, achieves an excellent anti-fogging ability, and achieves a ΔY1 value of 0.2% or less. Accordingly, in cases where the ratio of the first peak intensity to the second peak intensity is 1.25 or more and 2.20 or less, it is possible to provide a transparent laminate 10 that has an antireflection ability and an excellent anti-fogging ability, and is less prone to change in luminous reflectance Y even in an environment liable to fog.

The present inventors have made studies on an anti-fogging ability vigorously, and have discovered that, in cases where the transparent laminate contains a material (for example, a material having a urethane backbone such as urethane (meth)acrylate) having a third peak in a third wave number region of from 1540 $cm^{-1}$ to 1560 $cm^{-1}$ in the absorption spectrum obtained from the surface of the transparent laminate by Fourier transform infrared spectroscopy, the anti-fogging ability is more enhanced even if the ratio of the second peak intensity in the second wave number region of from 1150 $cm^{-1}$ to 1000 $cm^{-1}$ to the first peak intensity in the first wave number region of from 1780 $cm^{-1}$ to 1700 $cm^{-1}$ in the absorption spectrum obtained from the transparent laminate by Fourier transform infrared spectroscopy is low to a certain degree. Specifically, also in cases where the ratio of the second peak intensity to the first peak intensity is 0.01 or more and 0.40 or less in the absorption spectrum obtained from the transparent laminate 10 by Fourier transform infrared spectroscopy, the transparent laminate 10 makes it possible that, when the transparent laminate 10 is tested in the above-mentioned anti-fogging ability test, the surface 10A of the transparent laminate 10 is not fogged, achieves an excellent anti-fogging ability, and achieves a ΔY1 value of 0.2% or less. Accordingly, in cases where the ratio of the first peak intensity to the second peak intensity is 0.01 or more and 0.40 or less, it is possible to provide a transparent laminate 10 that has an antireflection ability and an excellent anti-fogging ability, and is less prone to change in luminous reflectance Y even in an environment liable to fog.

For example, in cases where a transparent laminate such as a facial transparent protector is used near the face, the smell of the transparent laminate tends to be sensed. Because of this, the smell of the transparent laminate is required to be inhibited in cases where a transparent laminate is used near the face. Among anti-fogging materials having an excellent anti-fogging ability, a quaternary ammonium anti-fogging material smells strong, and hence, a quaternary ammonium anti-fogging material is unsuitable for applications for use near the face. With respect to such a problem of smelling, selecting, as the anti-fogging material, an anti-fogging material other than a quaternary ammonium anti-fogging material and/or selecting, as a polymerization initiator, a polymerization initiator having the maximum absorption wavelength at a wavelength of less than 350 nm make(s) it possible to inhibit the smell, and thus, makes it possible to be used in applications for use near the face.

The polymerization initiator for inhibiting the smell may be a cationic polymerization initiator, but is preferably a radical polymerization initiator. In addition, a polymerization initiator having the maximum absorption wavelength at a wavelength of 350 nm or more may be used together with a polymerization initiator having the maximum absorption wavelength at a wavelength of less than 350 nm.

The polymerization initiator for inhibiting the smell is subject to no particular limitation as long as the polymerization initiator has the maximum absorption wavelength at a wavelength of less than 350 nm. Examples of polymerization initiators that can be used include benzoin compounds, benzophenone compounds, benzylketal compounds, α-hydroxy ketone compounds, α-amino ketone compounds, triazine compounds, iodonium salts, sulfonium salts, and the like.

Among the polymerization initiators having the maximum absorption wavelength at a wavelength of less than 350 nm, α-acetophenone compounds are preferable. Examples of α-acetophenone compounds include 2-hydroxy-1-{4-[4-(2-hydroxy-2-methyl-propionyl)benzyl]phenyl}-2-methylpropa-1-one, 2-methyl-2-morpholino-1-(4-methylsulfanilphenyl) propane-1-one, 2-dimethylamino-1-(4-morpholinophenyl)-2-benzylbutane-1-one, and 2-dimethylamino-1-(4-morpholinophenyl)-2-(4-methylphenylmethyl) butane-1-one, and the like, and more preferably 2-methyl-2-morpholino-1-(4-methylsulfanilphenyl) propane-1-one and 2-dimethylamino-1-(4-morpholinophenyl)-2-benzylbutane-1-one. Examples of commercially available α-acetophenone compounds include: Omnirad 127, Omnirad 369, Omnirad 379EG, and Omnirad 907 (which are all manufactured by IGM Resins B.V.); SEIKUOL BEE (manufactured by Seiko Chemical Co., Ltd.); and the like. Examples of commercially available benzophenone compounds having the maximum absorption wavelength at a wavelength of less than 350 nm include Omnipol BP (manufactured by IGM Resins B.V.). In addition, examples of commercially available α-hydroxy ketone compounds having the maximum absorption peak at a wavelength of less than 350 nm include ESACURE KIP 150 (manufactured by IGM Resins B.V.) and the like.

<<<Other Transparent Laminates>>>

The transparent laminate 10 has the functional layer 12 and the low-refractive-index layer 13 on the first face 11A side of the base material 11. However, the transparent laminate may have not only those layers on the first face 11A of the base material 11 but also the functional layer 21 and the low-refractive-index layer 22 on the second face 11B side opposite from the first face 11A side as the transparent laminate 20 depicted in FIG. 2 does. The functional layer 21 may be the same as or different from the functional layer 12. The low-refractive-index layer 22 may be the same as or different from the low-refractive-index layer 13. The surface 20A of the transparent laminate 20 is the surface 13A of the low-refractive-index layer 13.

Figure 3:
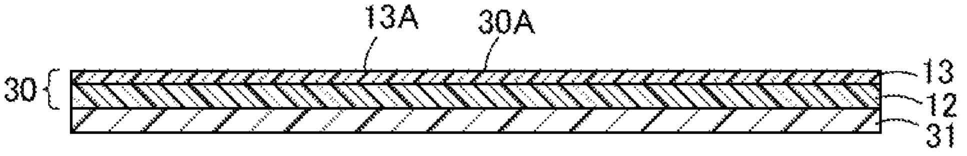
FIG. 3 is a schematic block diagram of another transparent laminate according to an embodiment.
Figure 4:
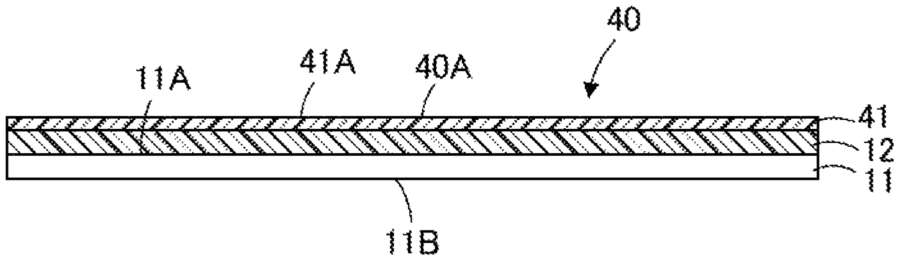
FIG. 4 is a schematic block diagram of another transparent laminate according to an embodiment.

The transparent laminate 10 includes the base material 11, or optionally includes no base material as the transparent laminate 30 depicted in FIG. 3 does. That is, the transparent laminate 30 is a laminate having no base material. The "base material" in the present embodiment is a support for forming a transparent laminate, and is a film or sheet existing in the transparent laminate also during use of the transparent laminate. The transparent laminate 30 is formed on one face of the release film 31. The release film 31 is peeled away when the transparent laminate 30 is used, and thus, is not regarded as a base material. The surface 30A of the transparent laminate 30 is the surface 13A of the low-refractive-index layer 13.

The low-refractive-index layer 13 of the transparent laminate 10 contains no anti-fogging material. The transparent laminate may have a low-refractive-index layer 41 containing an anti-fogging material instead of the low-refractive-index layer 13 as a transparent laminate 40 depicted in FIG. 4 does. The anti-fogging material to be contained in the low-refractive-index layer 41 is the same as the anti-fogging material described in the section on the functional layer 12, and is omitted from the description here. The low-refractive-index layer 41 contains an anti-fogging material, and thus, allows the functional layer 12 and the low-refractive-index layer 41 to perform an anti-fogging function, thus making it possible to attempt to further enhance the anti-fogging ability. The surface 40A of the transparent laminate 40 is the surface 41A of the low-refractive-index layer 41.

Figure 5:
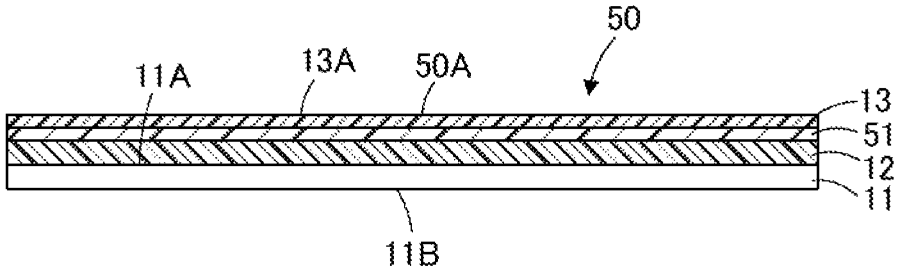
FIG. 5 is a schematic block diagram of another transparent laminate according to an embodiment.

In the transparent laminate 10, the functional layer 12 is adjacent to the low-refractive-index layer 13, but as in the transparent laminate 50 depicted in FIG. 5, a high-refractive-index layer 51 may be provided between the functional layer 12 and the low-refractive-index layer 13. Providing the high-refractive-index layer 51 makes it possible to attempt further enhance the antireflection ability. The surface 50A of the transparent laminate 50 is the surface 13A of the low-refractive-index layer 13. In this regard, the low-refractive-index layer 13 of the transparent laminate 50 depicted in FIG. 5 contains no anti-fogging ability. The transparent laminate may have the low-refractive-index layer 41 of the transparent laminate 40 instead of the low-refractive-index layer 13.

The high-refractive-index layer 51 is a layer having a refractive index higher than the refractive index of the low-refractive-index layer. Specifically, the refractive index of the high-refractive-index layer 51 may be 1.55 or more and 1.85 or less. The refractive index of the high-refractive-index layer 51 can be measured by the same method as described in the section on the functional layer 12. The refractive index of the high-refractive-index layer 51 may be 1.56 or more and 1.85 or less, 1.57 or more and 1.85 or less, 1.55 or more and 1.80 or less, 1.56 or more and 1.80 or less, 1.57 or more and 1.80 or less, 1.55 or more and 1.75 or less, 1.56 or more and 1.75 or less, 1, or 57 or more and 1.75 or less. A difference in the refractive index between the low-refractive-index layer 13 and the high-refractive-index layer 51 may be 0.1 or more and 0.65 or less.

The high-refractive-index layer 51 preferably has a film thickness of 200 nm or less. The high-refractive-index layer 51 having a film thickness of 200 nm or less makes it possible to inhibit the reflection of external light without impairing the appearance. The film thickness of the high-refractive-index layer 51 can be measured by the same method as the film thickness of the low-refractive-index layer 13. The film thickness of the high-refractive-index layer 51 is preferably 50 nm or more and 200 nm or less, 60 nm or more and 200 nm or less, 70 nm or more and 200 nm or less, 80 nm or more and 200 nm or less, 50 nm or more and 195 nm or less, 60 nm or more and 195 nm or less, 70 nm or more and 195 nm or less, 80 nm or more and 195 nm or less, 50 nm or more and 190 nm or less, 60 nm or more and 190 nm or less, 70 nm or more and 190 nm or less, 80 nm or more and 190 nm or less, 50 nm or more and 185 nm or less, 60 nm or more and 185 nm or less, 70 nm or more and 185 nm or less, 80 nm or more and 185 nm or less, 50 nm or more and 180 nm or less, 60 nm or more and 180 nm or less, 70 nm or more and 180 nm or less, or 80 nm or more and 180 nm or less.

The transparent laminate 10 is used for various applications. Examples of applications of the transparent laminate 10 include an image display device, facial transparent protector, transparent partition, transparent film curtain, and the like. As used herein, a "facial transparent protector" refers to that which is configured to cover the whole of the face or part (for example, the eyes) thereof to thereby protect the face. Examples of facial transparent protectors include protective glasses, face shields, and the like. The facial transparent protector may be of a one-time-use type or a re-use type. Examples of facial transparent protectors of a one-time-use type include such protectors of a film exchange goggles type, a surgical mask and face shield type, a face shield type, and the like. Examples of facial transparent protectors of a re-use type include such protectors of a protective glasses type, a goggles type, a face shield type, and the like. The transparent laminate 10 used for an image display device or a facial transparent protector will now be described.

<<<Image Display Device>>>

An image display device 60 depicted in FIG. 6 is used mainly outdoors, but may be used indoors. The image display device 60 includes a display panel 70 and a transparent front plate 100 arranged on the observer side of the display panel 70 via an air layer (air gap) 90. The thickness d of the air layer 90 (the distance between the display panel 70 and the front plate 100) can be, for example, but is not limited to, more than 0 mm and 50 mm or less. Besides, in the image display device 60, a backlight unit 110 configured to light up the display panel 70 is provided on the back side of the display panel 70. Depending on the kind of the display panel, however, the image display device optionally includes no backlight unit.

<<Display Panel>>

A depicted in FIG. 6, the display panel 70 includes: a display element 71; and polarizing plates 72 and 73 arranged on the observer side and backlight unit 110 side of the display element 71 respectively. The display element 71 is united with the polarizing plates 72 and 73 via pressure-sensitive adhesives (PSA) such as transparent adhesive layers 74 and 75 respectively.

<Display Element>

The display element 71 is a liquid-crystal display element. However, the display element is not limited to a liquid-crystal display element, and may be, for example, an organic light-emitting diode (OLED) element. A liquid-crystal display element that can be used is any known liquid-crystal display element, and, for example, has a liquid-crystal layer, an alignment film, an electrode layer, and a color filter that are sandwiched between two glass base materials.

<Polarizing Plate>

The polarizing plate 72 includes: a polarizer 76; an antireflection film 77 bonded to the observer side face of the polarizer 76; and a protective film 78 bonded to the backlight unit 110 side face of the polarizer 76. To the observer side face of the polarizer 76, the same film as the protective film 78 may be bonded, or another optical film may be bonded, instead of the antireflection film 77.

(Polarizer)

Examples of the polarizer 76 include uniaxially-stretched polyvinyl alcohol resin films stained with iodine or a dichromatic pigment. Examples of polyvinyl alcohol resins that can be used include saponified polyvinyl acetate resins. Examples of polyvinyl acetate resins include polyvinyl acetates as homopolymers of vinyl acetate, and copolymers of vinyl acetate and another monomer copolymerizable therewith. Examples of the another monomer copolymerizable with vinyl acetate include unsaturated carboxylic acids, olefins, vinyl ethers, unsaturated sulfonic acids, and acrylamides having an ammonium group. The polyvinyl alcohol resin may be modified. For example, polyvinyl formal modified with, or polyvinyl acetal modified with aldehyde can also be used.

When the polarizer 76 is laminated with the antireflection film 77 and the protective film 78, the antireflection film 77 and the protective film 78 are preferably saponified preliminarily. Saponifying the antireflection film 77 and the protective film 78 affords a favorable adhesion with the polarizer 76.

(Antireflection Film)

The antireflection film 77 is intended to protect the polarizer 76 and afford an antireflection ability. As used herein, a "antireflection ability" means a characteristic that causes a decrease in reflected light, and specifically means that the below-mentioned luminous reflectance Y is 3.5% or less. The antireflection film 77 includes: a light-transmitting base material 79; a functional layer 80 provided on the observer side face of the base material 79; and a low-refractive-index layer 81 provided on the observer side face of the functional layer 80 and having a refractive index lower than the refractive index of the functional layer 80. The base material 79 and the low-refractive-index layer 81 are the same as the base material 11 and the low-refractive-index layer 13 respectively, and are omitted from the description here. However, the base material 79 and the low-refractive-index layer 81 are optionally not the same as the below-mentioned base material 11 and low-refractive-index layer 13 respectively.

The functional layer 80 is the same as the below-mentioned functional layer 12 except that the functional layer 80 does not contain the below-mentioned anti-fogging material, and thus, is omitted from the description here. However, the functional layer 80 may contain an anti-fogging material. That is, the antireflection film 77 receives heat from the display panel 70 side more easily than the transparent laminate 10 does, and thus, is less prone to be fogged, but may be the equivalent used for the transparent laminate 10.

The functional layer 80 of the antireflection film 77 contains no anti-fogging material, and thus, has no anti-fogging ability. In cases where the functional layer 80 of the antireflection film 77 is made to contain an anti-fogging material, the contact angle with water on the observer side surface 77A of the antireflection film 77 (the surface of the low-refractive-index layer 81) may be 90° or more.

(Protective Film)

The protective film 78 is intended to protect the polarizer 76, and is constituted by a light-transmitting base material such as a triacetyl cellulose film (TAC film).

The polarizing plate 73 includes: a polarizer 82; a protective film 83 bonded to one face of the polarizer 82; and a protective film 84 bonded to the other face of the polarizer 82. The polarizer 82 is the same as the polarizer 76, and the protective films 83 and 84 are the same as the protective film 78, and are omitted from the description here.

<<Backlight Unit>>

As the backlight unit 110, any known backlight unit can be used. The backlight unit 110 may be a backlight unit of either an edge light-type or a direct light-type.

<<Front Plate>>

The front plate 100 includes a base material 101 and the transparent laminate 10 arranged on the display panel 70 side of the base material 101. In the front plate 100, the transparent laminate 10 is arranged on the display panel 70 side of the base material 101, but can be arranged on at least any one of the display panel 70 side or the observer side of the base material 101. The base material 101 and the transparent laminate 10 are bonded to each other with a transparent adhesive layer 102. There may be another functional layer between the base material 101 and the transparent laminate 10. In this case, the base material 101, the another functional layer, and the transparent laminate 10 are united by bonding or the like.

<Base Material>

The base material 101 is intended to afford hardness to the image display device 60. The surface 101A of the base material 101 is the observer side surface 60A of the image display device 60.

The base material 101 preferably has a thickness of 50 μm or more and 5 mm or less. The base material 101 having a thickness of 50 μm or more allows the base material 101 to be less prone to crack and to undergo the influence of outside air, for example, water absorption that causes the front plate to bend. In addition, the base material 101 having a thickness of 5 mm or less makes it possible to inhibit the visibility from being worsened by a decrease in the light transmittance, by the distortion of an image, or by the like, and does not cause the weight to be too large, thus being easier to handle. The thickness of the base material 101 can be measured by the same method as the thickness of the base material 11.

Examples of a constituent material of the base material 101 include, but are not limited to, glass, an acetyl cellulose resin, cycloolefin polymer (COP) resin, cycloolefin copolymer (COC) resin, polycarbonate resin, acrylic resin, polyester resin, and a mixture of these resins. Among these, glass is preferable in terms of high hardness and high transparency. The constituent material of the base material is the same as glass, an acetyl cellulose base material, cycloolefin polymer base material, polycarbonate base material, acryl base material, or polyester base material that is described regarding the base material, and is omitted from the description here.

The present embodiment includes the transparent laminate 10, the air layer 90 exists between the display panel 70 and the front plate 100, and the display panel 70 side of the front plate 100 has an excellent anti-fogging ability, thus making it possible to provide an image display device 60 less prone to change in the luminous reflectance Y even in an environment liable to fog.

<<<Facial Transparent Protector>>>

A facial transparent protector 120 depicted in FIG. 7 is a face shield. The facial transparent protector 120 includes, for example, a supporting member 130 and a double-sided antireflection laminate 140 attached to the supporting member 130. In this regard, the double-sided antireflection laminate 140 is used for the facial transparent protector 120, but is limited to no particular application.

<<Double-sided Antireflection Laminate>>

The double-sided antireflection laminate 140 has an antireflection function at both of the faces thereof. The double-sided antireflection laminate 140 depicted in FIG. 7 functions as the transparent shield film of a face shield, and is configured to cover the whole of the face or part (for example, the eyes) of the face. It is important that the facial transparent protector is thin and light, and thus, the double-sided antireflection laminate 140 preferably has a thickness of 1000 μm or less in terms of seeking the thinness and lightness. The double-sided antireflection laminate 140 can be used for not only a transparent shield film of a face shield but also a plate partition, a film curtain, or the like to be used to block droplets. Also in these cases, being thin and light means being easy to handle, and thus, the double-sided antireflection laminate preferably has a thickness of 15000 μm or less. The thickness of the double-sided antireflection laminate 140 is determined as the arithmetic average of the thickness values at 10 different points on the double-sided antireflection laminate 140, in which the thickness values are measured at the 10 different points using a thickness measurement device (a product named "Digimatic Indicator IDF-130", manufactured by Mitutoyo Corporation). The double-sided antireflection laminate, if too small in thickness, is prone to be deformed, and the double-sided antireflection laminate, if not stiff, is sticky to the face. Thus, in terms of inhibiting such deformation and achieving stiffness, and in terms of attempting at more thinness and more lightness, the thickness of the double-sided antireflection laminate 140 is more preferably 85 μm or more and 1000 μm or less, 150 μm or more and 1000 μm or less, 250 μm or more and 1000 μm or less, 85 μm or more and 700 μm or less, 150 μm or more and 700 μm or less, or 250 μm or more and 700 μm or less, 85 μm or more and 600 μm or less, 150 μm or more and 600 μm or less, 250 μm or more and 600 μm or less, 85 μm or more and 500 μm or less, 150 μm or more and 500 μm or less, or 250 μm or more and 500 μm or less. In particular, the double-sided antireflection laminate 140 having a thickness of 110 μm or more and 450 μm or less presents a low luminous reflectance Y, an excellent anti-fogging ability and visibility, and besides, an optimal thickness. Thus, producing a face shield using the double-sided antireflection laminate 140 makes it possible to obtain a face shield that is light and comfortable to wear.

As depicted in FIG. 8, the double-sided antireflection laminate 140 includes, for example, the transparent laminate 10, a transparent adhesion layer 150, and an antireflection film 160 that are laminated in this order. That is, the double-sided antireflection laminate 140 has an antireflection film at both of the faces thereof. Having an antireflection film at both of the faces makes it possible to more enhance the transparency, recognize the movement of the mouth, and give a better feeling of security to the other person conversing.

The first face (inner face) 140A as the observer's face side of the double-sided antireflection laminate 140 is the surface 10A of the transparent laminate 10 (the surface 13A of the low-refractive-index layer 13). The second face (outer face) 140B of the double-sided antireflection laminate 140 is the surface 160A of the antireflection film 160.

The double-sided antireflection laminate 140 preferably has a double-sided reflectance of 0.1% or more and 2% or less. The double-sided antireflection laminate 140 having a double-sided reflectance of 0.1% or more makes it possible to inhibit a decrease in the abrasion resistance, and 2% or less makes it possible to inhibit the reflection sufficiently, thus making it easier to see the movement of the mouth. The phrase "double-sided reflectance" means the total reflectance of light reflected on both of the faces of the double-sided antireflection laminate when light is allowed to come into one of the faces of the double-sided antireflection laminate. In cases where the double-sided antireflection laminate 140 is used for a facial transparent protector, the visibility is important for ordinary living. Accordingly, the lower the double-sided reflectance of the double-sided antireflection laminate 140, the better. The double-sided reflectance of the double-sided antireflection laminate 140 is preferably 0.13% or more and 2% or less, 0.17% or more and 2% or less, 0.20% or more and 2% or less, 0.1% or more and 1.97% or less, 0.13% or more and 1.97% or less, 0.17% or more and 1.97% or less, 0.20% or more and 1.97% or less, 0.1% or more and 1.93% or less, 0.13% or more and 1.93% or less, 0.17% or more and 1.93% or less, 0.20% or more and 1.93% or less, 0.1% or more and 1.90% or less, 0.13% or more and 1.90% or less, 0.17% or more and 1.90% or less, or 0.20% or more and 1.90% or less.

The double-sided reflectance can be measured as below-mentioned. First, a sample 70 mm×70 mm in size is cut out of a double-sided antireflection laminate 140. In addition, two black acrylic plates 10 mm×50 mm in size (hereinafter referred to as "black acrylic plates 1") and one black acrylic plate 50 mm×50 mm in size (hereinafter referred to as a "black acrylic plate 2") are cut out of a black acrylic plate (for example, a product named "CLAREX N-885" having a thickness of 1 mm, manufactured by Nitto Jushi Kogyo Co., Ltd.). The black acrylic plates 1 are placed on the black acrylic plate 2 so as to be opposite to each other, and fixed with a tape (a product named "Cello-tape (registered trademark)", manufactured by Nichiban Co., Ltd.) or the like to produce a holder 170 depicted in FIG. 9. Then, a sample S is placed on the holder 170 in such a manner that the sample is on the two black acrylic plates 1. Then, the resulting object in this form is placed in the measurement unit of a spectrophotometer (for example, a product named "UV-2600", manufactured by Shimadzu Corporation), and the luminous reflectance is measured. Then, the double-sided reflectance of the sample S is determined by subtracting, from the luminous reflectance measured, a value calculated by multiplying the luminous reflectance of the black acrylic plate by the total light transmittance of the double-sided antireflection laminate twice (for example, in the case of the double-sided antireflection laminate 140, the reflectance of the black acrylic plate (%)×the total light transmittance of the double-sided antireflection laminate 140 (%)/100×the total light transmittance of the double-sided antireflection laminate 140 (%)/100).

The luminous reflectance Y measured at the first face 140A of the double-sided antireflection laminate 140 is preferably equal to or greater than the luminous reflectance Y measured at the second face 140B of the double-sided antireflection laminate 140. In cases where the double-sided antireflection laminate is used for a facial transparent protector, the outer face having a lower luminous reflectance makes it possible to inhibit a reflection, and thus, the face of a wearer of a facial transparent protector is easier for the other person to see. In addition, enhancing the anti-fogging ability of the inner face of the double-sided antireflection laminate tends to increase the luminous reflectance Y. Because of this, allowing the luminous reflectance Y measured at the first face 140A of the double-sided antireflection laminate 140 to be equal to or greater than the luminous reflectance Y measured at the second face 140B of the double-sided antireflection laminate 140 makes the face of a wearer of a facial transparent protector easier for the other person to see, and makes it possible to enhance the anti-fogging ability of the inner face.

The absolute value ΔY2 of a difference between the luminous reflectance Y measured at the first face 140A of the double-sided antireflection laminate 140 (the surface 10A of the transparent laminate 10) and the luminous reflectance Y measured at the second face 140B (the surface 160A of the antireflection film 160) (|the luminous reflectance of the first face−the luminous reflectance of the second face|) is preferably 1.0% or less. With this ΔY2 of 1.0% or less, light reflection can be inhibited, the transparency is high, and in addition, the visibility is favorable, even in cases where visual recognition is performed at either the first face 140A side or the second face 140B side. This $\Delta Y2$ is more preferably 0.5% or less. The lower limit of the $\Delta Y2$ is 0% or more.

The double-sided antireflection laminate 140 preferably has a total light transmittance of 90% or more. The double-sided antireflection laminate 140 having a total light transmittance of 90% or more makes it possible to obtain a sufficient optical performance. The double-sided antireflection laminate 140 more preferably has a total light transmittance of 90% or more, 91% or more, or 92% or more. The upper limit of the total light transmittance of the double-sided antireflection laminate 140 is 100% or less. The total light transmittance of the double-sided antireflection laminate 140 can be measured in the same manner as the total light transmittance of the transparent laminate 10.

<Transparent Adhesion Layer>

The transparent adhesion layer 150 is intended to join the transparent laminate 10 with the antireflection film 160. As used herein, a "transparent adhesion layer" is a transparent layer for joining the members with each other, and has a concept that encompasses a transparent adhesive layer. The film thickness of the transparent adhesion layer 150 is preferably, for example, but not limited particularly to, 2 μm or more and 200 μm or less. The transparent adhesion layer 150 having a film thickness of 2 μm or more makes it possible to join the transparent laminate 10 with the antireflection film 160 reliably, and in addition, 200 μm or less makes it possible to maintain the transparency (light-transmitting ability). The film thickness of the transparent adhesion layer 150 is more preferably 5 μm or more and 200 μm or less, 10 μm or more and 200 μm or less, 15 μm or more and 200 μm or less, 2 μm or more and 170 μm or less, 5 μm or more and 170 μm or less, 10 μm or more and 170 μm or less, 15 μm or more and 170 μm or less, 2 μm or more and 160 μm or less, 5 μm or more and 160 μm or less, 10 μm or more and 160 μm or less, 15 μm or more and 160 μm or less, 2 μm or more and 150 μm or less, 5 μm or more and 150 μm or less, 10 μm or more and 150 μm or less, or 15 μm or more and 150 μm or less. The film thickness of the transparent adhesion layer 150 can be measured by the same method as the film thickness of the functional layer 12.

<Antireflection Film>

The antireflection film 160 is a film for inhibiting the reflection of external light. The antireflection film 160 is limited to no particular structure. For example, the antireflection film 160 depicted in FIG. 8 is a transparent laminate in which a base material 161, a functional layer 162, and a low-refractive-index layer 163 are laminated in this order. The base material 161 is the same as the base material 11, and the low-refractive-index layer 163 is the same as the low-refractive-index layer 13, and they are omitted from the description here.

(Functional Layer)

The functional layer 162 is the same as the functional layer 12 except that the functional layer 162 contains no anti-fogging material. However, the functional layer 162 may contain an anti-fogging material in the same manner as the functional layer 12.

<<Other Double-sided Antireflection Laminate>>

The double-sided antireflection laminate 140 has the transparent laminate 10 at one face thereof, but, for example, may have the transparent laminate 10 at both of the faces thereof as the double-sided antireflection laminate 180 depicted in FIG. 10 does. In this case, the first face (inner face) 180A and second face (outer face) 180B of the double-sided antireflection laminate 180 are the surfaces 10A of the transparent laminate 10. A facial transparent protector including such a double-sided antireflection laminate 180 makes it possible to inhibit the double-sided antireflection laminate 180 from fogging even in cases where a factor for fogging exists not only on the inner face side of the double-sided antireflection laminate 180 but also on the outer face side thereof.

The double-sided antireflection laminate 140 includes the transparent laminate 10, the transparent adhesion layer 150, and the antireflection film 160 in this order, but may have a transparent film 191 arranged between the transparent laminate 10 and the antireflection film 160 as the double-sided antireflection laminate 190 depicted in FIG. 11 does. In this case, the double-sided antireflection laminate 190 includes the transparent laminate 10, a transparent adhesion layer 192, the transparent film 191, a transparent adhesion layer 193, and the antireflection film 160 in this order. In this case, the first face (inner face) 190A of the double-sided antireflection laminate 190 is the surface 10A of the transparent laminate 10. The second face (outer face) 190B of the double-sided antireflection laminate 190 is the surface 160A of the antireflection film 160. Such a double-sided antireflection laminate 190 is enabled to have stiffness and tension more than the double-sided antireflection laminate 140.

<Transparent Film>

The transparent film 191 preferably has a thickness of 20 μm or more and 200 μm or less. The transparent film 191 having a thickness of 20 μm or more enables the double-sided antireflection laminate 190 to have a degree of stiff and tension, and in addition, 200 μm or less makes it possible to attempt at lightness. The thickness of the transparent film 191 can be measured in the same manner as the thickness of the base material. The thickness of the transparent film 191 is more preferably 25 μm or more and 200 μm or less, 40 μm or more and 200 μm or less, 50 μm or more and 200 μm or less, 20 μm or more and 150 μm or less, 25 μm or more and 150 μm or less, 40 μm or more and 150 μm or less, 50 μm or more and 150 μm or less, 20 μm or more and 120 μm or less, 25 μm or more and 120 μm or less, 40 μm or more and 120 μm or less, 50 μm or more and 120 μm or less, 20 μm or more and 100 μm or less, 25 μm or more and 100 μm or less, 40 μm or more and 100 μm or less, or 50 μm or more and 100 μm or less. Examples of the transparent film 191 include, but are not limited to, such a film composed of a resin as described in the section on the base material 11.

<Transparent Adhesion Layer>

The transparent adhesion layers 192 and 193 are the same as the transparent adhesion layer 150, and are omitted from the description.

The facial transparent protector 120 includes the double-sided antireflection laminate 140. Instead of the double-sided antireflection laminate 140, however, a single-sided antireflection laminate 200 having an antireflection function at only one face thereof, as depicted in FIG. 12, may be used. For the single-sided antireflection laminate 200, a transparent laminate 30 including no base material may be used. In the single-sided antireflection laminate 200 depicted in FIG. 12, the transparent laminate 10 is bonded to a base material 201 via a transparent adhesion layer 202. That is, the single-sided antireflection laminate 200 includes the base material 201, the transparent adhesion layer 202, and the transparent laminate 30 that are laminated in this order. In addition, the first face (inner face) 200A of the single-sided antireflection laminate 200 is the surface 30A of the transparent laminate 30. Here, the single-sided antireflection laminate 200 has no release film, which was peeled away.

The base material 201 is the same as the base material 11, and the transparent adhesion layer 202 is the same as the transparent adhesion layer 150, and they are omitted from the description.

The facial transparent protector is prone to fog because exhaled air comes in contact with the inner face of the double-sided antireflection laminate. For this, the present embodiment allows the first faces 140A, 180A, and 190A of the double-sided antireflection laminates 140, 180, and 190 respectively to be the surface 10A of the transparent laminate 10, and thereby makes it possible to inhibit the double-sided antireflection laminates 140, 180, and 190 from fogging. In addition, the transparent laminate 10 has the low-refractive-index layer 13, and thus, can inhibit the reflection of light. This makes it possible to recognize the movement of the mouth, and give a feeling of security to the other person conversing.

EXAMPLES

The present invention will now be described in more detail with reference to Examples below. The present invention is not limited to the description of these Examples.

<Production of Anti-Fogging Material>

The anti-fogging materials A to D were produced by the following procedures.

(Anti-Fogging Material A)

Ethylene oxide (EO) was repeatedly added to pentaerythritol, and to the resulting product, acrylic acid was finally added for esterification to obtain an anti-fogging material A that was ethoxylated pentaerythritol tetraacrylate modified with 35 EO units.

(Anti-Fogging Material B)

EO was repeatedly added to dipentaerythritol, and to the resulting product, acrylic acid was finally added for esterification to obtain an anti-fogging material B that was ethoxylated dipentaerythritol polyacrylate modified with 48 EO units.

(Anti-Fogging Material C)

EO was repeatedly added to glycerine, and to the resulting product, acrylic acid was finally added for esterification to obtain an anti-fogging material C that was ethoxylated pentaerythritol tetraacrylate modified with 9 EO units.

(Anti-Fogging Material D)

EO was repeatedly added to trimethylolpropane, and to the resulting product, acrylic acid was finally added for esterification to obtain an anti-fogging material D that was ethoxylated pentaerythritol tetraacrylate modified with 20 EO units.

<Preparation of Composition for Hard Coat Layer>

The components were blended to have the below-mentioned composition, whereby a composition for a hard coat layer was obtained.

(Composition 1 for Hard Coat Layer)

- Anti-fogging material (a product named "NFK-551", manufactured by NEOS Company Limited), 7 parts by mass
- 1,6-Hexanediol diacrylate (a product named "HDDA", manufactured by Daicel-Allnex Ltd.), 0.9 part by mass
- Polymerization initiator (1-hydroxycyclohexyl phenyl ketone, a product named "Omnirad 184", manufactured by IGM Resins B.V.), 0.12 part by mass
- Methyl ethyl ketone (MEK), 1.05 parts by mass
- Methyl isobutyl ketone (MIBK), 1.05 parts by mass (Composition 2 for Hard Coat Layer)

- Anti-fogging material (a product named "8WX-083", manufactured by Taisei Fine Chemical Co., Ltd.), 5.56 parts by mass
- 1,6-Hexanediol diacrylate (a product named "HDDA", manufactured by Daicel-Allnex Ltd.), 0.9 part by mass
- Polymerization initiator (1-hydroxycyclohexyl phenyl ketone, a product named "Omnirad 184", manufactured by BASF Japan Ltd.), 0.12 part by mass
- Methyl ethyl ketone (MEK): 1.77 parts by mass
- Methyl isobutyl ketone (MIBK), 1.77 parts by mass (Composition 3 for Hard Coat Layer)

- Anti-fogging material (a product named "KRM 8713B", manufactured by Daicel-Allnex Ltd.), 4.67 parts by mass
- 1,6-Hexanediol diacrylate (a product named "HDDA", manufactured by Daicel-Allnex Ltd.), 0.9 part by mass
- Polymerization initiator (1-hydroxycyclohexyl phenyl ketone, a product named "Omnirad 184", manufactured by IGM Resins B.V.), 0.12 part by mass
- Methyl ethyl ketone (MEK), 2.215 parts by mass
- Methyl isobutyl ketone (MIBK), 2.215 parts by mass (Composition 4 for Hard Coat Layer)

- Anti-fogging material A, 2.10 parts by mass
- 1,6-Hexanediol diacrylate (a product named "HDDA", manufactured by Daicel-Allnex Ltd.), 0.9 part by mass
- Polymerization initiator (1-hydroxycyclohexyl phenyl ketone, a product named "Omnirad 184", manufactured by IGM Resins B.V.), 0.12 part by mass
- Methyl ethyl ketone (MEK), 3.5 parts by mass
- Methyl isobutyl ketone (MIBK): 3.5 parts by mass (Composition 5 for Hard Coat Layer)

- Anti-fogging material (a product named "A-GLY-20E", manufactured by Shin-Nakamura Chemical Co., Ltd.), 2.10 parts by mass
- 1,6-Hexanediol diacrylate (a product named "HDDA", manufactured by Daicel-Allnex Ltd.), 0.9 part by mass
- Polymerization initiator (1-hydroxycyclohexyl phenyl ketone, a product named "Omnirad 184", manufactured by IGM Resins B.V.), 0.12 part by mass
- Methyl ethyl ketone (MEK), 3.5 parts by mass
- Methyl isobutyl ketone (MIBK): 3.5 parts by mass (Composition 6 for Hard Coat Layer)

- Urethane acrylate (a product named "ARONIX M-1100", manufactured by Toagosei Co., Ltd.), 2.10 parts by mass
- 1,6-Hexanediol diacrylate (a product named "HDDA", manufactured by Daicel-Allnex Ltd.), 0.9 part by mass
- Polymerization initiator (1-hydroxycyclohexyl phenyl ketone, a product named "Omnirad 184", manufactured by IGM Resins B.V.), 0.12 part by mass
- Methyl ethyl ketone (MEK), 3.5 parts by mass
- Methyl isobutyl ketone (MIBK): 3.5 parts by mass (Composition 7 for Hard Coat Layer)

- Anti-fogging material (a product named "KRM 8713B", manufactured by Daicel-Allnex Ltd.), 5.67 parts by mass
- 1,6-Hexanediol diacrylate (a product named "HDDA", manufactured by Daicel-Allnex Ltd.), 0.45 part by mass
- Polymerization initiator (1-hydroxycyclohexyl phenyl ketone, a product named "Omnirad 184", manufactured by IGM Resins B.V.), 0.12 part by mass
- Methyl ethyl ketone (MEK), 1.94 parts by mass
- Methyl isobutyl ketone (MIBK), 1.94 parts by mass (Composition 8 for Hard Coat Layer)

Anti-fogging material (a product named "KRM 8713B", manufactured by Daicel-Allnex Ltd.), 0.67 part by mass 1,6-Hexanediol diacrylate (a product named "HDDA", manufactured by Daicel-Allnex Ltd.), 2.7 parts by mass Polymerization initiator (1-hydroxycyclohexyl phenyl ketone, a product named "Omnirad 184", manufactured by IGM Resins B.V.), 0.12 part by mass Methyl ethyl ketone (MEK), 3.315 parts by mass Methyl isobutyl ketone (MIBK), 3.315 parts by mass (Composition 9 for Hard Coat Layer)

Anti-fogging material (a product named "KRM 8713B", manufactured by Daicel-Allnex Ltd.), 4.67 parts by mass Trimethylolpropane triacrylate (a product named "LIGHT ACRYLATE TMP-A", manufactured by Kyoeisha Chemical Co., Ltd.), 0.9 part by mass Polymerization initiator (1-hydroxycyclohexyl phenyl ketone, a product named "Omnirad 184", manufactured by IGM Resins B.V.), 0.12 part by mass Methyl ethyl ketone (MEK), 2.215 parts by mass Methyl isobutyl ketone (MIBK), 2.215 parts by mass (Composition 10 for Hard Coat Layer)

Anti-fogging material (a product named "KRM 8713B", manufactured by Daicel-Allnex Ltd.), 4.67 parts by mass A mixture of dipentaerythritol hexaacrylate and dipentaerythritol pentaacrylate (a product named "KAYARAD DPHA", manufactured by Nippon Kayaku Co., Ltd.), 0.9 part by mass Polymerization initiator (1-hydroxycyclohexyl phenyl ketone, a product named "Omnirad 184", manufactured by IGM Resins B.V.), 0.12 part by mass Methyl ethyl ketone (MEK): 2.215 parts by mass Methyl isobutyl ketone (MIBK), 2.215 parts by mass (Composition 11 for Hard Coat Layer)

Anti-fogging material (a product named "KRM 8713B", manufactured by Daicel-Allnex Ltd.), 4.67 parts by mass Tricyclodecane dimethanol diacrylate (a product named "IRR214-K", manufactured by Daicel-Allnex Ltd.), 0.9 part by mass Polymerization initiator (1-hydroxycyclohexyl phenyl ketone, a product named "Omnirad 184", manufactured by IGM Resins B.V.), 0.12 part by mass Methyl ethyl ketone (MEK): 2.215 parts by mass Methyl isobutyl ketone (MIBK), 2.215 parts by mass (Composition 12 for Hard Coat Layer)

1,6-Hexanediol diacrylate (a product named "HDDA", manufactured by Daicel-Allnex Ltd.), 3 parts by mass Polymerization initiator (1-hydroxycyclohexyl phenyl ketone, a product named "Omnirad 184", manufactured by IGM Resins B.V.), 0.12 part by mass Methyl ethyl ketone (MEK), 3.5 parts by mass Methyl isobutyl ketone (MIBK), 3.5 parts by mass (Composition 13 for Hard Coat Layer)

Trimethylolpropane triacrylate (a product named "LIGHT ACRYLATE TMP-A", manufactured by Kyoeisha Chemical Co., Ltd.), 3 parts by mass Polymerization initiator (1-hydroxycyclohexyl phenyl ketone, a product named "Irgacure (registered trademark) 184", manufactured by BASF Japan Ltd.), 0.12 part by mass Methyl ethyl ketone (MEK), 3.5 parts by mass Methyl isobutyl ketone (MIBK), 3.5 parts by mass (Composition 14 for Hard Coat Layer)

A mixture of dipentaerythritol hexaacrylate and dipentaerythritol pentaacrylate (a product named "KAYARAD DPHA", manufactured by Nippon Kayaku Co., Ltd.), 3 parts by mass Polymerization initiator (1-hydroxycyclohexyl phenyl ketone, a product named "Omnirad 184", manufactured by IGM Resins B.V.), 0.12 part by mass Methyl ethyl ketone (MEK), 3.5 parts by mass Methyl isobutyl ketone (MIBK), 3.5 parts by mass (Composition 15 for Hard Coat Layer)

Anti-fogging material A, 3.20 parts by mass

Trimethylolpropane triacrylate (a product named "LIGHT ACRYLATE TMP-A", manufactured by Kyoeisha Chemical Co., Ltd.), 0.80 part by mass Fluorine-based nonreactive surfactant (a leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 16 for Hard Coat Layer)

Anti-fogging material B, 2.80 parts by mass

Trimethylolpropane triacrylate (a product named "LIGHT ACRYLATE TMP-A", manufactured by Kyoeisha Chemical Co., Ltd.), 1.20 parts by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 17 for Hard Coat Layer)

Anti-fogging material A, 2.60 parts by mass

Trimethylolpropane triacrylate (a product named "LIGHT ACRYLATE TMP-A", manufactured by Kyoeisha Chemical Co., Ltd.), 1.40 parts by mass Fluorine-based nonreactive surfactant (a leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 18 for Hard Coat Layer)

Anti-fogging material A, 3.60 parts by mass

Trimethylolpropane triacrylate (a product named "LIGHT ACRYLATE TMP-A", manufactured by Kyoeisha Chemical Co., Ltd.), 0.40 part by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 19 for Hard Coat Layer)

Anti-fogging material B, 3.20 parts by mass

Trimethylolpropane triacrylate (a product named "LIGHT ACRYLATE TMP-A", manufactured by Kyoeisha Chemical Co., Ltd.), 0.80 part by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 20 for Hard Coat Layer)

Anti-fogging material D, 3.20 parts by mass

Trimethylolpropane triacrylate (a product named "LIGHT ACRYLATE TMP-A", manufactured by Kyoeisha Chemical Co., Ltd.), 0.80 part by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 21 for Hard Coat Layer)

Urethane acrylate (a product named "ARONIX M-1100", manufactured by Toagosei Co., Ltd.), 2.80 parts by mass Anti-fogging material A, 0.40 parts by mass Trimethylolpropane triacrylate (a product named "LIGHT ACRYLATE TMP-A", manufactured by Kyoeisha Chemical Co., Ltd.), 0.80 part by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 22 for Hard Coat Layer)

Urethane acrylate (a product named "ARONIX M-1100", manufactured by Toagosei Co., Ltd.), 3.20 parts by mass Trimethylolpropane triacrylate (a product named "LIGHT ACRYLATE TMP-A", manufactured by Kyoeisha Chemical Co., Ltd.), 0.80 part by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 23 for Hard Coat Layer)

Urethane acrylate (a product named "ARONIX M-1100", manufactured by Toagosei Co., Ltd.), 2.00 parts by mass Trimethylolpropane triacrylate (a product named "LIGHT ACRYLATE TMP-A", manufactured by Kyoeisha Chemical Co., Ltd.), 2.00 parts by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 24 for Hard Coat Layer)

Anti-fogging material A, 3.20 parts by mass

Trimethylolpropane triacrylate (a product named "LIGHT ACRYLATE TMP-A", manufactured by Kyoeisha Chemical Co., Ltd.), 0.80 part by mass Fluorine-based nonreactive surfactant (leveling agent, a product named "F-477", manufactured by DIC Corporation), 0.1 part by mass Polymerization initiator (1-hydroxycyclohexyl phenyl ketone, a product named "Omnirad 184", manufactured by IGM Resins B.V.), 0.16 part by mass Methyl ethyl ketone (MEK), 4.80 parts by mass Methyl isobutyl ketone (MIBK), 1.20 parts by mass (Composition 25 for Hard Coat Layer)

Anti-fogging material A, 2.00 parts by mass

Trimethylolpropane triacrylate (a product named "LIGHT ACRYLATE TMP-A", manufactured by Kyoeisha Chemical Co., Ltd.), 2.00 parts by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 26 for Hard Coat Layer)

Anti-fogging material C, 3.20 parts by mass

Trimethylolpropane triacrylate (a product named "LIGHT ACRYLATE TMP-A", manufactured by Kyoeisha Chemical Co., Ltd.), 0.80 part by mass Fluorine-based nonreactive surfactant (leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 27 for Hard Coat Layer)

Polyethylene glycol diacrylate (a product named "ARONIX M-240", manufactured by Toagosei Co., Ltd.), 3.20 parts by mass Trimethylolpropane triacrylate (a product named "LIGHT ACRYLATE TMP-A", manufactured by Kyoeisha Chemical Co., Ltd.), 0.80 part by mass Fluorine-based nonreactive surfactant (a leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass (Composition 28 for Hard Coat Layer)

1,6-hexanediol diacrylate (a product named "HDDA", manufactured by Daicel-Allnex Ltd.), 1 part by mass High-refractive-index monofunctional monomer (a product named "LIGHT ACRYLATE POB-A", manufactured by Kyoeisha Chemical Co., Ltd.), 2 parts by mass Fluorine-based nonreactive surfactant (a leveling agent, a product named "F-477", manufactured by DIC Corporation), 0.1 part by mass Polymerization initiator (1-hydroxycyclohexyl phenyl ketone, a product named "Omnirad 184", manufactured by IGM Resins B.V.), 0.12 part by mass Methyl ethyl ketone (MEK), 3.5 parts by mass Methyl isobutyl ketone (MIBK), 3.5 parts by mass (Composition 29 for Hard Coat Layer)

Ethoxylated (15) trimethylolpropane triacrylate (a product named "SR9035", manufactured by Sartomer), 3.45 parts by mass Pentaerythritol alkoxy tetraacrylate (a product named "EBECRYL 40", manufactured by Daicel-Allnex Ltd.), 0.86 part by mass Acrylate modified perfluoro polyether (a product named "OPTOOLDAC-HP", manufactured by Daikin Industries, Ltd.), 0.23 part by mass Polymerization initiator (1-hydroxycyclohexyl phenyl ketone, a product named "Omnirad 184", manufactured by IGM Resins B.V.), 0.14 part by mass Isopropyl alcohol (IPA), 0.5 part by mass (Composition 30 for Hard Coat Layer)

Anti-fogging material A, 4.00 parts by mass

Fluorine-based nonreactive surfactant (a leveling agent, a product named "F-477", manufactured by DIC Corporation), 0.1 part by mass Polymerization initiator (a product named "Omnirad 127", manufactured by IGM Resins B.V.), 0.16 part by mass Methyl ethyl ketone (MEK), 4.80 parts by mass Methyl isobutyl ketone (MIBK), 1.20 parts by mass <Preparation of Composition for Low-Refractive-Index Layer>

The components were blended to have the below-mentioned composition, whereby a composition for a low-refractive-index Layer was obtained.

(Composition 1 for Low-Refractive-Index Layer)

A mixture of pentaerythritol triacrylate and pentaerythritol tetraacrylate (trifunctional, a product named "KAYARAD PET-30", manufactured by Nippon Kayaku Co., Ltd.), 0.14 part by mass Hollow silica microparticle dispersion liquid (microparticles having an average particle diameter of 55 nm and a 20% by mass solid content; manufactured by JGC Catalysts & Chemicals Ltd.; dispersed in methyl isobutyl ketone), 0.80 part by mass Methyl isobutyl ketone, 4.44 parts by mass Propylene glycol monomethyl ether acetate, 1.00 part by mass Organic silicone having a reactive functional group (a product named "X-22-164E", manufactured by Shin-Etsu Chemical Co., Ltd.), 0.03 part by mass Polymerization initiator (a product named "Irgacure (registered trademark) 127", manufactured by BASF Japan Ltd.), 0.01 part by mass (Composition 2 for Low-Refractive-Index Layer)

A mixture of pentaerythritol triacrylate and pentaerythritol tetraacrylate (trifunctional, a product named "KAYARAD PET-30", manufactured by Nippon Kayaku Co., Ltd.), 0.16 part by mass Hollow silica microparticle dispersion liquid (microparticles having an average particle diameter of 55 nm and a 20% by mass solid content; manufactured by JGC Catalysts & Chemicals Ltd.; dispersed in methyl isobutyl ketone), 0.80 part by mass Methyl isobutyl ketone, 8.10 parts by mass Propylene glycol monomethyl ether acetate, 1.10 parts by mass Organic silicone having a reactive functional group (a product named "X-22-164E", manufactured by Shin-Etsu Chemical Co., Ltd.), 0.03 part by mass Polymerization initiator (a product named "Omnirad 127", manufactured by IGM Resins B.V.), 0.01 part by mass (Composition 3 for Low-Refractive-Index Layer)

A mixture of pentaerythritol triacrylate and pentaerythritol tetraacrylate (trifunctional, a product named "KAYARAD PET-30", manufactured by Nippon Kayaku Co., Ltd.), 0.20 part by mass Hollow silica microparticle dispersion liquid (microparticles having an average particle diameter of 55 nm and a 20% by mass solid content; manufactured by JGC Catalysts & Chemicals Ltd.; dispersed in methyl isobutyl ketone), 0.80 part by mass Methyl isobutyl ketone, 9.10 parts by mass Propylene glycol monomethyl ether acetate, 1.20 parts by mass Organic silicone having a reactive functional group (a product named "X-22-164E", manufactured by Shin-Etsu Chemical Co., Ltd.), 0.04 part by mass Polymerization initiator (a product named "Omnirad 127", manufactured by IGM Resins B.V.), 0.01 part by mass (Composition 4 for Low-Refractive-Index Layer)

A mixture of pentaerythritol triacrylate and pentaerythritol tetraacrylate (trifunctional, a product named "KAYARAD PET-30", manufactured by Nippon Kayaku Co., Ltd.), 0.16 part by mass Hollow silica microparticle dispersion liquid (microparticles having an average particle diameter of 55 nm and a 20% by mass solid content; manufactured by JGC Catalysts & Chemicals Ltd.; dispersed in methyl isobutyl ketone), 0.80 part by mass Methyl isobutyl ketone, 8.86 parts by mass Propylene glycol monomethyl ether acetate, 1.00 part by mass Organic silicone having a reactive functional group (a product named "X-22-164E", manufactured by Shin-Etsu Chemical Co., Ltd.), 0.03 part by mass Polymerization initiator (a product named "Omnirad 127", manufactured by IGM Resins B.V.), 0.01 part by mass (Composition 5 for Low-Refractive-Index Layer)

A mixture of pentaerythritol triacrylate and pentaerythritol tetraacrylate (trifunctional, a product named "KAYARAD PET-30", manufactured by Nippon Kayaku Co., Ltd.), 0.09 part by mass Hollow silica microparticle dispersion liquid (microparticles having an average particle diameter of 55 nm and a 20% by mass solid content; manufactured by JGC Catalysts & Chemicals Ltd.; dispersed in methyl isobutyl ketone), 0.80 part by mass Methyl isobutyl ketone, 6.90 parts by mass Propylene glycol monomethyl ether acetate, 0.84 part by mass Organic silicone having a reactive functional group (a product named "X-22-164E", manufactured by Shin-Etsu Chemical Co., Ltd.), 0.01 part by mass Polymerization initiator (a product named "Omnirad 127", manufactured by IGM Resins B.V.), 0.01 part by mass (Composition 6 for Low-Refractive-Index Layer)

Anti-fogging material A, 0.16 parts by mass

Hollow silica microparticle dispersion liquid (microparticles having an average particle diameter of 55 nm and a 20% by mass solid content; manufactured by JGC Catalysts & Chemicals Ltd.; dispersed in methyl isobutyl ketone), 0.80 part by mass Methyl isobutyl ketone, 8.86 parts by mass Propylene glycol monomethyl ether acetate, 1.00 part by mass Organic silicone having a reactive functional group (a product named "X-22-164E", manufactured by Shin-Etsu Chemical Co., Ltd.), 0.03 part by mass Polymerization initiator (a product named "Omnirad 127", manufactured by IGM Resins B.V.), 0.01 part by mass

Example 1

A triacetyl cellulose base material (a product named "TD P60", manufactured by Toray Industries, Inc.) having a thickness of 60 μm as a base material was made ready for use. The above-mentioned composition 1 for a hard coat layer was applied to one face of the triacetyl cellulose base material to form a coating film. Then, the coating film formed was dried at 70° C. for 30 seconds to evaporate the solvent from the coating film. The resulting coating film was cured under exposure to ultraviolet light to a cumulative light dose of 200 $mJ/cm^2$ in a nitrogen atmosphere (having an oxygen concentration of 200 ppm or less) to form a hard coat layer having a refractive index of 1.51 and a film thickness of 5 μm. Next, the composition 1 for a low-refractive-index layer was applied to the hard coat layer to form a coating film. Then, the coating film formed was dried at room temperature for 60 seconds and then dried at 50° C. for 60 seconds. Then, the resulting coating film was cured under exposure to ultraviolet light to a cumulative light dose of 100 $mJ/cm^2$ in a nitrogen atmosphere (having an oxygen concentration of 200 ppm or less) to form a low-refractive-index layer having a refractive index of 1.35 and a film thickness of 100 nm, whereby a transparent laminate having a thickness of 65.1 μm was produced.

The thickness of the triacetyl cellulose base material was determined as the arithmetic average of the thickness values at 10 points on the triacetyl cellulose base material, in which the thickness values were measured at the 10 points on a cross-sectional image of the triacetyl cellulose base material photographed using a scanning electron microscope (SEM, "a product named S-4800", manufactured by Hitachi High-Technologies Corporation). A specific method of photographing a cross-sectional image is described below. First, a sample 1 mm×10 mm in size was cut out of a transparent laminate. The sample cut out is embedded in an embedding resin to produce a block. Then, out of this block, a homogeneous section having a thickness of 70 nm or more and 100 nm or less and having no opening or the like was cut out according to a common sectioning technique. For the production of the section, an Ultramicrotome EM UC7 manufactured by Leica Microsystems GmbH was used. Then, the block remaining after cutting out the homogeneous section having no opening or the like was used as a measurement sample. Subsequently, a cross-sectional image of the measurement sample was photographed using the above-mentioned scanning electron microscope. Here, when the cross-sectional image was photographed, the cross-section was observed with the detector, the accelerating voltage, and the emission current set at "SE," "5 kV," and "10 μA" respectively. The focus, contrast, and brightness were appropriately adjusted at a magnification of 100 to 100,000 times so that each layer can be identified by observation. Furthermore, the beam monitor aperture, the objective lens aperture, and the WD were set at "3," "3," and "8 mm" respectively.

The film thickness of the hard coat layer was determined as the arithmetic average of the film thickness values measured at 20 different points on a cross-sectional image of the hard coat layer, in which the film thickness values were measured at the 20 points on the cross-section of the hard coat layer photographed using a scanning transmission electron microscope (STEM, a product named "S-4800", manufactured by Hitachi High-Technologies Corporation). A specific method of photographing a cross-sectional image is described below. First, a section 70 nm or more and 100 nm or less was cut out of a transparent laminate in the same manner as above-mentioned, using an Ultramicrotome EM UC7 of Leica Microsystems GmbH. This homogeneous section having no hole or the like was used as a measurement sample. Subsequently, a cross-sectional image of the measurement sample was photographed using the above-mentioned scanning transmission electron microscope. Here, when the cross-sectional image was photographed, the cross-section was observed with the detector, the accelerating voltage, and the emission current set at "TE," "30 kV," and "10 μA" respectively. When the cross-sectional image was photographed using the above-mentioned S-4800, the beam monitor aperture, the objective lens aperture, and the WD were set at "3," "3," and "8 mm," respectively. The film thickness of the low-refractive-index layer was measured by the same method as the film thickness of the hard coat layer.

The refractive index of each of the hard coat layer and the low-refractive-index layer was measured or calculated in accordance with the (procedure 1) and the (procedure 2) described in the section on the functional layer 12 because the film thickness of the hard coat layer was 5 μm, and the film thickness of the low-refractive-index layer was 100 nm. Specifically, the refractive index of the hard coat layer was first measured by the Becke method. In cases where the refractive index of a hard coat layer was measured by the Becke method, the refractive index of the hard coat layer was determined as the arithmetic average of the refractive index values of 10 samples, in which the 10 samples were sliced off from the hard coat layer, and the refractive index of each of the 10 samples taken out was measured by the Becke method using a refractive index standard solution. Then, the refractive index of the low-refractive-index layer was calculated by the fitting method using the information on the refractive index and film thickness of the hard coat layer and the information on the film thickness of the low-refractive-index layer.

Also in Examples 2 to 32 and Comparative Examples 1 to 18, the thickness of the base material and the film thickness and refractive index of each of the hard coat layer and the low-refractive-index layer were measured by the same methods as in Example 1.

Examples 2 to 13 and 15 to 25 and Comparative Examples 1 to 3 and 7 to 13

In Examples 2 to 13 and 15 to 25 and Comparative Examples 1 to 3 and 7 to 13, transparent laminates were obtained in the same manner as in Example 1 except that those compositions for a hard coat layer and those compositions for a low-refractive-index layer which are listed in Table 1 or Table 2 were used.

Example 14

In Example 14, a transparent adhesive layer (a product named "PD-S1", manufactured by Panac Co., Ltd.) having a film thickness of 25 μm was used to bond the transparent laminate according to Example 9 and the transparent laminate according to Comparative Example 2 to each other in such a manner that the base materials faced each other. A double-sided antireflection laminate was thereby obtained. In the double-sided antireflection laminate according to Example 14 or the below-mentioned sample, the surface of the transparent laminate according to Example 9 (the surface of the low-refractive-index layer) was set as the first face, and the surface of the transparent laminate according to Comparative Example 2 (the surface of the low-refractive-index layer) was set as the second face.

Comparative Examples 4 and 5

In Comparative Examples 4 and 5, transparent laminates were obtained in the same manner as in Example 1 except that the compositions for a hard coat layer listed in Table 1 were used instead of the composition 1 for a hard coat layer, and that no low-refractive-index layer was formed.

Comparative Example 6

In Comparative Example 6, a transparent adhesive layer (a product named "PD-S1", manufactured by Panac Co., Ltd.) having a film thickness of 25 μm was used to bond two transparent laminates according to Comparative Example 2 to each other in such a manner that the base materials faced each other. A double-sided antireflection laminate was thereby obtained. In the double-sided antireflection laminate according to Comparative Example 6 or the below-mentioned sample, the surface of one of the transparent laminates according to Comparative Example 2 (the surface of the low-refractive-index layer) was set as the first face, and the surface of the other of the transparent laminates according to Comparative Example 2 (the surface of the low-refractive-index layer) was set as the second face.

Examples 26 to 32 and Comparative Examples 14 to 18

In Examples 26, two transparent laminates 1 and 2 were first obtained in the same manner as in Example 1 except that those compositions for a hard coat layer and those compositions for a low-refractive-index layer which are listed in Table 4 were used. Then, a transparent adhesive layer (a product named "PD-S1", manufactured by Panac Co., Ltd.) having a film thickness of 25 μm was used to bond the two transparent laminates 1 and 2 to each other in such a manner that the base materials faced each other. A double-sided antireflection laminate was thereby obtained. Here, the surface of the transparent laminate 1 was set as the first face of the double-sided antireflection laminate, and the surface of the transparent laminates 2 was set as the second face of the double-sided antireflection laminate. In Examples 27 to 32 and Comparative Examples 14 to 18, double-sided antireflection laminates were obtained in the same manner as in Example 26 except that those compositions for a hard coat layer and those compositions for a low-refractive-index layer which are listed in Table 4 were used.

<Anti-Fogging Ability Test>

The transparent laminates and the double-sided antireflection laminates according to Examples 1 to 25 and Comparative Examples 1 to 13 were tested in an anti-fogging ability test in which each transparent laminate was placed at −15° C. in a refrigerator for 5 minutes, then immediately transferred into an environment of 25° C. and a relative humidity of 50%, and left to stand for 5 minutes. Whether the surface of the transparent laminate (the surface of the low-refractive-index layer in the case of Examples 1 to 13 and 15 to 25 and Comparative Examples 1 to 3 and 7 to 13, and the surface of the hard coat layer in the case of Comparative Examples 4 and 5) after the anti-fogging ability test or the first face of the double-sided antireflection laminate (the surface of the low-refractive-index layer) after the anti-fogging ability test was fogged was verified. When the anti-fogging ability test was performed, a sample cut out of each of the transparent laminate and the double-sided antireflection laminate was used. The size of the sample was made 100 mm×100 mm. Then, this sample was bonded to the surface of a black acrylic plate 100 mm×100 mm×2 mm in size (a product named "COMOGLAS Acrylic Sheet", manufactured by Kuraray Co., Ltd.) with a transparent adhesive having a film thickness of 25 μm (a product named "PD-S1", manufactured by Panac Co., Ltd.). This bond was done in such a manner that the back surface of the transparent laminate or the second face of the double-sided antireflection laminate was the black acrylic plate side, whereby the surface of the transparent laminate or the first face of the double-sided antireflection laminate was made the observation side. Then, a piece formed in this manner was used as a measurement sample. The same measurement samples were produced, 3 sheets each. The measurement samples, 3 each (n=3), were used to perform each anti-fogging ability test. Whether the measurement sample (the transparent laminate or the double-sided antireflection laminate) was fogged was determined as follows: the measurement sample immediately after the anti-fogging ability test was placed on a flat table, and the surface of the measurement sample (the surface of the transparent laminate or the first face of the double-sided antireflection laminate) was observed visually. The visual observation was performed in front of the measurement sample at 1000 Lux in a room (the light source was a white light source), in which the position of the measurement sample was 30 cm apart from the surface of the sample. The evaluation criteria were as below-mentioned.

A: in none of the three samples, the surface of the transparent laminate or the first face of the double-sided antireflection laminate was fogged.

B: in two or more of the three samples, the surface of the transparent laminate or the first face of the double-sided antireflection laminate was fogged.

<Exhaled Air Test>

The transparent laminates according to Examples 1 to 13 and 15 to 25 and Comparative Examples 1 to 5 and 7 to 13 and the double-sided antireflection laminates according to Examples 14 and 26 to 32 and Comparative Examples 6 and 14 to 18 were tested in an exhaled air test. Specifically, a sample 100 mm×100 mm in size was first cut out of the transparent laminate, and a sample 17 cm×27 cm in size was cut out of the double-sided antireflection laminate. Then, in the case of the transparent laminate, a film was removed from a commercially available mouth shield (transparent mask), and in place of this film, the sample was bonded to the support of the mouth shield in such a manner that the sample was arranged in front of the mouth. When this was done, the sample was bonded in such a manner that the surface of the transparent laminate (the surface of the low-refractive-index layer in the cases of Examples 1 to 13 and 15 to 25 and Comparative Examples 1 to 3 and 7 to 13 and the surface of the hard coat layer in the cases of Comparative Examples 4 and 5) faced the mouth. Then, in the case of the double-sided antireflection laminate, a film was removed from a commercially available face shield, and in place of this film, the sample was bonded to the support of the film of the face shield in such a manner that the sample was arranged in front of a face, in particular the mouth. When this was done, the sample was bonded in such a manner that the first face of the double-sided antireflection laminate faced the mouth. Then, these samples were once fogged by exhaled air, as follows: in an environment of 25° C. and a relative humidity of 50%, a large volume of breath was exhaled to the center of the surface of the transparent laminate and the center of the first face of the double-sided antireflection laminate from a position 10 cm apart from this surface and the first face in the direction normal to the surface and the first face. Then, a conversation was carried out at 1000 Lux (the light source was a white light source) in a room for 30 minutes. Then, whether the fog disappeared or whether the mouth was seen well was observed in this 30 minutes. The observation distance was 1 m, and the observation was performed from the front side of the wearer of the mouth shield or the face shield. The evaluation criteria were as below-mentioned. The test subjects were 10 persons in their 20's to 50's.

- AA: with all of the persons, the fog disappeared from the surface of the transparent laminate or the first face of the double-sided antireflection laminate within 3 seconds, whereafter the surface and the first face were still hard to fog, and the mouth was seen well.
- A: with 8 to 9 of the persons, the fog disappeared from the surface of the transparent laminate or the first face of the double-sided antireflection laminate within 3 seconds, whereafter the surface and the first face were still hard to fog, and the mouth was seen well.
- B: with 3 or more of the persons, the fog did no disappear from the surface of the transparent laminate or the first face of the double-sided antireflection laminate, and the mouth was not seen well.

<Measurement of ΔY1 and Luminous Reflectance Y and Evaluation of Antireflection Ability>

Using the transparent laminates and double-sided antireflection laminates according to Examples 1 to 25 and Comparative Examples 1 to 13, the luminous reflectance Y of each of the transparent laminates and the double-sided antireflection laminates before and after the above-mentioned anti-fogging ability test was measured. Then, the absolute value ΔY1 of a difference in the luminous reflectance Y was calculated. In addition, the antireflection ability was evaluated using the luminous reflectance Y of the transparent laminate or the double-sided antireflection laminate before the anti-fogging ability test. Specifically, a sample 25 mm×50 mm in size was first cut out of the transparent laminate and out of the double-sided antireflection laminate. Then, using a spectrophotometer (a product named "UV-2600", manufactured by Shimadzu Corporation), the surface of the sample (the surface of the low-refractive-index layer in the cases of Examples 1 to 13 and 15 to 25 and Comparative Examples 1 to 3 and 7 to 13, the first face of the double-sided antireflection laminate in the cases of Example 14 and Comparative Example 6, and the surface of the hard coat layer in the cases of Comparative Examples 4 and 5) before the anti-fogging ability test was exposed to light the incidence angle of which was 5 degrees. Light reflected on the sample in the specular direction was received. The reflectance in the wavelength range of from 380 nm to 780 nm was measured. Then, the luminous reflectance Y before the anti-fogging ability test was determined using a software item (a software item pre-installed in UV-2600) for conversion in terms of the brightness that a person senses with the eyes. The luminous reflectance Y was the arithmetic average of the luminous reflectance values measured at 40 points, in which the 40 points for measurement were generally equally spaced so as to cover the whole sample. Then, an anti-fogging ability test was performed on the sample under the same conditions as the above-mentioned anti-fogging ability test. Then, the luminous reflectance Y of the sample after the anti-fogging ability test was determined in the same manner as the luminous reflectance Y of the sample before the anti-fogging ability test to determine the absolute value of a difference in the luminous reflectance Y of the surface 10A of the transparent laminate between before and after the anti-fogging ability test. Here, the luminous reflectance Y was measured with a black plate (a product named "COMOGLAS Acrylic Sheet", manufactured by Kuraray Co., Ltd.) 100 mm×100 mm×2 mm bonded to the opposite side of the triacetyl cellulose base material from the face having a hard coat layer formed thereon in the cases of Example 1 to 13 and 15 to 25 and Comparative Examples 1 to 5 and 7 to 13 and bonded to the second face of the double-sided antireflection laminate in the cases of Example 14 and Comparative Example 6. In addition, the evaluation criteria in the antireflection ability test were as below-mentioned.

- A: the luminous reflectance Y was 3.5% or less.
- B: the luminous reflectance Y was more than 3.5%.

<Measurement of Total Light Transmittance>

The total light transmittance of each of the transparent laminates and the double-sided antireflection laminates according to Examples and Comparative Examples was measured using a haze meter (a product named "HM-150", manufactured by Murakami Color Research Laboratory Co., Ltd.) in accordance with JIS K7361-1:1997 in an environment of a temperature of 23° C. and a relative humidity of 50%. Specifically, a sample 50 mm×100 mm in size was cut out of each of the transparent laminates and the double-sided antireflection laminates. Then the sample was placed in the haze meter in such a manner that the sample had no curl or wrinkle and had no fingerprint or dirt. Then, three measurements per sample were made, and the arithmetic average of the values obtained from the three measurements was regarded as the total light transmittance.

<Measurement of Haze Value>

The haze value of each of the transparent laminates and the double-sided antireflection laminates according to Examples and Comparative Examples was measured using a haze meter (a product named "HM-150", manufactured by Murakami Color Research Laboratory Co., Ltd.) in accordance with JIS K7136: 2000 in an environment of a temperature of 23° C. and a relative humidity of 50%. Specifically, a sample 50 mm×100 mm in size was cut out of each of the transparent laminates and the double-sided antireflection laminates. Then the sample was placed in the haze meter in such a manner that the sample had no curl or wrinkle and had no fingerprint or dirt. Then, three measurements per sample were made, and the arithmetic average of the values obtained from the three measurements was regarded as the haze value.

<Measurement of Contact Angle of Transparent Laminate>

In accordance with the sessile drop method described in JIS R3257: 1999, a contact angle with water at 25° C. was measured on the surface of the transparent laminate (the surface of the low-refractive-index layer in the cases of Examples 1 to 13 and Comparative Examples 1 to 3 and the surface of the hard coat layer in the cases of Comparative Examples 4 and 5) or the first face of the double-sided antireflection laminates according to Examples 1 to 14 and Comparative Examples 1 to 6. Specifically, a sample 25 mm×30 mm in size was first cut out of each of the transparent laminate and the double-sided antireflection laminate.

Then, this sample was flatly bonded onto a slide glass 50 mm×125 mm in size with a double-sided tape. Subsequently, the sample was exposed to ions from an ionizer (for example, a product named "KD-730B", manufactured by Kasuga Denki, Inc.) for 30 seconds to eliminate static electricity on the sample and thereby to prevent static electricity on the sample from influencing the measurement result. Using a microscopic contact angle meter (a product named "DropMaster 300", manufactured by Kyowa Interface Science Co., LTD.), 1 μL of water was dropped onto the surface of the sample (the surface of the low-refractive-index layer in the cases of Examples 1 to 13 and Comparative Examples 1 to 3, the first face of the double-sided antireflection laminate in the cases of Examples 14 and Comparative Examples 6, and the surface of the hard coat layer in the cases of Comparative Examples 4 and 5), and the contact angle immediately after the dropping was measured at 10 points. The arithmetic average of the values measured was regarded as the contact angle of the surface of the transparent laminate. The measurement of contact angle was performed in an environment of a temperature of 25° C. and a relative humidity of 50%.

<Peak Intensity Ratio>

The absorption spectrum of each of the transparent laminates according to Examples 15 to 25 and Comparative Examples 7 to 13 was measured by Fourier transform infrared spectroscopy (an FT-IR method). From the absorption spectrum, a ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ (peak intensity 2/peak intensity 1) was determined. Specifically, a sample 10 mm×10 mm or larger in size was first cut out of the transparent laminate. In addition, a background measurement was made using a measurement device composed of a Fourier transform infrared spectrophotometer (a product named "Nicolet iS10 FT-IR", manufactured by Thermo Fisher Scientific Inc.) with a measurement accessory (a product named "Thunderdome", manufactured by Spectra-Tech Inc.; ATR crystal, Ge; infrared incidence angle, 45°) attached, in which device no sample was placed. Then, the sample was placed in the measurement accessory with the measurement face of the sample facing the crystal side of the measurement accessory. Then, the knob of the presser jig was turned to bring the sample in sufficient contact with the crystal. Then, an absorption spectrum of the sample was checked on the monitor, and then, a measurement was started on the measurement device under the below-mentioned measurement conditions. From the background in the resulting absorption spectrum, the height to the peak top of each of the peak in the first wave number region and the peak in the second wave number region was determined using a computing software item accompanying the measurement device. From the results, the peak intensity ratio was calculated. In this regard, in the cases of the transparent laminates according to Examples 21 to 23, the hard coat layer contained urethane acrylate, and thus, a peak was measured in a third wave number region of from 1540 $cm^{-1}$ to 1560 $cm^{-1}$ in the absorption spectrum measured by Fourier transform infrared spectroscopy (an FT-IR method).

(Measurement Conditions)

Wave number range: 4000 to 800 $cm^{-1}$
Number of scans: 64
Resolution: 8 $cm^{-1}$
Detector: TGS
ATR correction: not done
Measure and analysis software: Thermo Scientific OMNIC <Measurement of Indentation Hardness $H_{IT}$ and Composite Elastic Modulus Er>

The indentation hardness $H_{IT}$ and composite elastic modulus Er of the surface of the transparent laminate according to each of Examples 15 to 25 and Comparative Examples 7 to 13 was measured. Specifically, a transparent laminate cut to 20 mm×20 mm in size was first fixed to a commercially available slide glass via an adhesive resin (a product named "ARON ALPHA (registered trademark) for General Use", manufactured by Toagosei Co., Ltd.) in such a manner that the surface side of the transparent laminate was the upper face. Specifically, a drop of the above-described adhesive resin was placed at the center of a slide glass 1 (a product named "Slide glass (Strainer), 1-9645-11", manufactured by AS One Corporation). In this step, the adhesive resin was not spread over the slide glass, and one drop of the adhesive resin was applied in such a manner that the adhesive resin did not extend beyond the transparent laminate when pressed and spread as described below. Subsequently, the transparent laminate cut to the above-mentioned size was brought in contact with the slide glass in such a manner that the surface side of the transparent laminate was the upper side, and that the adhesive resin was located in the center of the transparent laminate. Then, the adhesive resin was pressed and spread between the slide glass 1 and the transparent laminate for temporary adhesion. Then, another new slide glass 2 was placed on the transparent laminate to obtain a laminate composed of the slide glass 1, the adhesive resin, the transparent laminate, and the slide glass 2. Subsequently, a weight of 30 g to 50 g was left to stand on the slide glass 2 at room temperature for 12 hours. Then, the weight and the slide glass 2 were removed from the laminate, and the rest was used as a measurement sample. The measurement sample was fixed on the measurement stage of a microhardness tester (a product named "TI950 TriboIndenter", manufactured by Hysitron Inc.) placed horizontally on an anti-vibration table. After the measurement sample was fixed on the measurement stage of the microhardness tester, the indentation hardness $H_{IT}$ and composite elastic modulus Er of the surface of the transparent laminate were each measured under the following measurement conditions. The indentation hardness $H_{IT}$ and the composite elastic modulus Er were measured at five points freely selected at or near the center (the region where the adhesive resin existed) of the surface of the transparent laminate as the measurement sample to determine the arithmetic average of the resulting five hardness values. However, the five points to be freely selected for measurement were selected from a portion as flat as possible in the transparent laminate by observing the transparent laminate at a magnification of 50 to 500 times under a microscope accessory to the TI950 TriboIndenter, avoiding areas with extreme protrusions and areas with extreme depressions on the contrary.

(Measurement Conditions)

Indenter shape: Berkovich
Load control mode: up to a maximum of 40 mN
Loading time: 4 seconds
Creep time: 5 seconds
Unloading time: 4 seconds
Measurement temperature: 25° C.
Measurement humidity: 50%

<Ra/Rz>

Using the transparent laminates according to Examples 15 to 25 and Comparative Examples 7 to 13, the arithmetic average roughness (Ra) and maximum height (Rz) on the surface of each of the transparent laminates was measured, and a ratio of Ra to Rz (Ra/Rz) on the surface of the transparent laminate was determined. Specifically, a sample 5 mm×5 mm in size was first cut out of the transparent laminate. Then, using an atomic force microscope (Atomic Force Microscope, AFM) SPM-9700 manufactured by Shimadzu Corporation, the surface shape of the sample was measured on software SPM manager in the On-Line (measurement) mode under the following conditions. Then, the Off-Line (analysis) mode was used for image processing. The resulting AFM image was analyzed to obtain the Rz (maximum height) and Ra (arithmetic average roughness) of each sample. The arithmetic average of the Rz values and the arithmetic average of the Rz/Ra values were each determined from each of 14 points in each sample, and these average values were regarded as Rz and Rz/Ra.

(AFM Measurement Conditions)

Measurement mode: phase

Scanning range: 5 μm×5 μm

Scanning rate: 0.2 Hz

Number of pixels: 512×512

Cantilever used: NCHR (resonance frequency, 320 kHz; spring constant, 42 N/m) manufactured by NanoWorld AG (AFM Image Processing Conditions)

Slope correction: the average value in the X direction, face fit (automatic)

<Smell Evaluation>

A smell evaluation was performed on the transparent laminates according to Examples 15 to 25 and Comparative Examples 7 to 13. Specifically, a sample 100 mm×100 mm in size was first cut out of the transparent laminate. Then, in an environment of 25° C. and a relative humidity of 50%, a smell of the sample was smelled from a position 5 cm apart from the center of the surface of the transparent laminate in the direction normal to this surface. The evaluation criteria were as below-mentioned. The test subjects were 10 persons in their 20's to 50's.

AA: none of the persons sensed no unpleasant smell.

A: 7 to 9 of the persons sensed no unpleasant smell.

B: 3 or more of the persons sensed an unpleasant smell.

<Reflection Characteristics>

The reflection characteristics of the double-sided antireflection laminates according to each of Examples 26 to 32 and Comparative Examples 14 to 18 were examined. Specifically, the double-sided reflectance, magnitude of the luminous reflectance Y, and ΔY2 were determined.

(1) Measurement of Double-sided Reflectance

First, a sample 70 mm×70 mm in size was cut out of the double-sided antireflection laminate. In addition, two black acrylic plates 10 mm×50 mm in size (hereinafter referred to as "black acrylic plates 1") and one black acrylic plate 50 mm×50 mm in size (hereinafter referred to as a "black acrylic plate 2") were cut out of a black acrylic plate (a product named "CLAREX N-885", manufactured by Nitto Jushi Kogyo Co., Ltd.) having a thickness of 1 mm. The black acrylic plates 1 were placed on the black acrylic plate 2 so as to be opposite to each other, and fixed with a tape (a product named "Cello-tape (registered trademark)", manufactured by Nichiban Co., Ltd.) to produce such a holder as depicted in FIG. 9. Then, the sample was placed on the holder in such a manner that the sample was on the two black acrylic plates 1. Then, the sample in this state was placed in the measurement unit of a spectrophotometer (a product named "UV-2600", manufactured by Shimadzu Corporation). Using the spectrophotometer, the surface of the sample was exposed to light the incidence angle of which was 5 degrees. Light reflected on the sample in the specular direction was received. The reflectance in the wavelength range of from 380 nm to 780 nm was measured. Then, the luminous reflectance was determined using a software item (a software item pre-installed in UV-2600) for conversion in terms of the brightness that a person senses with the eyes. The luminous reflectance was the arithmetic average of the luminous reflectance values measured at 40 points, in which the 40 points for measurement were generally equally spaced so as to cover the whole sample. Then, the double-sided reflectance of the sample was determined by subtracting, from the luminous reflectance measured, a value calculated by multiplying the preliminarily measured luminous reflectance of the black acrylic plate 1 by the total light transmittance of the double-sided antireflection laminate twice (the reflectance of the black acrylic plate 1(%)×the total light transmittance of the double-sided antireflection laminate (%)/100×the total light transmittance of the double-sided antireflection laminate (%)/100). The luminous reflectance of the black acrylic plate 1 was determined in the same manner as the luminous reflectance of the above-mentioned double-sided antireflection laminate, in which the black acrylic plate 1 was placed in the measurement unit of a spectrophotometer (a product named "UV-2600", manufactured by Shimadzu Corporation). In addition, the total light transmittance of the double-sided antireflection laminate was determined by the same method as described in the section on the above-mentioned measurement of the total light transmittance.

(2) Magnitude of Luminous Reflectance Y, and ΔY2

Two samples (samples 1 and 2) 70 mm×70 mm in size were first cut out of each of the double-sided antireflection laminates. In order to measure the luminous reflectance of the first face of the sample 1, a black acrylic plate 100 mm×100 mm×2 mm in size (a product named "COMOGLAS Acrylic Sheet", manufactured by Kuraray Co., Ltd.) was bonded to the second face of the sample with a transparent adhesive having a film thickness of 25 μm (a product named "PD-S1", manufactured by Panac Co., Ltd.). In order to measure the luminous reflectance of the second face of the sample 2, a black acrylic plate 100 mm×100 mm×2 mm in size (a product named "COMOGLAS Acrylic Sheet", manufactured by Kuraray Co., Ltd.) was bonded to the first face of the sample with a transparent adhesive having a film thickness of 25 μm (a product named "PD-S1", manufactured by Panac Co., Ltd.). Then, the sample 1 having a black acrylic plate bonded to the second face thereof was placed in the measurement unit of a spectrophotometer (a product named "UV-2600", manufactured by Shimadzu Corporation), and the luminous reflectance of the first face of the sample was measured. In addition, the sample 2 having a black acrylic plate bonded to the first face thereof was placed in the measurement unit of a spectrophotometer (a product named "UV-2600", manufactured by Shimadzu Corporation), and the luminous reflectance of the second face of the sample was measured. The luminous reflectance was determined by the same procedures as the procedures described in the section on the measurement of the double-sided reflectance. Then, the luminous reflectance measured of the first face and the luminous reflectance measured of the second face were compared to obtain a magnitude comparison between the luminous reflectance of the first face and the luminous reflectance of the second face. In addition, the absolute value ΔY2 of a difference between the luminous reflectance of the first face and the luminous reflectance of the second face (|the luminous reflectance of the first face−the luminous reflectance of the second face|) was determined.

<Evaluation of Visibility>

The visibility of the double-sided antireflection laminate according to each of Examples 26 to 32 and Comparative Examples 14 to 18 was evaluated. Specifically, a sample 350 mm×250 mm in size was cut out of the double-sided antireflection laminate. Then, a film was removed from a commercially available face shield, and in place of this film, the sample was bonded to the support of the film of the face shield in such a manner that the sample was arranged in front of a face, in particular the mouth. When this was done, the sample was bonded in such a manner that the first face of the double-sided antireflection laminate faced the mouth. With these samples, a conversation was then carried out in an environment of 25° C. and a relative humidity of 50% in a bright room (at 1000 Lux; the light source was a white light source) for 30 minutes. Then, in this 30 minutes, whether reflected light or the like caused any reflection, whether any fog was caused near the mouth, and how good the field of vision was were verified. The observation distance was 1 m, and the observation was performed from the front side of the wearer of the face shield. The evaluation criteria were as below-mentioned. The test subjects were 10 persons in their 20's to 50's.

AA: with all of the persons, the fog disappeared from the first face of the double-sided antireflection laminate within 3 seconds, whereafter the surface and the first face were still hard to fog, and the mouth was seen well. No such reflection that did not enable the countenance or the like to be read was caused.

A: with 8 to 9 of the persons, the fog disappeared from the first face of the double-sided antireflection laminate within 3 seconds, whereafter the surface and the first face were still hard to fog, and the mouth was seen well. No such reflection that did not enable the countenance or the like to be read was caused.

B: with 3 or more of the persons, the fog did no disappear from the first face of the double-sided antireflection laminate, and the mouth was not seen well.

The results are illustrated in Tables 1 to 4 below.

TABLE 1

| | Composition No. for HC Layer | Composition No. for LR Layer | Anti-fogging Ability Test | Exhaled Air Test | ΔY1 | Luminous Reflectance Y before Anti-fogging Ability Test (%) | Anti-reflection Ability | Total Light Transmittance (%) | Haze Value (%) | Water Contact Angle (°) |
|---|---|---|---|---|---|---|---|---|---|---|
| Example 1 | 1 | 1 | A | A | 0.00 | 1.05 | A | 95.0 | 0.3 | 103 |
| Exemple 2 | 2 | 1 | A | A | 0.01 | 1.02 | A | 96.1 | 0.2 | 108 |
| Example 3 | 3 | 1 | A | A | 0.01 | 1.03 | A | 95.0 | 0.2 | 111 |
| Example 4 | 4 | 1 | A | A | 0.00 | 1.10 | A | 95.0 | 0.3 | 106 |
| Example 5 | 5 | 1 | A | A | 0.04 | 1.06 | A | 96.0 | 0.2 | 105 |
| Example 6 | 6 | 1 | A | A | 0.02 | 1.12 | A | 94.9 | 0.2 | 112 |
| Example 7 | 7 | 1 | A | A | 0.09 | 1.09 | A | 96.0 | 0.3 | 116 |
| Example 8 | 8 | 1 | A | A | 0.05 | 1.10 | A | 96.1 | 0.2 | 117 |
| Example 9 | 9 | 1 | A | A | 0.10 | 1.01 | A | 95.0 | 0.2 | 104 |
| Example 10 | 10 | 1 | A | A | 0.08 | 1.02 | A | 95.0 | 0.3 | 110 |
| Example 11 | 11 | 1 | A | A | 0.00 | 1.08 | A | 95.0 | 0.2 | 105 |
| Example 12 | 3 | 2 | A | A | 0.12 | 1.45 | A | 94.6 | 0.3 | 111 |
| Example 13 | 3 | 3 | A | A | 0.03 | 1.79 | A | 94.3 | 0.3 | 104 |
| Example 14 | First Face Side: 9 Second Face Side: 13 | First Face Side: 1 Second Pace Side: 1 | A | A | 0.08 | 1.00 | A | 97.9 | 0.6 | 104 |
| Comparative Example 1 | 12 | 1 | B | B | 0.06 | 1.05 | A | 96.1 | 0.3 | 116 |
| Comparative Example 2 | 13 | 1 | B | B | 1.02 | 1.11 | A | 96.0 | 0.3 | 112 |
| Comparative Example 3 | 14 | 1 | B | B | 0.89 | 1.03 | A | 96.0 | 0.3 | 111 |
| Comparative Exemple 4 | 3 | — | A | A | 0.08 | 4.11 | B | 92.4 | 0.3 | 63 |
| Comparative Example 5 | 5 | — | A | A | 0.12 | 4.25 | B | 92.6 | 0.3 | 62 |
| Comparative Example 6 | First Face Side: 13 Second Face Side: 13 | First Face Side: 1 Second Face Side: 1 | B | B | 0.75 | 1.02 | A | 97.7 | 0.6 | 132 |

TABLE 2

| | Composition No. for HC Layer | Composition No. for LR Layer | Peak Intensity Ratio (Second Peak intensity/First Peak Intensity) | Anti-fogging Ability Test | Exhaled Air Test | ΔY1 | Luminous Reflectance Y belore Anti-fogging Ability Test (%) | Anti-reflection Ability |
|---|---|---|---|---|---|---|---|---|
| Example 15 | 15 | 4 | 1.863 | A | A | 0.00 | 0.33 | A |
| Example 16 | 16 | 4 | 1.386 | A | A | 0.01 | 0.36 | A |
| Example 17 | 17 | 4 | 1.263 | A | A | 0.04 | 0.37 | A |
| Example 18 | 18 | 4 | 2.192 | A | AA | 0.00 | 0.30 | A |
| Exemple 18 | 19 | 4 | 1.781 | A | A | 0.02 | 0.37 | A |
| Example 20 | 20 | 4 | 1.578 | A | A | 0.03 | 0.31 | A |
| Example 21 | 21 | 4 | 0.344 | A | AA | 0.00 | 0.30 | A |
| Example 22 | 22 | 4 | 0.167 | A | A | 0.01 | 0.38 | A |
| Example 23 | 23 | 4 | 0.051 | A | A | 0.06 | 0.37 | A |
| Example 24 | 15 | 6 | 1.872 | A | AA | 0.00 | 0.35 | A |
| Example 25 | 24 | 4 | 1.845 | A | A | 0.01 | 0.32 | A |
| Comparative Example 7 | 25 | 4 | 0.845 | B | B | 0.44 | 0.34 | A |
| Comparative Example 8 | 26 | 4 | 0.848 | B | B | 0.52 | 0.40 | A |
| Comparative Example 9 | 27 | 4 | 0.542 | B | B | 0.64 | 0.41 | A |
| Comparative Example 10 | 28 | 5 | 0.001 | B | B | 1.12 | 0.10 | A |
| Comparative Example 11 | 12 | 4 | 0.005 | B | B | 1.07 | 0.47 | A |
| Comparative Example 12 | 29 | 4 | 1.230 | B | B | 0.78 | 0.39 | A |
| Comparative Example 13 | 30 | 4 | 2.285 | A | A | not measurable | 0.57 | B |

TABLE 3

| | $H_{IT}$ (Mpa) | Er (Gpa) | Total Light Transmittance (%) | Haze Value (%) | Ra/Rz | Smell |
|---|---|---|---|---|---|---|
| Example 15 | 44.66 | 0.32 | 95.8 | 0.2 | 0.081 | A |
| Example 16 | 68.60 | 0.60 | 95.7 | 0.2 | 0.089 | A |
| Example 17 | 90.26 | 0.79 | 95.7 | 0.3 | 0.087 | A |
| Example 18 | 26.98 | 0.18 | 95.8 | 0.2 | 0.091 | A |
| Example 19 | 49.50 | 0.40 | 95.7 | 0.2 | 0.090 | A |
| Example 20 | 38.86 | 0.30 | 95.7 | 0.2 | 0.078 | B |
| Example 21 | 40.21 | 0.72 | 95.8 | 0.2 | 0.148 | A |
| Example 22 | 31.81 | 0.50 | 95.7 | 0.2 | 0.089 | A |
| Example 23 | 72.18 | 1.24 | 95.7 | 0.3 | 0.021 | A |
| Example 24 | 45.23 | 0.35 | 95.8 | 0.2 | 0.083 | A |
| Example 25 | 45.62 | 0.38 | 95.7 | 0.2 | 0.082 | B |
| Comparative Example 7 | 183.21 | 1.89 | 95.9 | 0.3 | 0.083 | A |

TABLE 3-continued

| | $H_{IT}$ (Mpa) | Er (Gpa) | Total Light Transmittance (%) | Haze Value (%) | Ra/Rz | Smell |
|---|---|---|---|---|---|---|
| Comparative Example 8 | 133.74 | 1.98 | 95.8 | 0.3 | 0.088 | A |
| Comparative Example 9 | 196.07 | 3.02 | 95.6 | 0.3 | 0.082 | A |
| Comparative Example 10 | 476.90 | 6.78 | 95.8 | 0.4 | 0.081 | AA |
| Comparative Example 11 | 392.60 | 5.13 | 95.7 | 0.3 | 0.082 | AA |
| Comparative Example 12 | 46.27 | 0.39 | 95.6 | 0.4 | 0.085 | B |
| Comparative Example 13 | 16.55 | 0.10 | 95.3 | 0.4 | — | B |

TABLE 4

| | Composition No. fox HC Leyer/Composition No. for LR Layer | | Exhaled Air Test | | Antireflection Ability | | | | | |
|---|---|---|---|---|---|---|---|---|---|---|
| | Transparent Laminate 1 | Transparent Laminate 2 | First Face | Second Face | Double-sided Reflectance (%) | Magnitude of Luminous Reflectance Y | ΔY2 (%) | Evaluation of Visibility | Total Light transmittance (%) | Haze Valve (%) |
| Example 26 | 15/4 | 28/5 | A | B | 0.36 | First Face > Second Face | 0.23 | A | 99.2 | 0.3 |
| Example 27 | 15/6 | 28/5 | AA | B | 0.36 | First Face > Second Face | 0.25 | AA | 99.3 | 0.3 |
| Example 28 | 15/4 | 12/4 | A | B | 0.74 | First Face < Second Face | 0.14 | A | 98.9 | 0.3 |
| Example 29 | 15/6 | 12/4 | AA | B | 0.76 | First Face < Second Face | 1.12 | AA | 98.8 | 0.4 |
| Example 30 | 15/4 | 15/4 | A | A | 0.60 | First Face = Second Face | 0.00 | A | 99.1 | 0.1 |
| Example 31 | 15/6 | 15/6 | AA | AA | 0.63 | First Face = Second Face | 0.00 | AA | 99.1 | 0.0 |
| Example 32 | 15/2 | 15/2 | A | A | 1.79 | First Face = Second Face | 0.00 | A | 97.5 | 0.5 |

TABLE 4-continued

| | Composition No. fox HC Leyer/Composition No. for LR Layer | | Exhaled Air Test | | Antireflection Ability | | | | | |
|---|---|---|---|---|---|---|---|---|---|---|
| | Transparent Laminate 1 | Transparent Laminate 2 | First Face | Second Face | Double-sided Reflectance (%) | Magnitude of Luminous Reflectance Y | ΔY2 (%) | Evaluation of Visibility | Total Light transmittance (%) | Haze Valve (%) |
| Comparative Example 14 | 28/5 | 15/4 | B | B | 0.36 | First Face < Second Face | 0.23 | B | 99.2 | 0.4 |
| Comparative Example 15 | 28/5 | 28/5 | B | B | 0.10 | First Faco = Second Face | 0.00 | B | 99.3 | 0.6 |
| Comparative Example 16 | 12/4 | 28/5 | B | B | 0.49 | First Face > Second Face | 0.37 | B | 99.0 | 0.5 |
| Comparative Example 17 | 28/5 | 12/4 | B | B | 0.49 | First Face < Second Face | 0.37 | B | 99.1 | 0.5 |
| Comparative Example 18 | 12/4 | 12/4 | B | B | 0.86 | First Face = Second Face | 0.00 | B | 98.8 | 0.3 |

The results will be discussed below. The transparent laminates according to Comparative Examples 1 to 3 exhibited a low luminous reflectance Y but a poorer anti-fogging ability. In addition, the transparent laminates according to Comparative Examples 4 and 5 exhibited an excellent anti-fogging ability but a high luminous reflectance Y because the transparent laminates had no low-refractive-index layer formed therein. The transparent laminates according to Comparative Examples 7 to 12 exhibited the above-mentioned peak intensity ratio of less than 1.25 or less than 0.01, and thus, exhibited a poorer anti-fogging ability. In addition, the transparent laminate according to Comparative Example 13 exhibited the above-mentioned peak intensity ratio of more than 2.2, the film strength of the low-refractive-index layer was insufficient. The low-refractive-index layer of the transparent laminate after the anti-fogging ability test was peeled off when touched. This did not make it possible to measure the luminous reflectance Y of the transparent laminate according to Comparative Example 13 after the anti-fogging ability test. This is considered to be because the binder resin and polymerization initiator in the low-refractive-index layer permeated the hard coat layer, causing the low-refractive-index layer to contain almost only hollow silica particles. In contrast to this, the transparent laminates according to Examples 1 to 25 exhibited a low luminous reflectance Y and an excellent anti-fogging ability.

Furthermore, the transparent shield film according to Comparative Example 6 exhibited a low luminous reflectance Y but a poorer anti-fogging ability. In contrast to this, the transparent shield film according to Example 14 exhibited a low luminous reflectance Y and an excellent anti-fogging ability.

In particular, the transparent laminates according to Examples 15 to 17 exhibited a low luminous reflectance Y and an excellent anti-fogging ability and visibility, and besides, had an optimal thickness. Thus, producing a face shield using the transparent laminates according to Examples 15 to 17 made it possible to obtain a face shield that was light and comfortable to wear.

LIST OF REFERENCE NUMERALS

10, 20, 30, 40, 50—Transparent Laminate
10A, 20A, 30A, 40A, 50A—Surface
11—Base Material
12—Functional layer
13—Low-refractive-index Layer
60—Image Display Device
70—Display panel
90—Air Layer
100—Front Plate
120—Facial Transparent Protector
140, 180, 190—Double-sided Antireflection Laminate

The invention claimed is:

1. A transparent laminate comprising a functional layer and a low-refractive-index layer having a refractive index lower than the refractive index of the functional layer, wherein the surface of the low-refractive-index layer is the surface of the transparent laminate, the surface of the transparent laminate is not fogged as tested in an anti-fogging ability test in which the transparent laminate is left to stand in an environment of −15° C. for 5 minutes, then transferred into an environment of 20° C. or more and 25° C. or less and a relative humidity of 40% or more and 70% or less, and then left to stand for 5 minutes, and the absolute value ΔY1 of a difference in the luminous reflectance Y of the surface of the transparent laminate between before and after the anti-fogging ability test is 0.2% or less, the luminous reflectance Y of the surface of the transparent laminate is 2.0% or less, and a ratio of an arithmetic average roughness to the maximum height of the surface of the transparent laminate is 0.02 or more and 0.15 or less.

2. The transparent laminate according to claim 1, wherein a ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ is 1.25 or more and 2.20 or less in a spectrum obtained from the surface of the transparent laminate by Fourier transform infrared spectroscopy.

3. The transparent laminate according to claim 1, wherein a ratio of a second peak intensity in a second wave number region of from 1150 $cm^{-1}$ to 1000 $cm^{-1}$ to a first peak intensity in a first wave number region of from 1780 $cm^{-1}$ to 1700 $cm^{-1}$ is 0.01 or more and 0.40 or less in an absorption spectrum obtained from the surface of the transparent laminate by Fourier transform infrared spectroscopy.

4. The transparent laminate according to claim 1, wherein the indentation hardness of the surface of the transparent laminate is 20 MPa or more and 100 MPa or less, and the composite elastic modulus of the surface of the transparent laminate is 0.15 GPa or more and 1.5 GPa or less.

5. The transparent laminate according to claim 1, wherein the low-refractive-index layer has a film thickness of 200 nm or less.

6. The transparent laminate according to claim 1, wherein the functional layer has a film thickness of 3 μm or more.

7. The transparent laminate according to claim 1, wherein the functional layer contains a hydrophilic group, and wherein the low-refractive-index layer is adjacent to the functional layer.

8. The transparent laminate according to claim 1, wherein the contact angle of the surface of the transparent laminate with water is 90° or more.

9. The transparent laminate according to claim 1, wherein the low-refractive-index layer contains hollow silica particles.

10. The transparent laminate according to claim 1, wherein the functional layer is a hard coat layer.

11. The transparent laminate according to claim 1, further comprising a base material provided on a surface of the functional layer opposite to the surface on the low-refractive-index layer side.

12. The transparent laminate according to claim 11, wherein the base material contains a resin or glass.

13. The transparent laminate according to claim 1, for use in an image display device, a facial transparent protector, a transparent film curtain, or a transparent partition.

14. An image display device comprising a display panel and a light-transmitting front plate arranged on the observer side of the display panel with an air layer between the display panel and the light-transmitting front panel, wherein the front plate includes a base material and the transparent laminate according to claim 1 arranged on at least any one of the display panel side or the observer side of the base material.

15. A double-sided antireflection laminate having an antireflection function at both faces of the double-sided antireflection laminate, comprising:

the transparent laminate according to claim 1;

an antireflection film arranged on a back surface side of the transparent laminate opposite to the surface; and a transparent adhesion layer that joins the transparent laminate to the antireflection film.

16. The double-sided antireflection laminate according to claim 15, wherein the double-sided antireflection laminate is in use for a facial transparent protector, and the surface of the transparent laminate is located toward an observer's face.

17. The double-sided antireflection laminate according to claim 15, wherein the double-sided antireflection laminate has a total light transmittance of 90% or more.

18. The double-sided antireflection laminate according to claim 15, wherein the double-sided antireflection laminate has a double-sided reflectance of 0.1% or more and 2% or less, and the luminous reflectance of the transparent laminate is equal to or greater than the luminous reflectance of the antireflection film.

19. The double-sided antireflection laminate according to claim 15, wherein the double-sided antireflection laminate has a double-sided reflectance of 0.1% or more and 2% or less, and the absolute value $\Delta Y2$ of a difference between the luminous reflectance of the transparent laminate and the luminous reflectance of the antireflection film is 1.0% or less.

20. A facial transparent protector comprising a supporting member and the double-sided antireflection laminate according to claim 15 attached to the supporting member, wherein the surface of the transparent laminate is located toward an observer's face.

* * * * *